(12) United States Patent
Kimura et al.

(10) Patent No.: US 8,259,263 B2
(45) Date of Patent: Sep. 4, 2012

(54) ROLL OF OPTICAL FILM LAMINATE, AND METHOD AND SYSTEM FOR MANUFACTURING THE SAME

(75) Inventors: Kouji Kimura, Osaka (JP); Takayoshi Yamano, Osaka (JP); Takuya Nakazono, Osaka (JP); Kazuo Kitada, Osaka (JP); Tomokazu Yura, Osaka (JP); Fumihito Shimanoe, Osaka (JP); Satoru Koshio, Osaka (JP)

(73) Assignee: Nitto Denko Corporation, Osaka (JP)

( * ) Notice: Subject to any disclaimer, the term of this patent is extended or adjusted under 35 U.S.C. 154(b) by 203 days.

(21) Appl. No.: 12/780,518

(22) Filed: May 14, 2010

(65) Prior Publication Data

US 2010/0283943 A1 Nov. 11, 2010

Related U.S. Application Data

(63) Continuation of application No. PCT/JP2008/003802, filed on Dec. 17, 2008.

(30) Foreign Application Priority Data

Apr. 15, 2008 (WO) .................. PCT/JP2008/000987

(51) Int. Cl.
    *G02F 1/1335* (2006.01)
(52) U.S. Cl. ......................................................... 349/96
(58) Field of Classification Search .................. None
    See application file for complete search history.

(56) References Cited

U.S. PATENT DOCUMENTS

2005/0016670 A1  1/2005  Kanbara et al.

FOREIGN PATENT DOCUMENTS

| EP | 2093041 | 8/2009 |
|---|---|---|
| JP | 55-120005 | 9/1980 |
| JP | 57-052017 | 3/1982 |
| JP | 57-52018 | 3/1982 |
| JP | 57-052019 | 3/1982 |
| JP | 62-014810 | 4/1987 |
| JP | 07-157186 | 6/1995 |
| JP | 7-311160 | 11/1995 |
| JP | 2002-023151 | 1/2002 |
| JP | 2003-014934 | 1/2003 |

(Continued)

OTHER PUBLICATIONS

Supplementary European Search Report dated May 23, 2011 for EP08873928, citing the above reference(s).

(Continued)

*Primary Examiner* — Lucy Chien
(74) *Attorney, Agent, or Firm* — Lowe Hauptman Ham & Berner, LLP

(57) ABSTRACT

A roll of optical-film laminate that increases accuracy, speed and yield in the production of liquid-crystal display elements. The roll of optical film laminate is for use in an apparatus for continuously producing liquid-crystal display elements. The optical film comprises a polarizing composite film of a laminate having a continuous web of polarizer and a protective film superposed on one side of the continuous polarizer, an adhesive layer disposed on one side of the laminate; and a carrier film superposed on the adhesive layer of the polarizing film in a peelable state. Defective and normal regions in the polarizing film are determined. According to these determined regions, coded information that specifies positions of slit lines to be formed in the optical-film web are recorded on the continuous web.

5 Claims, 28 Drawing Sheets

FOREIGN PATENT DOCUMENTS

| | | |
|---|---|---|
| JP | 2003-161935 | 6/2003 |
| JP | 2003-202298 | 7/2003 |
| JP | 2004-094012 | 3/2004 |
| JP | 2004-144913 | 5/2004 |
| JP | 2004-333647 | 11/2004 |
| JP | 2004-338408 | 12/2004 |
| JP | 2004-345354 | 12/2004 |
| JP | 2004-361741 | 12/2004 |
| JP | 2005-037416 | 2/2005 |
| JP | 2005-037417 | 2/2005 |
| JP | 2005-043384 | 2/2005 |
| JP | 3616866 | 2/2005 |
| JP | 2005-062165 | 3/2005 |
| JP | 2005-114624 | 4/2005 |
| JP | 2005-298208 | 10/2005 |
| JP | 2005-305999 | 11/2005 |
| JP | 2005-306604 | 11/2005 |
| JP | 2005-309371 | 11/2005 |
| JP | 2005-347618 | 12/2005 |
| JP | 2006-058411 | 3/2006 |
| JP | 2007-064989 | 3/2007 |
| JP | 2007-140046 | 6/2007 |
| JP | 3974400 | 9/2007 |

OTHER PUBLICATIONS

International Search Report mailed Feb. 3, 2009 for PCT/KR2008/003802.
International Search Report mailed Jan. 15, 2008 for PCT/KR2007/069967.

FIG.22

| No. | TYPE | CAPACITY | TYPE OF INFORMATION | DATA CONTENT | INTERVALS OF PRINTING TO WEB |
|---|---|---|---|---|---|
| 1 | ONE-DIMENSIONAL CODE<br><br>EXAMPLE | 20 CHARACTERS | ALPHANUMERIC CHARACTER | SEE JP 3974400B | 1 to 2 m |
| 2 | TWO-DIMENSIONAL CODE (MATRIX CODE)<br><br>EXAMPLE | 2000 CHARACTERS | ALPHANUMERIC CHARACTER<br><br>JAPANESE KANA CHARACTER<br><br>CHINESE CHARACTER | • LOT No.<br>• ROLL LENGTH<br>• TYPE OF DEFECT<br>• DEFECT POSITION<br>• SIZE OF DEFECT<br>• CONTRAST DIFFERENCE<br>• CUT POSITION (SLIT LINE POSITION) | 1 to 100 m |
| 3 | IC TAG<br><br>EXAMPLE | CHARACTERS SEVERAL THOUSANDS OR MORE | ALPHANUMERIC CHARACTER<br><br>JAPANESE KANA CHARACTER<br><br>CHINESE CHARACTER | • LOT No.<br>• ROLL LENGTH<br>• TYPE OF DEFECT<br>• DEFECT POSITION<br>• SIZE OF DEFECT<br>• CONTRAST DIFFERENCE<br>• CUT POSITION (SLIT LINE POSITION) | ONE POSITION AT LEADING EDGE |

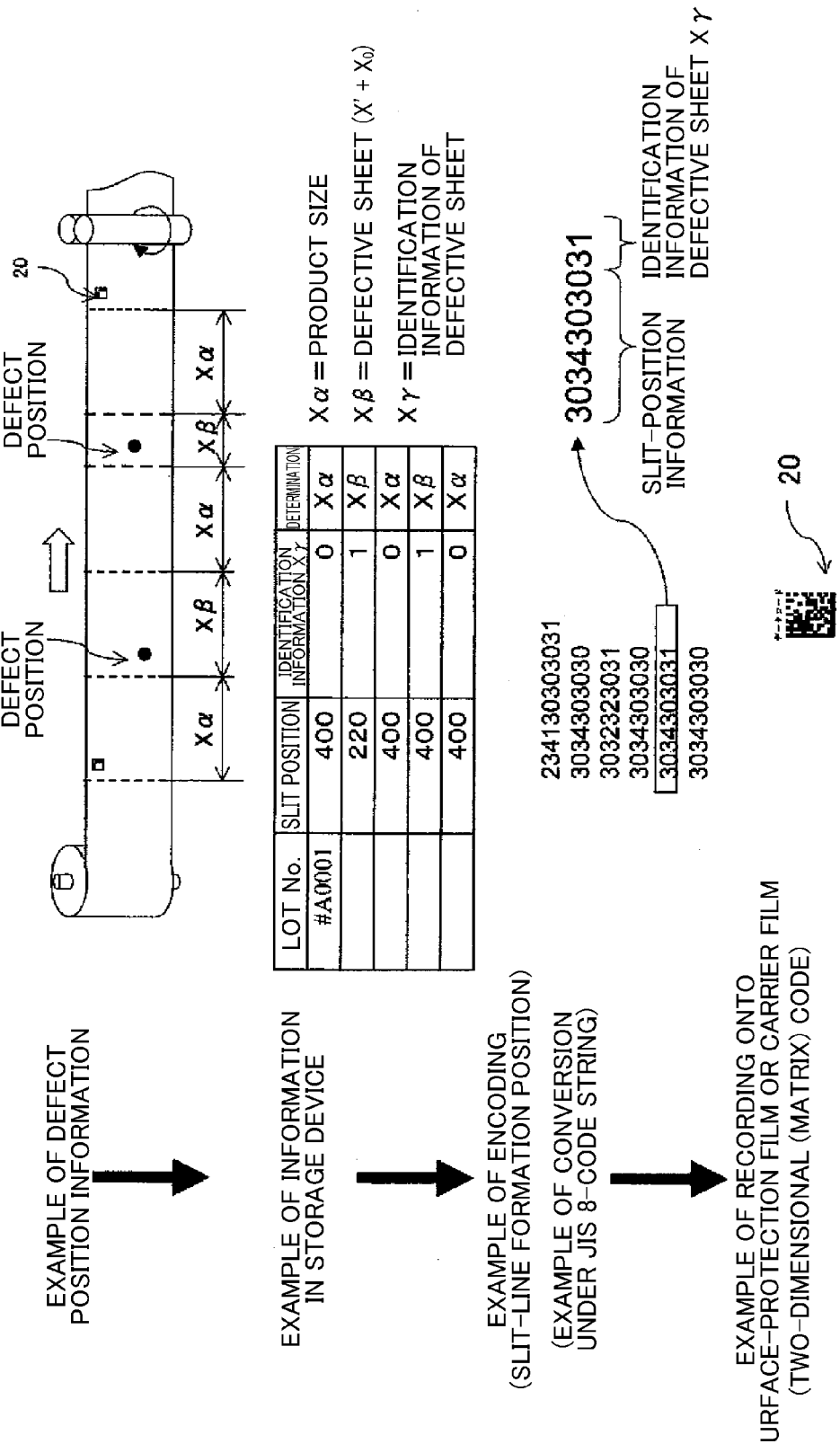

FIG.25

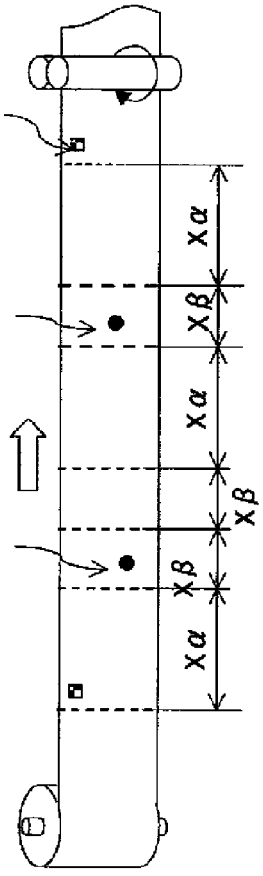

| LOT No. | SLIT POSITION (IDENTIFICATION INFORMATION) | DETERMINATION |
|---|---|---|
| #A0001 | 400 | Xα |
|  | 220 | Xβ |
|  | 400 | Xα |
|  | 200 | Xβ |
|  | 200 | Xβ |
|  | 400 | Xα |

$X\alpha$ = PRODUCT SIZE
$X\beta$ = DEFECTIVE SHEET ($X' \leq X\alpha$)
※IN CASE OF $X\beta$ ($X' + X_0$) = $X\alpha$
$X\beta = (X' + X_0)/m$, IF $m < X\alpha$
(IN CASE OF TABLE, IF m = 2,
$X\beta = 400/2 = 200$)

2341303030031
30323030
30323230
30343030
30323030
30323030
30343030

→ 30323030 } SLIT-POSITION INFORMATION

 20

EXAMPLE OF DEFECT POSITION INFORMATION →

EXAMPLE OF INFORMATION IN STORAGE DEVICE →

EXAMPLE OF ENCODING (SLIT-LINE FORMATION POSITION)
(EXAMPLE OF CONVERSION UNDER JIS 8-CODE STRING) →

EXAMPLE OF RECORDING ONTO SURFACE-PROTECTION FILM OR CARRIER FILM (TWO-DIMENSIONAL (MATRIX) CODE)

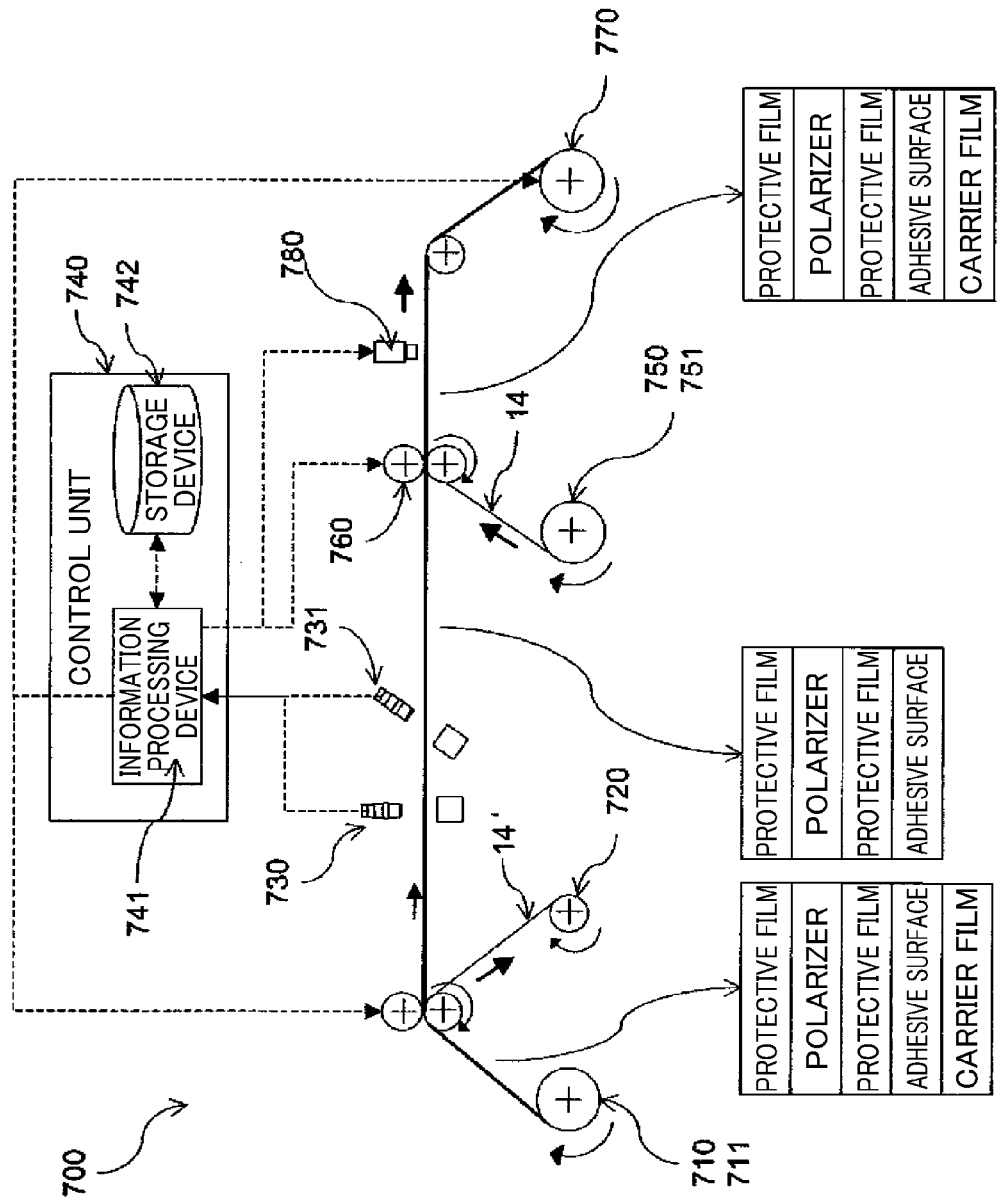

FIG.28

| INSPECTION UNIT | TYPE OF DEFECT | | | | |
| --- | --- | --- | --- | --- | --- |
| | INTERNAL FOREIGN SUBSTANCES | INTERNAL PORES | BRIGHT SPOTS | SURFACE IRREGULARITIES | FLAW/UNDULATION |
| REFLECTION | △ | △ | × | ○ | ○ |
| TRANSMISSION | ○ | ○ | △ | △ | × |
| CROSS-NICOL TRANSMISSION | ○ | ○ | ○ | × | ○ |

ROLL OF OPTICAL FILM LAMINATE, AND METHOD AND SYSTEM FOR MANUFACTURING THE SAME

CROSS REFERENCE TO RELATED APPLICATIONS

The present application is based on, and claims priority from, International Application Number PCT/JP2008/000987 and a continuation of International Application Number PCT/JP2008/003802, respectively filed on Apr. 15, 2008 and Dec. 17, 2008, the disclosure of which is hereby incorporated by reference herein in its entirety.

TECHNICAL FIELD

This disclosure relates to the process for lamination of polarizing films on to substrates used to fabricate LCD (Liquid-Crystal Display) displays.

BACKGROUND

For a liquid crystal display element to function, the direction of orientation of liquid crystal molecules between two substrates and the direction of polarization of polarizers laminated to the substrates must be set in a particular relation to each other. In liquid-crystal display element technologies, LCDs using a TN (Twisted Nematic) type liquid crystal were the first to be put into practical use. Recently, LCDs using a VA (vertical Alignment) type liquid crystal, an IPS (Inplane Switching) type liquid crystal etc. were put into practical use. Although a technical explanation is omitted, in an LCD using such TN-type liquid-crystal panel, liquid crystal molecules are provided between two upper and lower orientation films having respective rubbing directions on the inner surfaces of substrates of the liquid-crystal panel. This means that the liquid crystal molecules are twisted by 90 degrees along the optical axis, so that, when a voltage is applied, the liquid crystal molecules are aligned in a direction perpendicular to the orientation films. However, in case where the LCD is designed to allow images of the same quality to be seen as viewed from right and left sides of a display screen as those view from directly in front of the display screen, the direction of rubbing on the orientation film at the viewing-side must be 45 degrees (the rubbing direction of the other orientation film being 135 degrees). It is therefore necessary that the polarizing sheets made from the polarizing composite films as shown in FIGS. 1A and 1B, for laminating respectively on the front and back sides of the liquid-crystal panel with adhesive layers must have polarizers respectively oriented in directions inclined respectively by 45 degree with respect to a lengthwise or widthwise direction of the display screen so as to conform to the rubbing directions.

Therefore, in an optical film for use in producing a liquid-crystal element of a TN-type liquid-crystal panel, it is required that the optical film is punched or cut into a rectangular-shaped sheet having a major side or a minor side determined in accordance with the size of the TN liquid crystal panel and inclined by 45 degrees with respect to the orientation direction of the polarizer, as described in Japanese Laid-Open Patent Publication No. JP 2003-161935A or Japanese Patent 3616866 B.

The punching or cutting the optical film into the rectangular-shaped sheet may be collectively referred as "individualized sheet" or "method and system for manufacturing individualized sheet" for a liquid-crystal display element. The sheet of optical film thus punched or cut is produced by punching or cutting in the form including the protective carrier film so that any exposure of the adhesive layer in the polarizing composite film contained in the optical film can be prevented. The punched-out or cut sheet of the carrier film may be referred as "separator", rather than "sheet of the carrier film". Thus, the manufacturing process of the liquid-crystal display elements includes the first step of peeling the separator from each of the sheets of optical film to have the adhesive layer exposed. Subsequently, the sheets of the optical film each having the adhesive layer exposed by peeling the separator are conveyed one-by-one by for example under a vacuum suction irrespective of whether the surface protective films are laminated or not, and laminated to respective ones of a plurality of liquid-crystal panels. According to the aforementioned manufacturing process of the liquid-crystal display elements, it has been required that the punched-out or cut sheet is in the form of an individualized sheet having four trimmed sides and a certain level of stiffness. During the initial period in the history of the manufacturing process of the liquid-crystal display elements, this polarizing sheet having four trimmed sides was generally been known as a "polarizing plate" which is still used as a common name.

In the manufacturing process of TN-type liquid-crystal display elements, an optical film unwound from a roll of the optical film may be sequentially punched or cut in a direction transverse to the feed direction. However, in this case, it is impossible to obtain a finished liquid crystal display element simply by laminating the polarizing sheets formed to respective ones of a plurality of liquid-crystal panels. This is because the polarizing sheets each formed with a major or minor side extending in a direction 45 degrees cannot be laminated sequentially to respective ones of the liquid-crystal panels W with the same posture. Therefore, to provide a finished liquid crystal display element by feeding a polarizing sheet formed from a polarizing composite film included in a continuous web of polarizing composite film being fed, a polarizing composite film having a width greater than a major side of a liquid-crystal panel W is required. Further, polarizing composite film must be punched at an angled direction of 45 degrees with respect to the lengthwise direction into a plurality of individual polarizing sheet as seen in Japanese Laid-Open Patent Publication No. JP 2003-161935A or Japanese Patent 3616866 B. Alternatively, an elongated polarizing composite film may be provided in the form of a single sheet by punching or cutting it in a direction 45 degrees inclined with respect to the lengthwise direction, or by connecting a plurality of such sheets into a film-like configuration, and winding the film to form a roll of the polarizing composite film. The elongated polarizing composite film is then used in a process of forming polarizing sheets, by unwinding the polarizing composite film from the roll, and cutting into a required size each of the polarizing sheets and laminated to a respective one of a plurality of liquid-crystal panels W. Therefore, all of the above techniques require a system that manufactures individualized sheets.

Before VA-type liquid crystal and IPS-type liquid crystal were brought into practical use, Japanese Patent Publication No. No. 62-14810 B disclosed continuously feeding an optical film including a polarizing composite film. Japanese Patent Publication No. 62-14810 B discloses a technique of continuously feeding an optical film which comprises a polarizing composite film (called an "elongated polarizing plate") and a separator for protecting an adhesive layer on the polarizing composite film onto a plurality of liquid-crystal panels (called "liquid-crystal cells") for small-size display screens of electronic calculators or the like utilizing a carrier function of the separator, cutting only a polarizing plate and an adhesive layer while leaving a separator uncut (hereinafter referred as "half-cut")", removing defective sheets of polarizing sheets in the course of the feeding, sequentially laminating the remaining polarizing sheets to the liquid-crystal panels, and peeling the separator off the polarizing sheets. The apparatus may be a so-called "labeler unit". However, this liquid-crystal panel is an LCD using a TN-type liquid crystal, so that the optical film herein used must be an elongated sheet cut in a direction 45 degrees oblique to the longitudinal direction of the optical film. This technique cannot be practically applied directly to an optical film continuous feed apparatus for use in continuous manufacturing of a large-size liquid-crystal display element for widescreen televisions because of the width of optical film required.

Automation of process for manufacturing liquid-crystal display elements using individualized sheets is generally described below. For example, in Japanese Laid-Open Patent Publication No. 2002-23151A, the manufacturing process utilizing such individualized sheets has problems not only in that the separators must be removed from respective ones of the individualized sheets taken out from the magazine, but also in that the individualized sheets are flexible and are easily curved or distorted while they are being carried under suction, so that difficulties have been encountered in maintaining accuracy and speed in automatic registration and automatic lamination with liquid-crystal panels. Thus, it will be understood that the individualized sheet is required to have a certain level of thickness and stiffness to facilitate transport under suction and handling for automatic laminating process. For example, Japanese Laid-Open Patent Publication No. 2004-144913A, Japanese Laid-Open Patent Publication No. 2005-298208A or Japanese Laid-Open Patent Publication No. 2006-58411A discloses measures for addressing such technical problems.

On the other hand, the VA-type and IPS-type liquid-crystal panels are not designed to arrange liquid crystal molecules in twisted orientations. Thus, in these types of liquid-crystal panels, there is no need to have the polarization axis of the polarizing sheet oriented 45 degrees, but only required to have the polarizing sheets applied to the opposite sides of the liquid crystal display panel oriented with their polarization axes crossed at 90 degrees crossing angle. Rather, in the case of the VA-type and IPS-type liquid-crystal panels, with respect to the viewing angle characteristics, maximum contrast can be obtained along the direction of the polarizing axis of the polarizing sheet, so that it is preferable that the polarizing sheets have polarization axes oriented in parallel with the longitudinal or transverse direction of the liquid crystal panel from the view point of symmetry of the viewing angle characteristics and visibility. Thus, the polarizing sheets that including a polarizing composite film which has been subjected to a longitudinal or transverse stretching can be continuously unwound from a roll and cut along transverse lines to sequentially produce rectangular polarizing sheets.

Because of the improved viewing angle characteristics, VA-type liquid crystal or IPS-type liquid crystal are becoming more widely adopted than TN type liquid crystal. In view of such trend in environments of technical developments, proposals have been made such as the one described in Japanese Laid-Open Patent Publication No. 2004-361741A that are based on use of the VA-type or IPS-type liquid-crystal panels and comprise steps of continuously feeding an optical film laminate, cutting an optical film laminate in conformity to the size of a liquid-crystal panel and sequentially laminating polarizing sheets to respective ones of a plurality of the liquid-crystal panels.

However, the mainstream of manufacture of liquid-crystal display elements is still based on manufacturing technology utilizing individualized sheets, due to the following technical problems. In manufacturing liquid crystal display elements, a critical technical challenge is to detect any defect which may otherwise be retained in the display elements to be formed, and to prevent any defective product from being produced. This makes it possible to significantly improve manufacturing yield. Most of the product defects primarily arise from defects inherent in the polarizing composite film contained in the optical film. However, it is not practical to provide an optical film after completely removing all defects contained in individual films which are to be laminated together to form the optical film. The reason is that, observation of the polarizer, protective film laminated on the polarizer and an adhesive layer formed on the films indicates that there are various kinds of defects distributed in 20 to 200 positions over a unit length of the polarizing composite film of 1000 m This means that, under existing circumstances, it is extremely difficult to produce a defect-free optical film. In a finished display, flaws or defects, even if such a flaw or defect is small, are not permitted. Therefore, if a length of the polarizing composite film with defects are used to form a display and a display requires 1 m of film, 20 to 200 defective displays are produced per 1,000 displays produced.

A proposed preliminary inspection apparatus for use in individualized sheets is disclosed, for example, in Japanese Patent No. 3974400B, Japanese Laid-Open Patent Publication Nos. 2005-62165A and 2007-64989A.

Japanese Laid-Open Patent Publication 2007-140046A discloses a manufacturing method wherein an optical film (called "polarizing plate stock") is continuously unrolled from a roll of the optical film in the form of a laminated structure. A carrier film (called "releasable film") is peeled from the laminate of the optical film before the polarizing composite film in the optical film is inspected for existence of defects, then after the inspection, the polarizing composite film is punched or cut avoiding positions of defects.

Japanese Patent Application No. 2007-266200 discloses a method and an apparatus for laminating an optical film onto a liquid-crystal panel. The method and an apparatus disclosed in Japanese Patent Application No. 2007-266200, however, require steps that cause substantial complexity in the entire system for laminating but also an increase in the number of steps and difficulty in control for each step, and therefore, cause corresponding reduction in the manufacturing speed.

The present disclosure has been made based on the above related disclosures and through intensive research and consideration for significantly enhancing product accuracy and manufacturing speed, and drastically improving production yield, in the manufacture of liquid-crystal display elements.

SUMMARY

The present disclosure relates to a roll of an optical film laminate including a polarizing film having an adhesive layer provided thereon. The roll of an optical film laminate adapted to be applied to a front or backside of a liquid-crystal panel, and a method and system for manufacturing the same.

The present disclosure provides a roll of optical film laminate for use in a continuous manufacturing method and system for liquid-crystal display elements wherein the continuous manufacturing method and system are configured for unrolling the continuous web of optical film from the roll under tension, forming a plurality of slit lines in the unrolled continuous web of optical film along a direction transverse to the feed direction of the continuous web at a plurality of pairs of upstream and downstream positions in the feed direction to a depth reaching the inner surface of the carrier film in the optical film laminate, so that, the carrier film is left uncut under the cut lines, defective polarizing sheets corresponding to defective regions in the polarizing composite film and defect-free, normal polarizing sheets corresponding to defect-free or normal regions each having a size suitable for being laminated to each of a plurality of liquid-crystal panels, feeding these sheets by means of the carrier film by holding them in a releasable manner on the carrier film and during that time, automatically removing the defective polarizing sheets to allow only the normal polarizing sheets to be fed to the position for lamination with respective ones of the liquid-crystal panels, peeling the carrier film and registering the normal polarizing sheet with a corresponding one of the liquid-crystal panels, as described below. Specifically, it is an object of the present disclosure to provide means for feeding without interruption a continuous web of flexible optical film which includes a polarizing composite film and forming defective polarizing sheets and normal polarizing sheets corresponding respectively to defective and normal regions previously determined in the polarizing composite film based on the defects existing in the polarizing composite film having an adhesive layer for attachment to the liquid crystal panel, and removal means for removing the defective polarizing sheets before laminating the normal polarizing sheets to corresponding ones of the liquid-crystal panels, so as to realize an uninterrupted supply of the continuous web of optical film including the polarizing composite film. This makes it possible to significantly enhance the product accuracy and manufacturing speed and drastically improve the production yield, in the manufacture of liquid-crystal display elements.

The present disclosure is based on findings that solutions of the aforementioned technical problems can be achieved by a roll of an optical film laminate adapted for use in a continuous manufacturing system for a liquid-crystal display element, wherein the continuous manufacturing system comprises at least a reading unit, a slitting unit, a removal unit and a lamination unit, and adapted to perform, for each of a plurality of liquid-crystal panels being sequentially conveyed, a process comprising forming slit lines in a continuous web of optical film being continuously transported so as to correspond to the plurality of sequentially conveyed liquid-crystal panels, in a direction transverse to the feed direction of the continuous web with a slit depth corresponding to a part of an overall thickness of the continuous web, peeling a portion of the optical film which extends between two longitudinally adjacent slit lines defined at the upstream and downstream positions as seen in the feed direction and has a thickness corresponding to the slit depth, from the remaining portion of the optical film, to form a sheet of the optical film, and laminating the sheet to one of the opposite sides of corresponding one of the liquid-crystal panels, wherein the optical film comprises a polarizing composite film which includes a laminate of a continuous layer of a polarizer and a protective film laminated on at least one of the opposite surfaces of the continuous layer of the polarizer, and an adhesive layer provided on one of the opposite surfaces of the laminate, a carrier film being laminated in a releasable manner to the adhesive layer of the polarizing composite film, and wherein the polarizing composite film has defective regions and defect-free, normal regions, which have been previously defined based on locations or coordinate positions of defects existing in the polarizing composite film and detected by a preliminary inspection, the continuous web of optical film having encoded information recorded thereon, the encoded information including slit position information for specifying positions at which the respective slit lines are to be formed in the continuous web of optical film by the slitting unit of the continuous manufacturing system, based on the defective regions and the normal regions of the polarizing composite film, the encoded information being readable by the reading unit of the continuous manufacturing system, and wherein the present disclosure has the following features based on the aforementioned findings.

The present disclosure provides (1) a roll of an optical film laminate adapted for use in a continuous manufacturing system for a liquid-crystal display element (2) a method of producing a roll of optical film laminate for use in a continuous manufacturing system for a liquid-crystal display element (3) a system for producing a roll of an optical film laminate for use in a continuous manufacturing system for a liquid-crystal display element.

The present disclosure further provides a continuous manufacturing system comprising at least a reading unit, a slitting unit, a removal unit and a lamination unit, and adapted to perform, for each of a plurality of liquid-crystal panels being sequentially conveyed, a process comprising forming slit lines in a continuous web of optical film being continuously transported so as to correspond to the plurality of sequentially conveyed liquid-crystal panels, in a direction transverse to the feed direction of the continuous web with a slit depth corresponding to a part of an overall thickness of the continuous web, peeling a portion of the optical film which extends between two longitudinally adjacent slit lines defined at the upstream and downstream positions as seen in the feed direction and has a thickness corresponding to the slit depth, from the remaining portion of the optical film, to form a sheet of the optical film, and laminating the sheet to one of the opposite sides of corresponding one of the liquid-crystal panels, The optical film comprising a polarizing composite film which includes a laminate of a polarizer layer and a protective film laminated on at least one of the opposite surfaces of the continuous layer of the polarizer, and an adhesive layer provided on one of the opposite surfaces of the laminate, a carrier film being laminated in a releasable manner to the adhesive layer of the polarizing composite film, and wherein the polarizing composite film has defective regions and defect-free, normal regions, which has been previously defined based on locations or coordinate positions of defects existing in the polarizing composite film and detected by a preliminary inspection, the continuous web of optical film having encoded information recorded thereon, the encoded information including slit position information for specifying positions at which the respective slit lines are to be formed in the continuous web of optical film by the slitting unit of the continuous manufacturing system, based on the defective regions and the normal regions of the polarizing composite film, the encoded information being readable by the reading unit of the continuous manufacturing system.

The system for producing a roll of an optical film laminate for use in a continuous manufacturing system for a liquid-crystal display element comprising (a) a provisional-optical-film feed unit provided with a roll of the provisional optical film laminate and adapted to feed a provisional optical film from the roll of the provisional optical film laminate, said provisional optical film comprising a polarizing composite film including a laminate of a continuous layer of a polarizer and a protective film laminated on at least one surface of the continuous layer of the polarizer, and an adhesive layer provided on at least one surface of the laminate, said provisional optical film further including a provisional carrier film laminated on the adhesive layer of the polarizing composite film, (b) a provisional-carrier-film detaching unit adapted for detaching by winding the provisional carrier film from the provisional optical film supplied from the roll of the previously provided provisional optical film, and feeding the polarizing composite film with the adhesive layer in an exposed state, (c) a polarizing composite film inspection unit adapted to inspect surface and inside portions of the polarizing composite film which has been supplied with the adhesive layer in the exposed state, to detect a location or coordinate position of a defect existing in the polarizing composite film having the adhesive layer, (d) an optical-film forming unit including a lamination mechanism for laminating the polarizing composite film having said adhesive layer on said carrier film, said lamination mechanism being adapted to releasably laminate, through the adhesive layer, a carrier film supplied from a roll of the carrier film on said polarizing composite film in which the location or coordinate position of the defect in the polarizing composite film has been detected and which has the adhesive layer, to form a continuous web of an optical film, (e) an information processing device adapted for defining a defective region and a normal region in the polarizing composite film including the adhesive layer, based on the location or coordinate position of the detected defect existing in the polarizing composite film including the adhesive layer and, based on the defective and normal regions, produce encoded information including slit-position information indicative of positions at which the respective slit lines are to be formed in the continuous web of optical film by the slitting unit of the continuous manufacturing system, (f) an information recording unit adapted to record the produced encoded information on the continuous web of optical film, in a manner readable by the reading unit of the continuous manufacturing system, (g) a winding drive mechanism adapted, after the encoded information is recorded on the continuous web of optical film, to wind the continuous web of optical film into a roll to form a roll of the optical film laminate, and (h) a control unit adapted to control respective operations of at least the provisional-optical-film feed unit, the provisional-carrier-film detaching unit, the polarizing composite film inspection unit, the optical-film forming unit, the information processing device, the information recording unit and the winding drive mechanism, in an inter-related manner.

BRIEF DESCRIPTION OF THE DRAWINGS

The present disclosure is illustrated by way of example, and not by limitation, in the figures of the accompanying drawings in which elements having the same reference numeral designations represent like elements throughout and wherein:

FIG. 22 is a table showing an example of encoding and recording of positional information to an optical film, according to at least one embodiment;

FIG. 23 is a diagram showing an example of encoding of a slit-position information indicative of the position for forming a slit line in an optical film, in a technique of combining identification information or a defect-including information $X_\gamma$ in FIG. 19;

FIG. 25 is a diagram showing an example of encoding of a slit-position information indicative of the position for forming a slit line in an optical film, in a technique of modifying a distance to a next-slit-line formation position to $[(X'+X_0)/m]$, wherein m=2 or more, in FIG. 21;

FIG. 26 is a schematic diagram showing a manufacturing system for a roll of an optical-film laminate having two inspection units, according to the embodiment illustrated in FIG. 13;

FIG. 28 is a table showing a defect inspection device, a type of defect and a defect detection method.

EXPLANATION OF NUMERICAL CHARACTERS

Figure 1A:
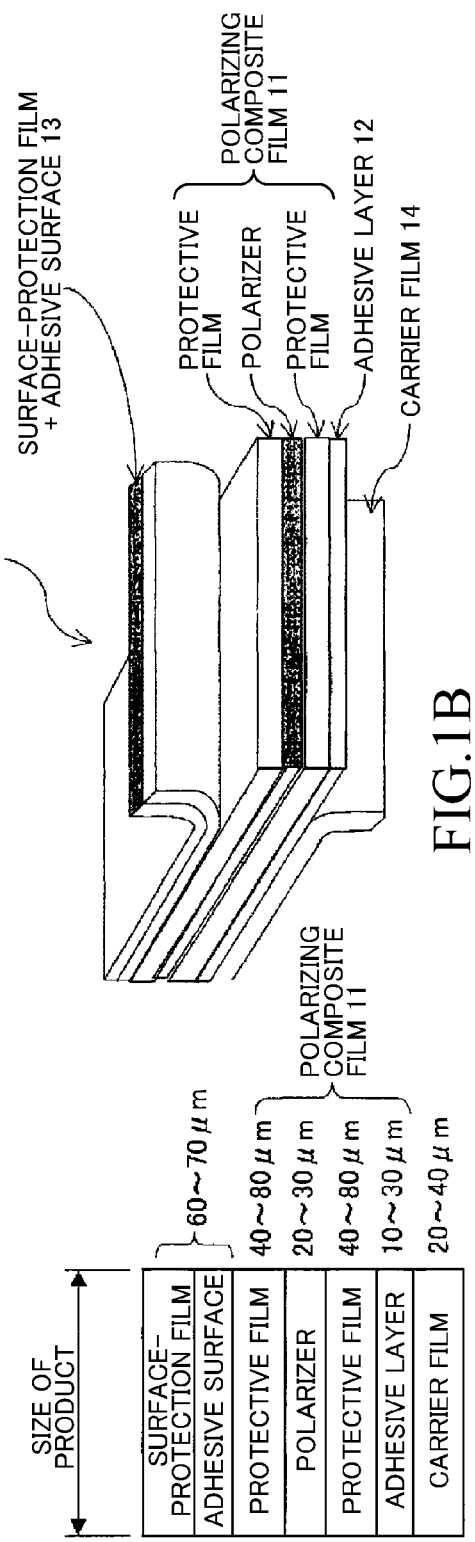
FIGS. 1A and 1B are schematic diagrams showing the structure of an optical film for use in manufacturing of a liquid-crystal display element according to at least one embodiment.

The following numerical characters are used throughout the description to refer to the following features 1: continuous manufacturing system for liquid-crystal display element
10: optical film laminate
10', 10": roll of provisional optical film laminate
11: polarizing composite film
11': polarizing sheet
12: adhesive layer
13: surface-protection film
13': provisional surface-protection film
14: carrier film
14': provisional carrier film
20: encoded information
100: optical-film feed apparatus
110: support rack
120: reading unit
130, 170: film feed unit
140: speed adjustment unit
150: slitting unit
160: slit-position checkup unit
190: defective polarizing sheet removal unit
200: lamination unit
210: carrier-film take-up drive mechanism
220: sheet-edge detection unit
230: straight-ahead-posture detection unit
300: liquid-crystal-panel conveyance apparatus
400: control unit
410: information processing device
420: storage device
500, 700, 800: manufacturing system for roll of optical film laminate
510: polarizer manufacturing line
520: protective film manufacturing line
525: polarizing composite film manufacturing line
530: lamination line or provisional-optical-film feed line
540: lamination drive mechanism
550: distance measurement device
560: inspection unit
570: carrier-film lamination mechanism
571: support rack
572: releasable-film take up drive mechanism
575. provisional-carrier-film peeling unit
576: provisional-carrier-film take up drive mechanism
580: optical-film take up drive mechanism
590: image-reading device
600: control unit
610: information processing device
620: storage device
630: information recording unit
640: surface-protection-film lamination mechanism
645: provisional surface-protection-film peeling unit
646: provisional surface-protection-film take up drive mechanism
710: provisional-optical-film feed unit
720: provisional-carrier-film take up drive mechanism
730: first inspection unit
731: second inspection unit
740: control unit
741: information processing device
742: storage device
750: carrier-film feed unit
760: carrier-film lamination mechanism
770: optical-film take up drive mechanism
780: information recording unit
810: provisional-optical-film feed unit
820: provisional-carrier-film take up drive mechanism
830: provisional-surface-protection-film take up drive mechanism
840: first inspection unit
850: second inspection unit
851: third inspection unit
852: fourth inspection unit
860: control unit
861: information processing device
862: storage device
870: provisional-surface-protection-film feed unit 880: carrier-film feed unit
890: lamination mechanism
891: carrier-film lamination mechanism
892: surface-protection-film lamination mechanism
910: optical-film take up drive mechanism
920: information recording unit

DETAILED DESCRIPTION

In the following detailed description, for purposes of explanation, numerous specific details are set forth in order to provide a thorough understanding of the disclosed embodiments. It will be apparent, however, that the disclosed embodiments may be practiced without these specific details. In other instances, well-known structures and devices are schematically shown in order to simplify the drawing.

Figure 1B:
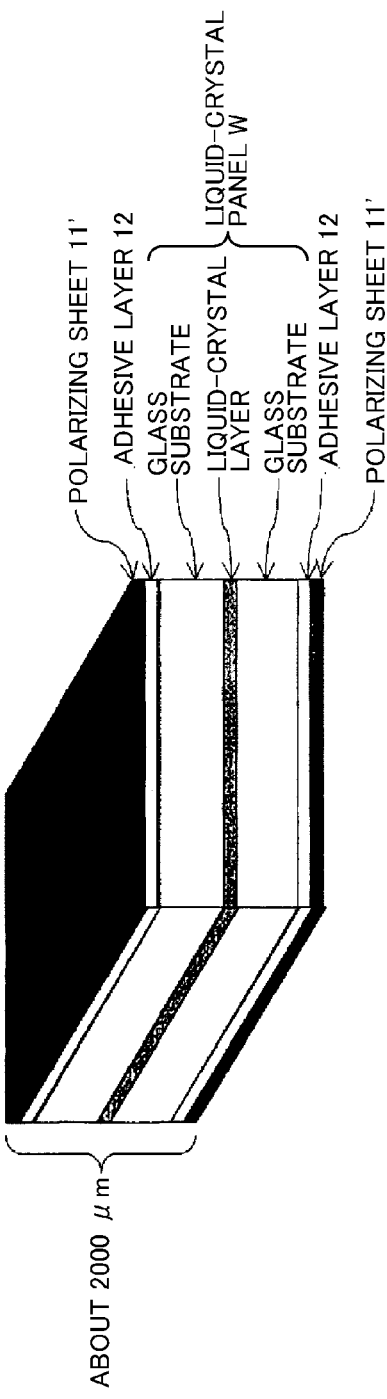

A widescreen television liquid-crystal display element, for example, for a diagonal screen size of 42 inches comprises a layered liquid-crystal panel W which includes a pair of rectangular-shaped substrates each having a size of between 540 to 560 mm in length, between 950 to 970 mm in width and about 0.7 mm (700 μm) in thickness, and a liquid-crystal layer having a thickness of about 5 μm having a transparent electrode, a color filter etc. that is sandwiched between the substrates, as shown in FIG. 1B. The liquid-crystal display element is typically has a polarizing sheet 11' commonly referred as "a polarizing plate" adhesively applied to a front side (viewing side) and a back side (backlight side) thereof. The polarizing sheet 11' is formed from a polarizing composite film 11 that is included in a flexible optical film laminate 10 of a laminated structure, as shown in the perspective view in FIG. 1A. The polarizing sheet 11' has a rectangular shape with a size of between 520 and 540 mm in length by between 930 and 950 mm in width, as shown in the perspective view in FIG. 1B. The liquid-crystal panel structure employed in the liquid-crystal display element is extremely thin having an overall thickness of about 1.4 mm (1400 μm).

According to the disclosed embodiments, although the substrates are usually formed from glass, this disclosure is not limited to glass substrates. Other materials such as plastics or composites made from various glass and plastic materials may be used to form either one or both of the substrates.

The optical film laminate 10 for use in forming the polarizing sheet to be laminated to the liquid-crystal panel W typically consists of a continuous web of flexible film which comprises the polarizing composite film 11, a surface-protection film 13 having an adhesive surface, and a carrier film 14. The polarizing composite film 11 includes protective films laminated on the opposite surfaces of the polarizer, and an acrylic adhesive layer 12 formed on the side of the polarizer which is to be laminated to the liquid-crystal panel W. The carrier film 14 is releasably laminated to the adhesive layer 12 to provide a function of protecting the exposed side of the adhesive layer 12. Typically, the polarizing composite film 11 is prepared by subjecting a PVA (polyvinyl alcohol)-based film having a thickness of about 50 to 80 μm to a dyeing treatment using iodine and a cross-linking treatment; subjecting the obtained PVA-based film to an orientation treatment based on stretching in a lengthwise or widthwise direction thereof to form a continuous polarizer layer having a thickness of 20 to 30 μm, laminating a protective film to one or each of the opposite surfaces of the formed continuous polarizer layer with an adhesive, and forming an acrylic adhesive layer 12 on one side of the polarizer to be laminated to the liquid-crystal panel W. Generally, a transparent TAC (triacetylcellulose)-based film having a thickness of about 40 to 80 μm is often used as the protective film for protecting the polarizer.

In the following description, the continuous polarizer layer will be simply referred as "polarizer".

According to the definition of terms in "SEMI (Semiconductor Equipment and Materials International) Draft Document" on "FPD Polarizing Films (Polarizing Films for Flat-Panel Display Elements) including liquid-crystal display elements", the term corresponding to the "polarizing film and layer" constituting an optical film for use in a liquid-crystal display element is referred as "films and layer composing polarizing films". Thus, the polarizing composite film 11 in the perspective view as shown in FIG. 1A is interpreted as corresponding to the "film composing polarizing film", and the polarizing sheet 11' in the perspective view as shown in FIG. 1B is interpreted as corresponding to the "polarizing composite film". Thus, it is preferable to apply the term "polarizing sheet" to the polarizing sheet 11', rather than the term "polarizing plate". In the following description, a film including a polarizer, a protective film laminated on one or both of opposite surfaces of the polarizer, and an adhesive layer formed on a side of the polarizer to be laminated to a liquid-crystal panel W, will be referred as a "polarizing composite film", and a sheet commonly called "polarizing plate", which is formed in a rectangular shape from the polarizing composite film, will be referred to as a "polarizing sheet".

With regard to the thickness of the polarizing composite film 11, a polarizer typically has a thickness of between 20 and 30 μm, and, in case where two protective films are laminated on respective opposite surfaces of the polarizer, the resulting laminate is increased in thickness by between 80 and 160 μm. Further, an adhesive layer 12 formed on one side of the polarizer to be laminated to a liquid-crystal panel W has a thickness of between 10 and 30 μm. The thickness of the polarizing composite film 11 is, therefore, increased to between 110 and 220 μm in total. The polarizing composite films 11 are laminated to respective ones of the front and back sides of the liquid-crystal panel W in such a manner that polarizing axes are set at an angle of 90 degrees to one another. Thus, for example, in manufacturing a liquid-crystal display element for a widescreen television having a diagonal screen size of 42 inches, assuming that a thickness of a liquid-crystal panel itself is about 1400 μm, and that the thickness of each of the polarizing composite films 11 is in the range of 110 to 220 μm, the liquid-crystal display element has an overall thickness of between 1620 and 1840 μm. This overall thickness is still 2.0 mm or less. Thus, the ratio of the thickness of the liquid-crystal element to the overall thickness of the liquid crystal panel W and the polarizing sheets 11' is between 10:1.5 and 10:3. If a polarizing composite film 11 having a protective film laminated on only one surface of the polarizer, and an adhesive layer 12 formed on the other surface of the polarizer is used, then the thickness of the polarizing composite film 11 itself can be reduced to 70 to 140 μm, so that an overall thickness of the resultant liquid-crystal display element is reduced to a range of between 1540 and 1680 μm. The ratio of the thickness of the liquid-crystal element to that of the liquid crystal panel W and the polarizing sheet 11' will then be in the range of between 10:1 and 10:2.

An optical film laminate 10 for use in a liquid-crystal display element has a structure as shown in the perspective view in the FIG. 1A. The structure of the optical film laminate 10 is briefly described below, in connection with a manufacturing process thereof. An adhesive surface of a surface-protection film 13 having a thickness of about 60 to 70 μm is releasably laminated to the surface of a polarizing composite film 11 devoid of an adhesive layer. A carrier film 14 is releasably laminated to the adhesive layer 12 provided on the surface of the polarizing composite film 11 to protecting the adhesive layer 12. Typically, a PET (polyethylene terephthalate)-based film is used for each of the surface-protection film 13 and the carrier film 14. During the manufacturing process of the liquid-crystal display element, the carrier film 14 generally serves as a carrying medium (carrier) for the polarizing composite film 11, as well as the means to protect the adhesive layer 12. A film having such functions will hereinafter be referred as a "carrier film". The thickness of the adhesive layer 12 is typically in the range of 10 to 30 µm. In a process of manufacturing a plurality of such liquid-crystal display elements, a continuous web of the optical film laminate 10 is continuously transferred and a plurality of slit lines are formed along transversely directed lines to a slit depth corresponding to a part of an overall thickness of the continuous web, such as a depth reaching the inner surface of the carrier film. The portion of the polarizing composite film 11 in the optical film laminate 10 between two adjacent slit lines at the upstream and downstream sides as seen in the feed direction of the continuous web (for example, the lines defined by cutting only through the polarizing composite film 11 while keeping the carrier film 14 uncut), is peeled to form the polarizing sheet 11', and the peeled polarizing sheet 11' is laminated in a sequential manner to one surface of one of a plurality of liquid-crystal panels W being sequentially conveyed The surface-protection film 13 and the carrier film 14 that protect the respectively the non-adhesive surface and the adhesive surface of the polarizing composite film 11 in the continuous web of optical film laminate 10 are so-called "manufacturing-process material" which are to be peeled and removed prior to the final stage of the manufacturing process of the liquid-crystal display element.

In the polarizing composite film 11, one of the protective films for protecting the polarizer may be replaced with a phase difference film made of a cycloolefin-based polymer, a TAC-based polymer or the like and having an optical compensation function. The protective films may further be provided as a layer of a transparent substrate, such as a TAC-based substrate, having a polymer material, such as a polyester-based polymer or a polyimide-based polymer applied/arranged thereto and then cured. Further, in the case of a polarizing composite film to be laminated to the backlight side of the liquid-crystal display element, it may be possible to provide an additional function by laminating a brightness enhancement film to the backlight side protective film of the polarizer. In addition, regarding the structure of the polarizing composite film 11, there have been proposed various other variations, such as a technique of laminating a TAC-based film to one of opposite surfaces of the polarizer and laminating a PET film to the other surface of the polarizer.

One of methods for providing a polarizing composite film 11 including a polarizer and a protective film laminated on one or both of opposite surfaces of the polarizer with an adhesive layer 12 for attaching to a liquid-crystal panel W, comprises laminating a carrier film 14 having a transferable adhesive layer formed thereon, to the surface of the polarizing composite film 11 to be laminated to the liquid-crystal panel W. A specific transfer technique is as follows. In a manufacturing process of the carrier film 14, the carrier film is subjected to a releasing treatment at the surface which is to be laminated to the polarizing composite film 11 at the surface of the polarizing composite film 11 which is to be laminated to the liquid-crystal panel W, and then a solvent containing adhesive is applied to the treated surface and dried to form an adhesive layer on the carrier film 14. Then, the carrier film 14 having the previously formed adhesive layer 12 is laminated to the polarizing composite film 11, for example, while continuously feeding the carrier film 14 unrolled from a carrier film roll and feeding the polarizing composite film 11 in the same manner, so that the adhesive layer formed on the carrier film 14 can be transferred to the polarizing composite film 11. It is understood that the adhesive layer 12 may be formed by directly applying an adhesive containing solvent to the surface of the polarizing composite film 11 to be laminated to the liquid-crystal panel W, and drying the same.

The surface-protection film 13 typically has an adhesive surface layer. Unlike the adhesive layer on the polarizing composite film 11, the adhesive surface layer must be peeled off the polarizing sheet 11' together with a sheet (not shown) of the surface-protection film 13 when the sheet of the surface-protection film 13 is peeled off the polarizing sheet 11' during the manufacturing process of the liquid-crystal display elements. The reason is that the sheet of the surface-protection film 13 is provided for protecting the surface of the polarizing sheet 11', but not for providing an adhesive surface to the polarizing sheet 11'. The perspective view as shown in FIG. 1B shows the state after the sheet of the surface-protection film 13 is peeled and removed. It should further be noted that, irrespective of whether the polarizing composite film 11 has a surface-protection film laminated thereon, it may be possible to provide the polarizing composite film 11 at the surface of the protective film on the front side of the polarizing composite film with a hard coat treatment for protecting the outermost surface of the liquid-crystal display element, and/or a surface treatment for obtaining an anti-glare effect or the like, such as an anti-glare treatment.

I. Continuous Manufacturing System and Method for Liquid-Crystal Display Element
(General Description of a Continuous Manufacturing System for Liquid-Crystal Display Element)

Figure 5:
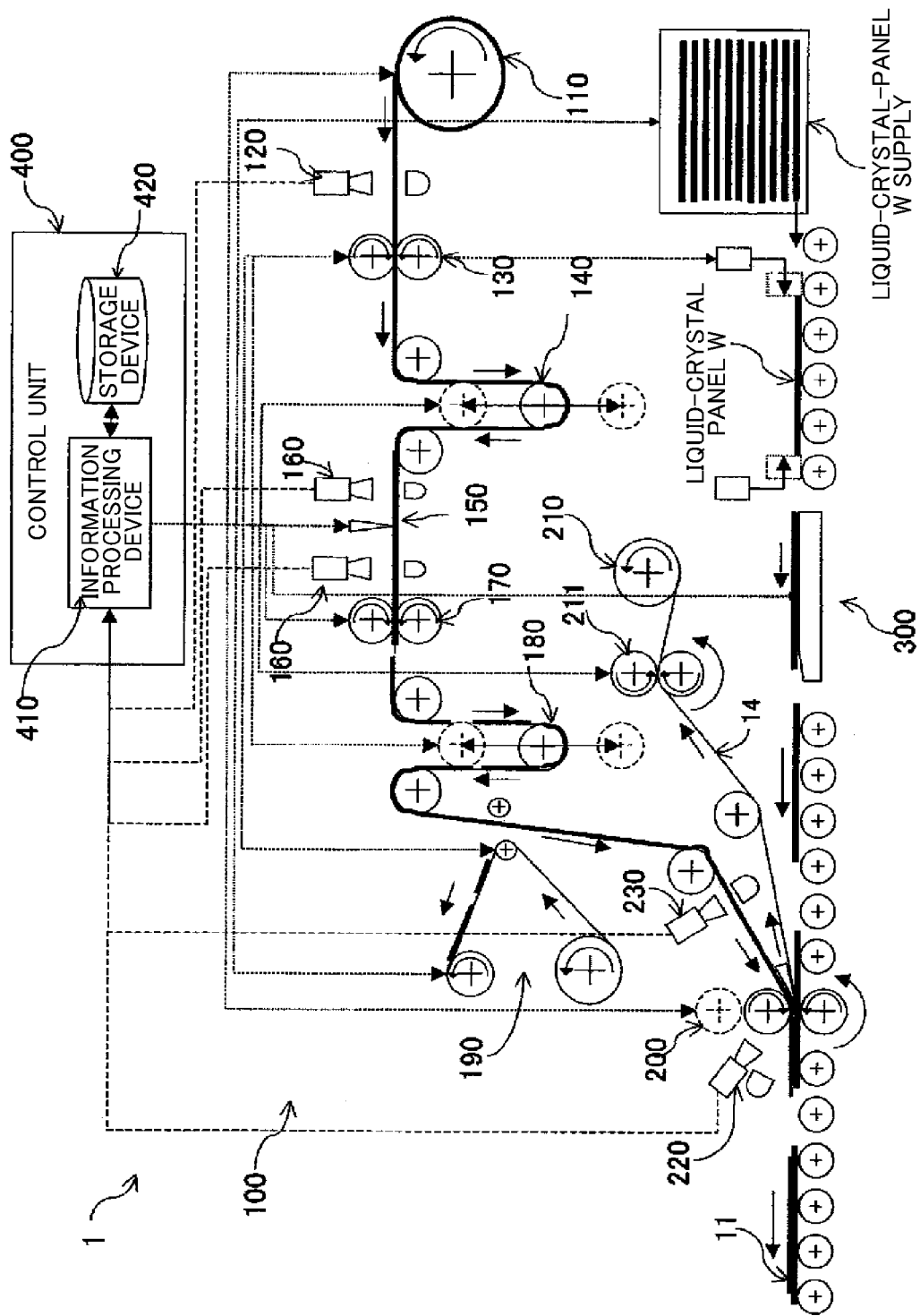
FIG. 5 is a conceptual diagram showing a continuous manufacturing system for liquid-crystal display elements according to one embodiment, wherein the system comprises an optical-film feed apparatus for feeding a continuous web of optical film from a roll of the optical film laminate, and a liquid-crystal-panel conveyance apparatus for conveying a liquid-crystal panel to be laminated with a normal polarizing sheet of a polarizing composite film cut by forming slit lines in the continuous web of optical film being fed.
Figure 6:
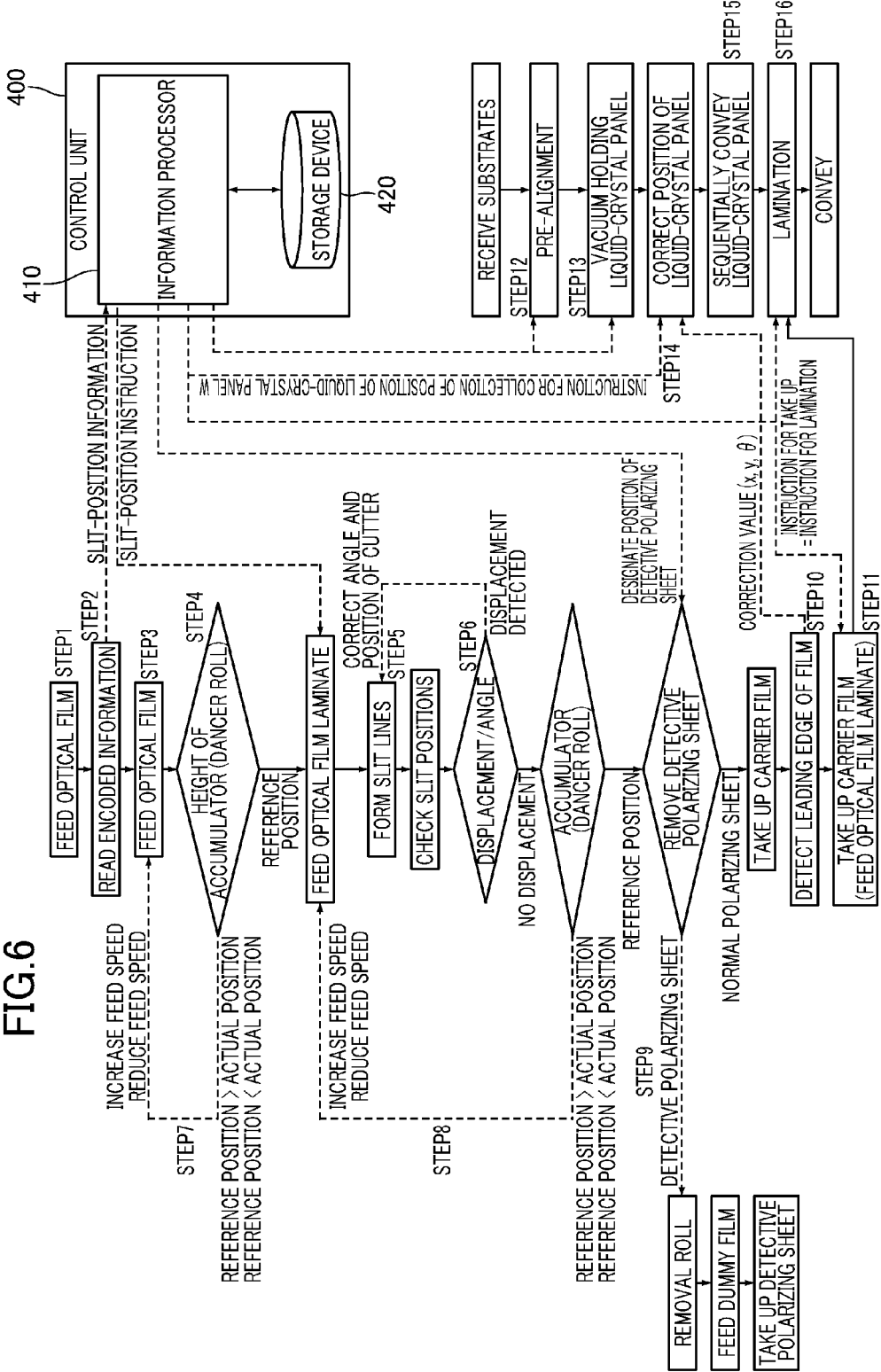
FIG. 6 is a flow chart showing a manufacturing process or process steps in the continuous manufacturing system of liquid-crystal display elements in FIG. 5.

FIG. 5 is a schematic diagram showing a continuous manufacturing system for liquid-crystal display element 1 which comprises an optical-film feed apparatus 100 having a roll of an optical film laminate for manufacturing liquid-crystal display elements according to at least one embodiment, and a liquid-crystal-panel conveyance apparatus 300 for conveying liquid-crystal panels to be laminated with normal polarizing sheets formed from a continuous web of the optical film fed from the roll. FIG. 6 is a flowchart showing a manufacturing process or process steps in the continuously manufacturing system for liquid-crystal display element 1 illustrated in FIG. 5.

The optical-film feed apparatus 100 comprises a support rack 110 for rotatably mounting a roll of optical film laminate 10 according to at least one embodiment, a reading unit 120 for reading encoded information, a film feed unit 130 including a feed roller, a speed adjustment unit 140 including a dancer roller for providing a constant speed film feeding, a slitting unit 150 for forming slits in the continuous web of optical film in a direction transverse to the feed direction of the continuous web with a depth reaching the inner surface of the carrier film to form slit lines, a slit-position checkup unit 160 for checking the formed slit lines, a film feed unit 170 including a feed roller, a speed adjustment unit 180 including a dancer roller for providing a constant speed feeding, a defective polarizing sheet removal unit 190 for peeling and removing a slit defective polarizing sheet from the carrier film, a lamination unit 200 including a pair of lamination rollers for applying a normal polarizing sheet which has been slit and peeled from the carrier film to a liquid-crystal panel, a carrier-film take-up mechanism 210 for taking up the carrier film, a sheet-edge detection unit 220 for detecting a leading edge of the optical film at a lamination position, and a straight-ahead-posture detection unit 230 for detecting an alignment with a feed direction of the normal polarizing sheet formed by slit lines in the continuous web of optical film.

(Provisions of the Roll of Optical Film Laminate 10)

It is preferable that the roll of optical film laminate 10 according to this embodiment installed in the optical-film feed apparatus 100 has a width approximately equal to a length of a long or short side of a liquid-crystal panel to which it is applied. It is preferable that a transparent protective film is used for the protective film laminated on one or each of the opposite surfaces of the polarizer as shown in the schematic diagram of FIG. 1. The roll of optical film laminate 10 comprises a roll of optical film laminate comprising a continuous web of optical film comprised of a polarizing composite film 11 including a polarizer having an adhesive layer 12 provided on the surface of the polarizer which has a transparent protective film laminated thereon and which is to be attached to a liquid-crystal panel, a surface-protection film 13 having an adhesive surface which is releasably laminated on the surface of the polarizing composite film 11 opposite to the surface having the adhesive layer 12, and a carrier film 14 releasably laminated on the adhesive layer 12 of the polarizing composite film 11. The carrier film 14 is a releasable film adapted to protect the adhesive layer 12 of the polarizing composite film 11 during the manufacturing process of liquid-crystal display elements and to be removed by being taken up when the polarizing sheet formed in the continuous web of optical film is peeled off prior to or during lamination process for attaching the polarizing sheet to the liquid-crystal panel. In this embodiment, the term "carrier film" is used because the film has a function of carrying the normal polarizing sheets in the optical film laminate 10 to the laminating position.

Figure 3:
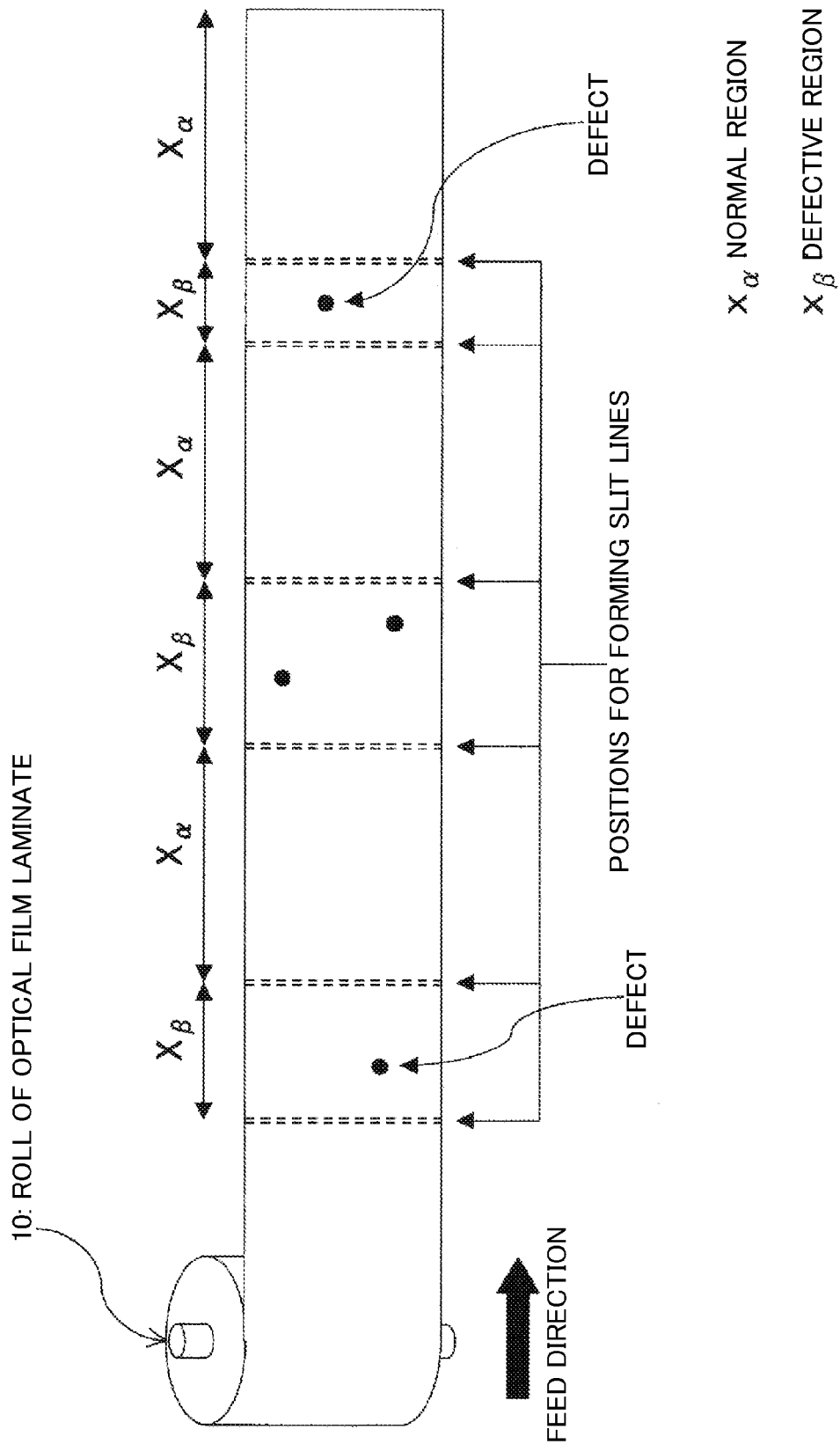
FIG. 3 is a schematic diagram showing defective regions including defects existing in an optical film for use in a liquid-crystal display element, and normal regions having no defect according to at least one embodiment.
Figure 4:
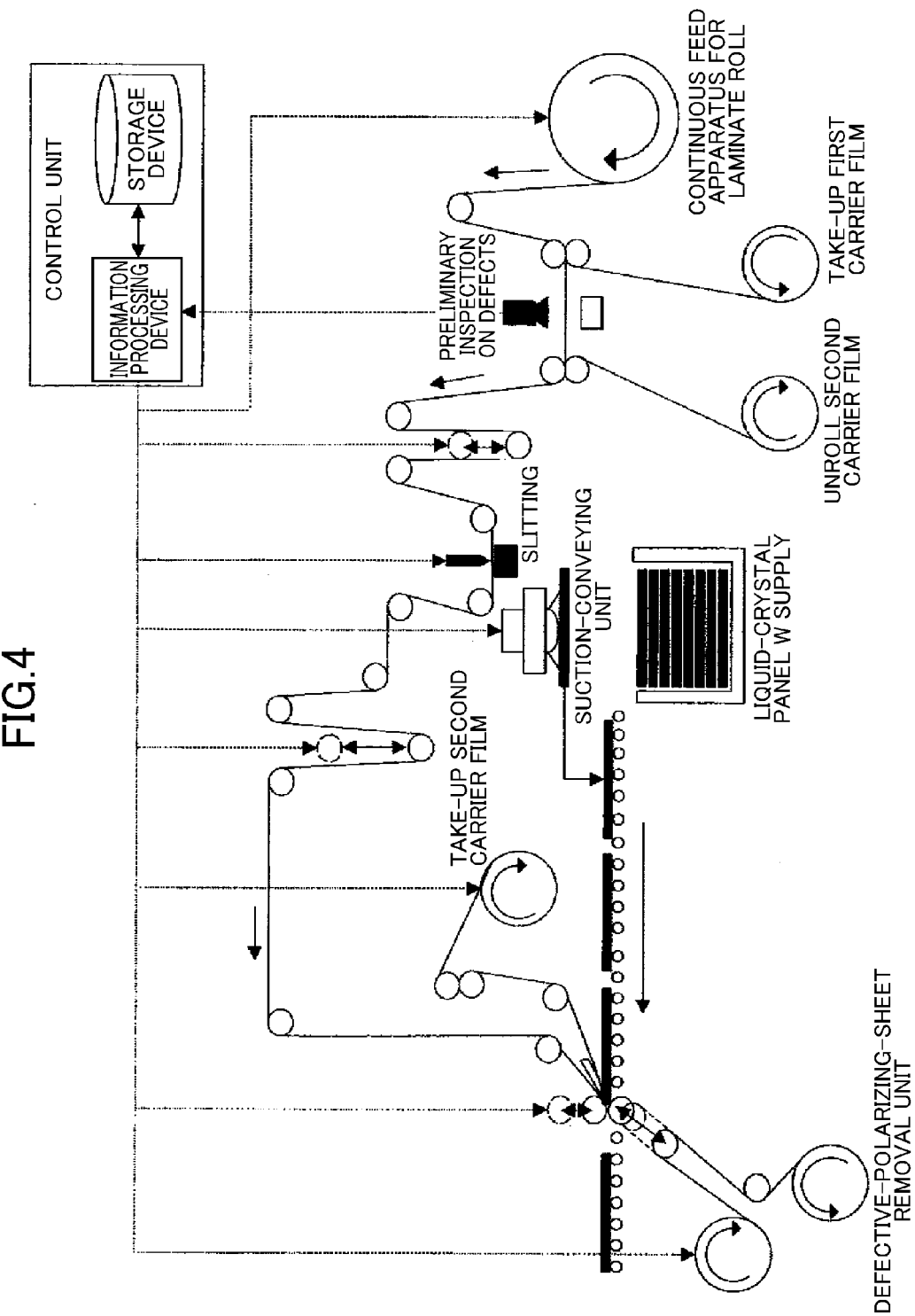
FIG. 4 is a conceptual diagram showing a system for continuously manufacturing liquid-crystal display elements wherein polarizing sheets are laminated on liquid-crystal panels through inspection of defects in the polarizing composite films, without interrupting the feed of continuous web of the optical film being fed.

The roll of optical film laminate 10 is formed as follows. Details of the manufacturing method for the roll of optical film laminate 10 will be described below. During the manufacturing process of the roll of optical film laminate 10, defects existing in the polarizing composite film 11 are first detected in the continuous web of optical film being continuously fed using an inspection unit. Then, based on the detected locations or coordinate positions of the defects in the polarizing composite film 11, defective regions and defect-free, normal regions are defined in the polarizing composite film 11 as shown in FIG. 3. Then, information including slit-position information, and optionally identification information for identifying the defective regions and the normal regions is recorded on the continuous web of optical film being continuously fed. The slit-position information is provided for indicating the positions at which respective ones of the slit lines are to be formed in the continuous web of optical film, and the slit lines are formed in pairs by the slitting unit 150 of the continuous manufacturing system 1 based on the defective and normal regions of the polarizing composite film 11, during the manufacturing process of liquid-crystal display elements, in a manner as to slit the continuous web of optical film being fed in a direction transverse to the feed direction of the web to a depth reaching the inner surface of the carrier film so that slit lines are formed at upstream and downstream positions as seen in the feed direction. The information including the slit-position information and the optional identification information to be recorded on the continuous web of optical film is encoded information created together with or in association with additional information, such as information relating to the manufacturing lot and the length of the web in the roll. Preferably, the encoded information is recorded on the carrier film 14 in the continuous web of optical film to be continuously fed. It is to be understood that the encoded information may be recorded on the carrier film 14 in any of variety of modes, such as a mode in which encoded information including all necessary information is recorded at a single location, or a mode in which a plurality of encoded information each including different information is recorded on a plurality of storage locations at given intervals (e.g., at intervals of 1 m or 100 m). The encoded information may be recorded on the surface-protection film 13, instead of the carrier film 14. In either case, the encoded information is configured to be readable by the reading unit 120 of the continuous manufacturing system 1.

The slitting unit 150 provided in the continuous manufacturing system for liquid-crystal display element 1 having the roll of optical film laminate 10 mounted thereon is operated, during the manufacturing process of the liquid crystal display element, by having the measurement data on an optical-film feed-out distance calculated when the continuous web of optical film is unrolled from the roll of optical film laminate 10 related with the slit-position information included in the encoded information and read by the reading unit 120 of the continuous manufacturing system 1. The region of the polarizing composite film defined by adjacent two slit lines may include a defect-free, normal region having a give length determined by the length of a side of a liquid-crystal panel to be laminated with the polarizing composite film, and a defective region having a length generally less than the given length. During the manufacturing process of the liquid-crystal display element, the defective region of the polarizing composite film 11 which is cut along pairs of slit lines by means of the slitting unit 150 is defined as a defective polarizing sheet $X_\beta$ which is to be removed from the continuous web of optical film (specifically, the carrier film 14) by the defective polarizing sheet removal unit 190 of the continuous manufacturing system 1. The normal region of the polarizing composite film 11 is cut in the same manner and defined as a normal polarizing sheet $X_\alpha$ which is peeled off from the continuous web of optical film (specifically, the carrier film 14) and laminated to one of opposite surfaces of a liquid-crystal panel by means of the lamination unit 200 of the continuous manufacturing system 1.

In the manufacturing process of a roll of optical film laminate 10, the normal region is previously defined in accordance with the locations or the coordinate positions of defects in the polarizing composite film 11 as described below, and the length ($X_\alpha$) of the normal region is determined to a constant value in accordance with the length of one of the sides of the liquid-crystal panel which is to be laminated with the normal polarizing sheet. Similarly, with respect to the defective region, the upstream side slit line for defining the defective region is defined by the downstream side slit line defining the normal region which is located immediately upstream side of the defective region, as seen in the feed direction of the web. Thus, the length ($X_\beta$) of the defective region is determined by the upstream side slit line and a downstream side slit line which is formed slightly downstream side of the location or coordinate position of a defect. Because the length between the upstream slit line of the defective region and the location or coordinate position of defects may not be fixed, the length ($X_\beta$) of the defective region varies accordingly. In accordance with at least one embodiment, the length ($X_\beta$) of the defective region is determined by information processing, when a processing is carried out for determining the slit position information which designates the position at which the slit line is to be formed, so that it is always different from the length ($X_\alpha$) of the normal region, e.g., to establish the relationship $X_\beta < X_\alpha$, in any case. In accordance with another embodiment, it may be possible that information $X_\gamma$ is produced to identify the defective region over the normal region, when the length ($X_\beta$) of the defective region becomes equal to the length ($X_\alpha$)

of the normal region. In this case, the produced identification information $X_\gamma$ is incorporated into the encoded information together with and in association with the slit-position information. It may be possible that the continuous manufacturing system 1 is configured such that, during the manufacturing process of liquid-crystal display elements, the slitting unit 150 of the continuous manufacturing system for liquid-crystal display elements 1 functions to form the normal polarizing sheet $X_\alpha$ and the defective polarizing sheet $X_\beta$ according to the slit-position information read by the reading unit 120 of the continuous manufacturing system 1, and the defective polarizing sheet removal unit 190 of the continuous manufacturing system 1 functions to readily discriminate and remove only defective polarizing sheets having lengths ($X_\beta$) different from the length ($X_\alpha$) of the normal region. In case where the encoded information includes the identification information $X_\gamma$ for identifying the defective region over the normal region, the defective polarizing sheet removal unit 190 of the continuous manufacturing system 1 functions, based on the identification information, to discriminate and remove only defective polarizing sheets.

The roll of optical film laminate 10 is mounted on the support rack 110 of the optical-film feed apparatus 100. Preferably, the support rack 110 is provided with an encoder (not shown) for determining the feed-out distance of the continuous web of optical film, the measurement data obtained by the encoder is stored in a storage device 420 of a control unit 400. Alternatively, a measurement device may additionally be provided in the optical-film feed apparatus 100 for calculating the feed-out distance of the continuous web of optical film.

In operation of the entire continuous manufacturing system 1, a roll of dummy film is first installed on the continuous manufacturing system for liquid-crystal display element 1. A continuous web of dummy film is fed from the roll of dummy film under tension by means of first and second film feed units 130, 170 each including feed rollers. The continuous web of dummy film is advanced until its leading edge reaches a position where, under a normal operation, the normal polarizing sheet $X_\alpha$ is peeled off from the carrier film 14, the carrier film 14 from which the normal polarizing sheet is peeled off is passed through the lamination unit 200 and taken up by the carrier-film take-up drive mechanism 210. Then, the trailing end of the continuous web of dummy film is connected to the leading end of the continuous web of optical film, and a feed of the continuous web of optical film is initiated. In order to allow the continuous web of optical film to be fed at a constant speed under tension even if the feed of the continuous web of optical film is temporarily stopped at a position where the slit lines are formed in the polarizing composite film by the slitting unit 150 of the continuous manufacturing system 1 or at a lamination position where the normal polarizing sheet $X_\alpha$ is laminated to a liquid-crystal panel, there are provided first and second speed adjustment units 140, 180 each including the aforementioned dancer rollers immediately before these positions.

In the continuous manufacturing system for liquid crystal display element 1, assuming that a single roll of optical film laminate 10 includes 1000 meters of length of the web of the laminate for example, and the production capacity of the continuous manufacturing system 1 amounts to of the order of 5,000 to 20,000 meters a day, a single such continuous manufacturing system 1 will be operated by being sequentially connected with 5 to 20 rolls of the optical film laminate in a day. In this case, it can be said that the continuous manufacturing system 1 using the roll of the optical film according to this embodiment makes it possible to enhance product accuracy and double the manufacturing speed. If a plurality of liquid-crystal panels W can be sequentially fed without any problem, the number of the rolls of the optical film laminate to be handled will increase significantly, which gives rise to a new technical need for automatic replacement of the roll of the optical film laminate (Reading and Information Processing of Encoded Information)

In this embodiment, the normal polarizing sheet of the polarizing composite film 11 cut along two adjacent slit lines in the continuous web of optical film is peeled off from the carrier film 14 immediately before the lamination unit 200, and the normal polarizing sheet having the exposed adhesive layer 12 is laminated to a liquid-crystal panel by the adhesive layer 12. During this process, the carrier film 14 is taken up by the carrier-film take-up drive mechanism 210. Generally, the surface-protection film 13 is made to be a sheet configuration which is held together with the normal polarizing sheet of the polarizing composite film 11 which is to be laminated to a liquid-crystal panel, and the sheet of the surface-protection film is peeled and removed after the final step including cleaning/drying is carried out on the liquid-crystal display element to be produced. Both of the carrier film and the surface-protection film are manufacturing-process materials required for carrying out the process, but are removed in the final stage of the manufacturing process and discarded. Thus, it is one of the features of the roll of optical film laminate 10 in accordance with this embodiment to use such a manufacturing-process material as an information storing medium necessary for the manufacturing process. In the followings, description will solely be made with regard to an example wherein only the carrier film is utilized as a manufacturing-process material used for the information storing medium.

Figure 7:
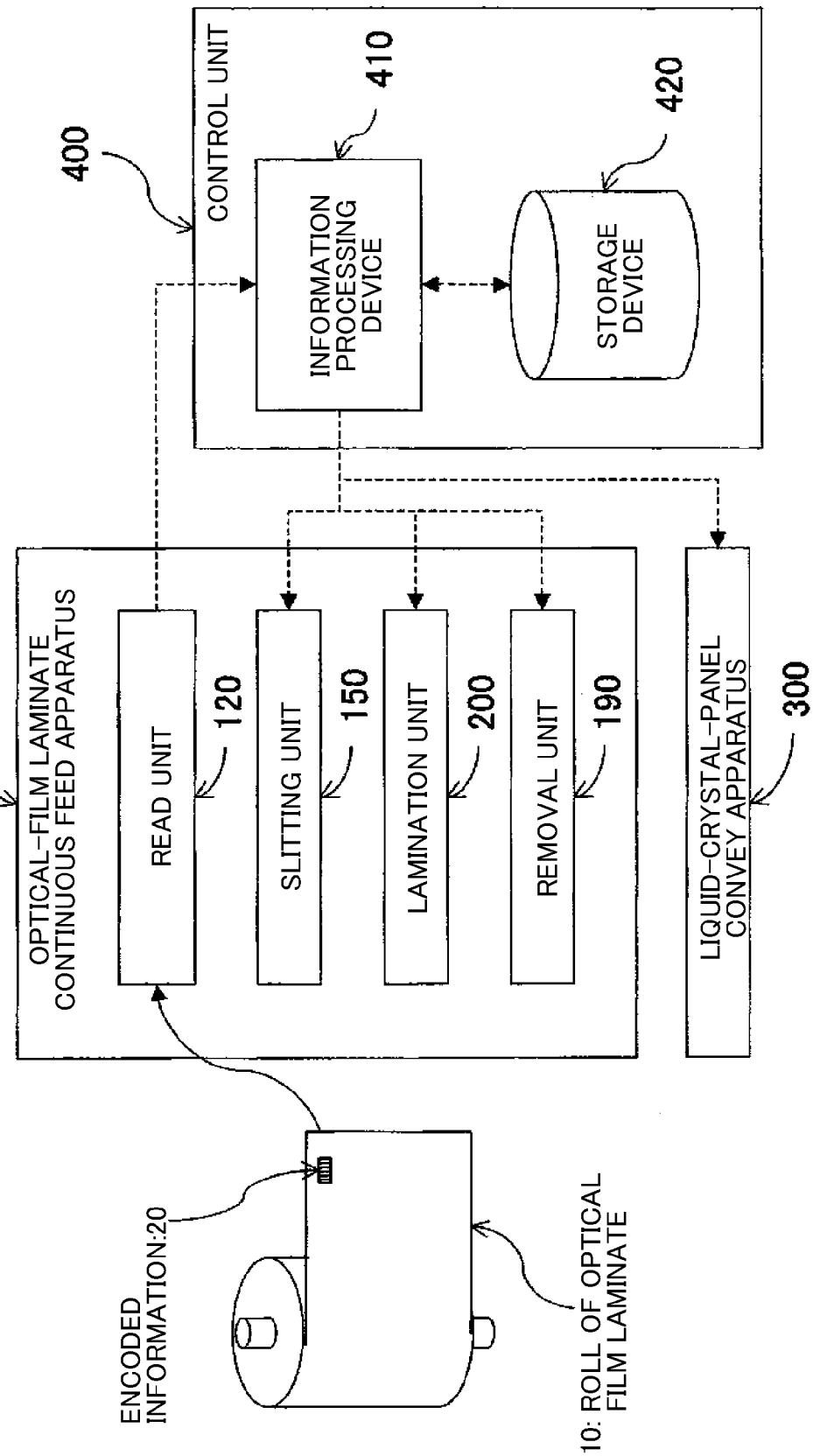
FIG. 7 is a schematic diagram showing the relationship between a control unit for controlling device of the optical-film feed apparatus and the liquid-crystal-panel conveyance apparatus illustrated in FIG. 5, and encoded information read by a reading unit and processed by an information processing device in the continuous manufacturing system for liquid-crystal display elements, according to at least one embodiment.

FIG. 7 is a schematic diagram showing a relation between the encoded information 20 to be read by the reading unit 120 of the continuous manufacturing system 1 and processed by an information processing device 410, and the previously described control unit 400 for controlling each of the units respectively provided in the optical-film feed apparatus 100 (see FIG. 5) and the liquid-crystal-panel conveyance apparatus 300 (see FIG. 5) for sequentially conveying the liquid-crystal panels. In this case, the encoded information 20 recorded in the roll of optical film laminate 10 includes the slit position information indicative of positions where the respective slit lines are to be formed in the continuous web of optical film, and optionally identification information for identifying defective regions and normal regions. During the manufacturing process of the roll of optical film laminate 10, the continuous web of optical film laminate 10 is continuously fed, and defects existing in the polarizing composite film 11 included in the continuous web of optical film laminate 10 are detected by the inspection unit to determine defective and normal regions in the polarizing composite film 11 based on the locations or the coordinate positions of the detected defects, whereby the slit lines are formed in pairs by the slitting unit 150 of the continuous manufacturing system 1, base on the defective and normal regions of the polarizing composite film 11, during the manufacturing process of liquid-crystal display elements, so that the continuous web of optical film is slit in a direction transverse to the feed direction thereof at the two adjacent positions or the upstream and downstream positions in the feed direction to a depth reaching the inner surface of the carrier film.

As shown in FIG. 7, the encoded information 20 is recorded on the continuous web of optical film, preferably on the carrier film. The recorded encoded information 20 is read by the reading unit 120 including a code reader or a CCD camera, and the encoded information 20 read in this manner is transmitted to the information processing device 410 included in the control unit 400 of the continuous manufacturing system 1. As is clear from the control of each unit and the manufacturing process flow illustrated in FIGS. 5 and 6, and the schematic diagram of FIG. 7, the encoded information 20 read by the reading unit 120 is transmitted to the information processing device 410, and then the information processing device 410 functions to appropriately process the received encoded information 20. The control unit 400 is also operable, based on the encoded information 20 processed by the information processing device 410, to systematically control respective units included in the liquid-crystal-panel conveyance apparatus 300, and the optical-film feed apparatus 100, such as the slitting unit 150, the defective polarizing sheet removal unit 190 and the lamination unit 200, in an inter-related manner.

The outline of the control of the entire system will be described below. Based on the slit-position information included in the processed encoded information, the control unit 400 functions to control the operation of the film feed unit 130 including the feed rollers to feed the continuous web of optical film and then control the operation of the first speed adjustment unit 140 to temporarily stop the feed of the continuous web of optical film. Then, the control unit 400 functions to control the operation of the slitting unit 150 to form slits in the continuous web of optical film in a direction transverse to the feed direction of the continuous web of optical film at the two adjacent positions or the upstream and downstream positions in the feed direction to a depth reaching the inner surface of the carrier film 14, to form a plurality of slit lines in the continuous web of optical film.

The continuous web of optical film having the slit lines formed thereon is transported to the slit-position checkup unit 160 where the slit line positions on the web are confirmed. Then, the defective polarizing sheets and the normal polarizing sheets formed by the slit lines in the continuous web of optical film are identified or discriminated from each other, for example, based on the difference in length, at the defective polarizing sheet removal unit 190 inter-related with the film feed unit 170 including feed rollers and the speed adjusting unit 180, and only the defective polarizing sheets are peeled and removed from the carrier film 14. In the case where encoded information includes the identification information for identifying the defective polarizing sheets and the normal polarizing sheets, it is possible for the defective polarizing sheet removal unit 190 to peel and remove only the defective polarizing sheets from the carrier film 14 based on the identification information. The continuous web of optical film from which the defective polarizing sheets are removed is then transported by the carrier-film take-up drive mechanism 210, in synchronization with the feed of the liquid-crystal panels being sequentially conveyed. The carrier film 14 is taken up at a position where the leading edge of the normal polarizing sheet defined by the slit lines in the polarizing composite film reaches the leading edge of the conveyed liquid-crystal panel, where the normal polarizing sheet is peeled off and the lamination unit 200 including the pair of lamination rollers starts laminating operation to attach the normal polarizing sheet to a corresponding one of the liquid-crystal panels.

The manufacturing process of liquid crystal display elements will now be described with respect to specific operations of the respective units operated by the control unit 400, including the laminating operation of the lamination unit 200 to attach the normal polarizing sheet to a corresponding one of the liquid-crystal panels.

(Removal of Defective Polarizing Sheet)

Figure 8:
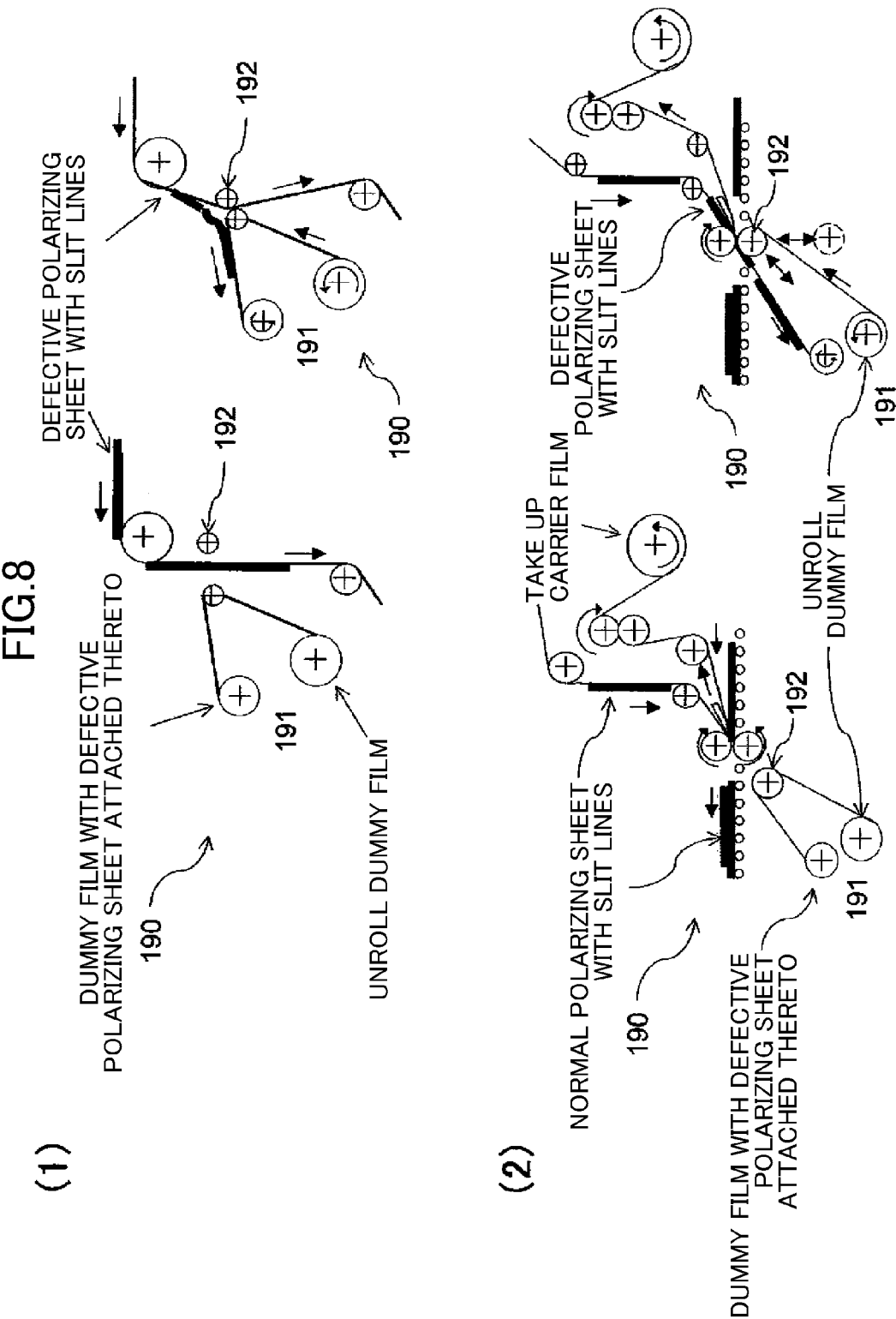
FIG. 8 is a schematic diagram showing a defective-polarizing-sheet removal unit comprising (1) a dummy-film drive mechanism disposed in a feed passage for an optical film or (2) a dummy-film drive mechanism adapted to be moved in and away from a gap between a pair of lamination rollers movable closer to and away from each other, in continuous manufacturing system for liquid-crystal display elements, according to at least one embodiment.

The defective polarizing sheet removal unit 190 is operated under the control of the control unit 400 to identify or discriminate only the defective polarizing sheet $X_\beta$ having a length different from that of the normal polarizing sheet $X_\alpha$, or only the defective polarizing sheet $X_\beta$ associated with identification information indicating that sheet as a defective polarizing sheet, from the carrier film 14 on which the normal polarizing sheets $X_\alpha$ and the defective polarizing sheets $X_\beta$ of the polarizing composite film 11 formed by the slit lines are laminated in a releasable manner in the continuous web of optical film, and peel and remove only the defective polarizing sheet $X_\beta$ from the carrier film 14. FIGS. 8(1) and 8(2) show such defective polarizing sheet removal units 190 adapted, under control of the control unit 400, to identify or discriminate only the defective polarizing sheets $X_\beta$.

The defective polarizing sheet removal unit 190 in FIG. 8(1) comprises a dummy-film drive mechanism 191 having a function of releasably attaching to thereon and peeling off the defective polarizing sheet $X_\beta$ from the carrier film 14, and a swing mechanism 192 adapted to be activated when the defective polarizing sheet $X_\beta$ reaches a position in a feed path where removal of the defective sheet is to be initiated, wherein the swing mechanism 192 is adapted to swingably move the feed path of the optical film so that the feed path of the optical film is moved toward and away from the dummy-film feed path of the dummy-film drive mechanism 191.

The defective polarizing sheet removal unit 190 in FIG. 8(2) is configured, under control of the control unit 400, to be moved in an inter-related manner with the lamination unit 200 including the pair of lamination rollers, and comprises a dummy-film drive mechanism 191 having a function of releasably attaching to thereon and peeling off the defective polarizing sheet $X_\beta$, and a swing roller 192 defining a dummy-film feed path of the dummy-film drive mechanism 191. The defective polarizing sheet removal unit 190 in FIG. 8(2) is different from the defective polarizing sheet removal unit 190 in FIG. 8(1) in that, in the defective polarizing sheet removal unit 190 in FIG. 8(2), the swing roller defining the dummy-film feed path is disposed adjacent to the pair of lamination rollers of the lamination unit 200, and adapted to be moved in an inter-related manner with the lamination rollers of the lamination unit 200. More specifically, when the defective polarizing sheet $X_\beta$ reaches the end position (i.e., the removal initiation position) of the feed path of the optical film in the lamination unit 200, the pair of lamination rollers are moved apart from each other, and the swing roller 192 forming the dummy-film feed path is moved to the gap between the lamination rollers located in spaced-apart relation. In this instance, the carrier film 14 is taken up by the carrier-film take-up drive mechanism 210, and the defective polarizing sheet $X_\beta$ peeled from the taken up carrier film 14 is attached to the swing roller.

(Checkup of Slit Lines in the Continuous Web of Optical Film)

In the manufacturing process of the continuous web of optical film laminate 10, there are previously defined two regions comprising the normal region having no defect and the defective region having a defect or defects, based on the locations or coordinate positions of defects existing in the inspected polarizing composite film 11, and based on such regions, the continuous web of optical film unrolled from the laminate roll has the slit-position information which is in the form of an encoded information 20, the slit-position information being indicative of the positions at which the slit lines are to be formed in the continuous web of optical film being continuously fed during the manufacturing process of liquid-crystal display elements. The slit-position information is read by the reading unit 120 during the manufacturing process of liquid-crystal display elements, and the slitting unit 150 functions, based on the read slit-position information, to form the slit lines in the continuous web of optical film in the direction transverse to the feed direction. It is apparent that, if the slit lines are not accurately formed, it will become meaningless to control the operation of the slitting unit 150 in association with the measurement data about the optical-film feed-out distance measured during transportation of the continuous web of optical film from the roll of optical film laminate 10.

Figure 9:
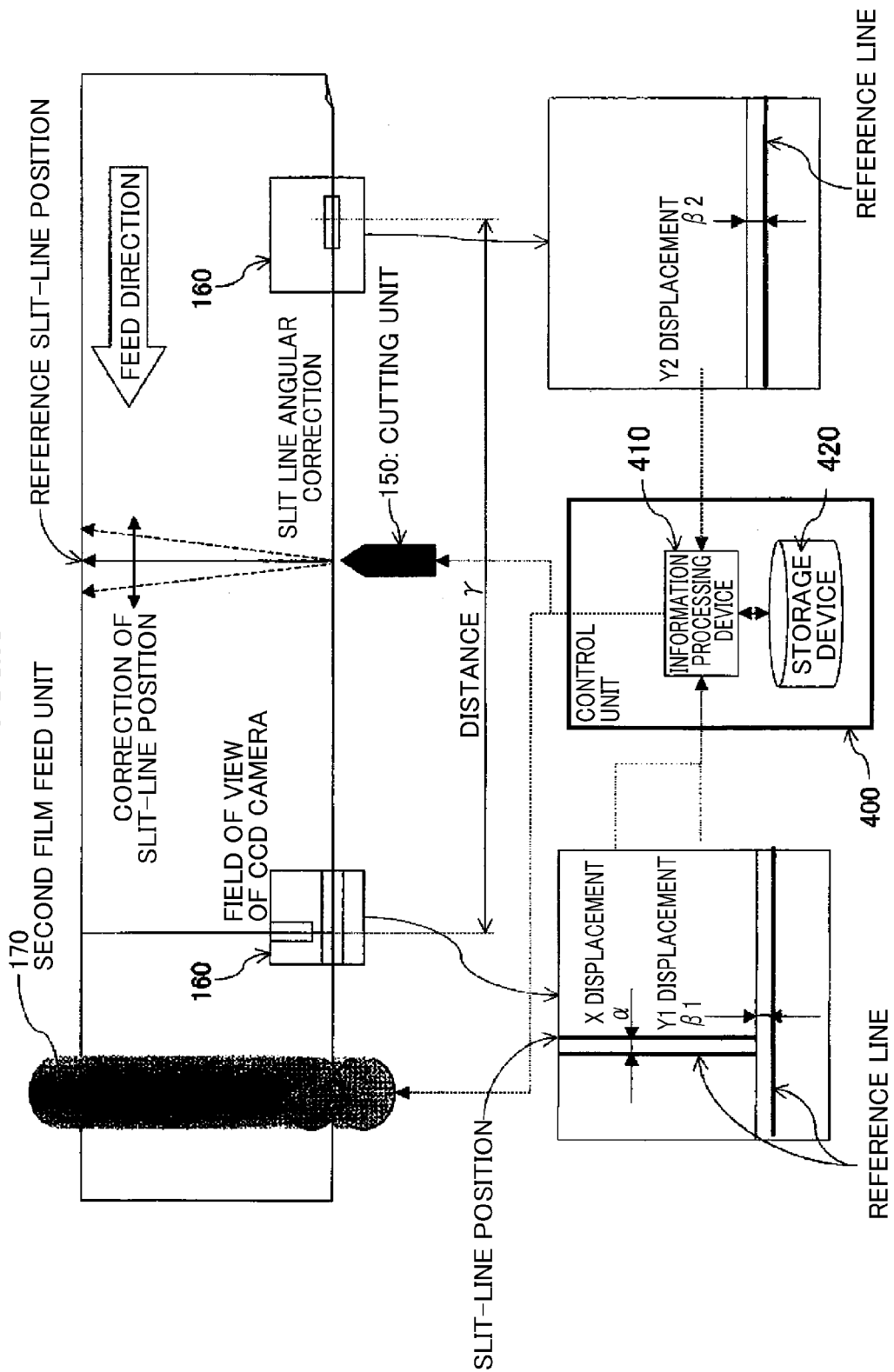
FIG. 9 is a schematic diagram showing the operation of a slit-position checkup unit, together with the inspection method for checking a difference between measurement data on an optical-film feed-out distance measured based on a slit line formed in the continuous web of optical film being fed, and the position for forming a slit-line read by a reading device, in the continuous manufacturing system for liquid-crystal display elements, according to at least one embodiment.

FIG. 9 is a schematic diagram showing the operation of the slit-position checkup unit 160 including the manner of inspection for determining a difference between the position of a slit line actually formed in the continuous web of optical film, and the position at which the slit-line is to be formed as read by the reading unit 120.

Two slit-position checkup units 160 are provided at the upstream and downstream sides as seen in the feed direction with respect to the slitting unit 150. The film feed unit 170 including the feed rollers is disposed at the downstream side of the downstream slit-position checkup unit 160, so that the downstream slit-position checkup unit 160 functions to restart the feed of the continuous web of optical film which is temporarily stopped when the slit lines are formed. The speed adjustment unit 140 including the dancer roll is disposed at the upstream side of the upstream slit-position checkup unit 160, so that it is possible to maintain the feed of the continuous web of optical film by the film feed unit 130 including the feed rollers, even if the feed of the continuous web of optical film is temporarily stopped when the slit lines are formed.

Coincidence of the position of the slit line actually formed in the direction transverse to the feed direction of the continuous web of optical film with the position calculated based on the measurement data about the optical-film feed length can be affirmed by determining accurate positions in the traveling direction (X direction) and the transverse direction (Y direction) of the optical film. One preferable way is to carry out measurements, at two locations at the opposite sides of the position of the optical film where the slit line is to be formed, for the deviations in X and Y directions on the position of the formed slit line and the edge of the optical film with respect to reference lines. For example, the slit-position checkup unit 160 may be provided with a CCD camera to take images of the position of the actually formed slit line and the position of the edge of the optical film and produce picturized images. The reference lines are previously provided in the image-talking regions. The position of the actually formed slit-line and the position of the edge of the optical film can be determined by differences in contrast in the taken images. Then, a calculation is made to determine the distance (deviation) between the predetermined reference lines and the positions of the actually formed slit-line and the edge of the optical film, and the location and the angular position of the slitting unit 150 is corrected by moving the position forward or backward with respect to the feed direction of the continuous web of optical film, based on the calculated distance (deviation).

More specifically, as shown in FIG. 6, Steps 3, 4 and 7 are performed to feed the continuous web of optical film under tension, and in Step 5, a slit line is formed in the continuous web of optical film. Then, a further step is carried out by the two slit-position checkup units 160 to determine whether there is any deviation between the position of the actually formed slit-line of the optical film and the position where the slit-line is to be formed, the latter position being determined based on the slit-position information read by the reading unit 120, and where there is any deviation, Steps 6 and 8 are carried out to correct the angular position and the location of the slitting unit 150, for example, in the following manner.

The manner of the inspection for determining the deviation between the position of the actually formed slit-line of the optical film and the position where the slit-line is to be formed as read by the reading unit 120 is carried out for example in accordance with the following procedures.

(1) Images of the position (X) of the actually formed slit line of the optical film and two positions (Y1, Y2) of the edge of the optical film are taken by the CCD camera of the slit-position checkup unit 160, and the images are picturized for measurement of the position of the actually formed slit-line (X) of the optical film and the positions of the edges (Y1, Y2) of the optical film by the differences in contrast.

(2) There is a slit line reference position in the form of a line extending in Y direction at an intermediate position between a reference line extending in Y direction at an upstream position as seen in X direction in the imaging area of one of the slit-position checkup units 160 and another reference line extending in Y direction at a downstream position as seen in X direction in the imaging area of the other of the slit-position checkup units 160, and data γ representing the distance between the upstream and downstream reference lines is stored in the storage device 420 via the information processing device 410. Furthermore, there are upstream and downstream reference lines extending in the X direction in respective ones of the image-taking regions of the slit-position checkup units 160.

(3) A correction value α for the position of the slit-line and a correction value δ for the angular position of the slit-line are calculated based on the reference lines and the measured positions of the slit-line (X) and the edge of the optical film. The correction value α for the position of the slit-line in the optical film correspond to the measured deviation α, or the deviation α between the actual slit-line position (X) and the downstream side reference line extending in the Y direction. The correction value δ for the angular position of the slit line can be calculated according to the following formula, based on the deviations in Y direction of the edge of the optical film at two positions, or the deviations (β1, β2) of the edge of the optical film with respect to respective ones of the upstream and downstream reference lines extending in the X direction, and the distance data γ between the two reference lines.

$$\delta = \cos^{-1}\left\{\frac{\gamma}{\sqrt{\gamma^2 + (\beta_1 - \beta_2)^2}}\right\}$$

(4) The storage device 420 is used to store correction values (α, δ) for applying an instruction to the slitting unit 150 to perform an angular position correction by a value δ and a positional correction by value α in the X direction based on the measured and calculated data so as to make the slit line conform to the reference slit-line position extending in the Y direction (5) The slitting unit 150 receives instruction from the control unit 400 for the next operation of forming a slit line in the optical film to perform a positional correction in the feed direction and an angular position correction in a crosswise direction with respect to the feed direction, based on the stored correction values (α, δ).

(6) Thereafter, the slitting unit 150 forms a next slit line in the continuous web of optical film.

(Removal of Defective Polarizing Sheet and Lamination of Normal Polarizing Sheet on Liquid-Crystal Panel)

The first feature concerning the roll of optical film laminate 10 according to this embodiment is that, in advance of laminating the normal polarizing sheet $X_\alpha$ cut from the polarizing composite film 11 contained in the continuous web of optical film being supplied on the liquid crystal panel W, the defective polarizing sheets $X_\beta$ cut from the polarizing composite film 11 taken away by the defective polarizing sheet removal unit 190, without interrupting the feed of the continuous web of optical film and without taking away any normal sheets. The second feature of this embodiment is that only the normal polarizing sheet $X_\alpha$ cut from the polarizing composite film 11 can be fed to a position for lamination with a liquid-crystal panel W by the carrier-film take-up drive mechanism 210, while eliminating a need for interrupting the feed of the continuous web of optical film. The above features are inconceivable in the case of an individualized sheet or in the manufacture of individualized sheet. It is apparent that the use of such roll of optical film laminate 10 in the manufacturing process of liquid-crystal display elements leads to a significant increase in the speed and a significant improvement in accuracy of applying the normal polarizing sheet $X_\alpha$ to the liquid-crystal panel W.

(Transportation of Liquid-Crystal Panel and Lamination with Normal Polarizing Sheet Xα)

Before specifically describing in detail the lamination unit 200 including the pair of lamination rollers adapted to be vertically moved toward and away from each other for laminating the liquid-crystal panel W with the normal polarizing sheet Xα which has been cut from the polarizing composite film 11, a brief description is made regarding the transportation or liquid-crystal-panel conveyance apparatus 300 for the liquid-crystal panel W which is to be laminated with the normal polarizing sheet of the polarizing composite film 11 formed from the continuous web of optical film which is also being supplied.

Figure 10:
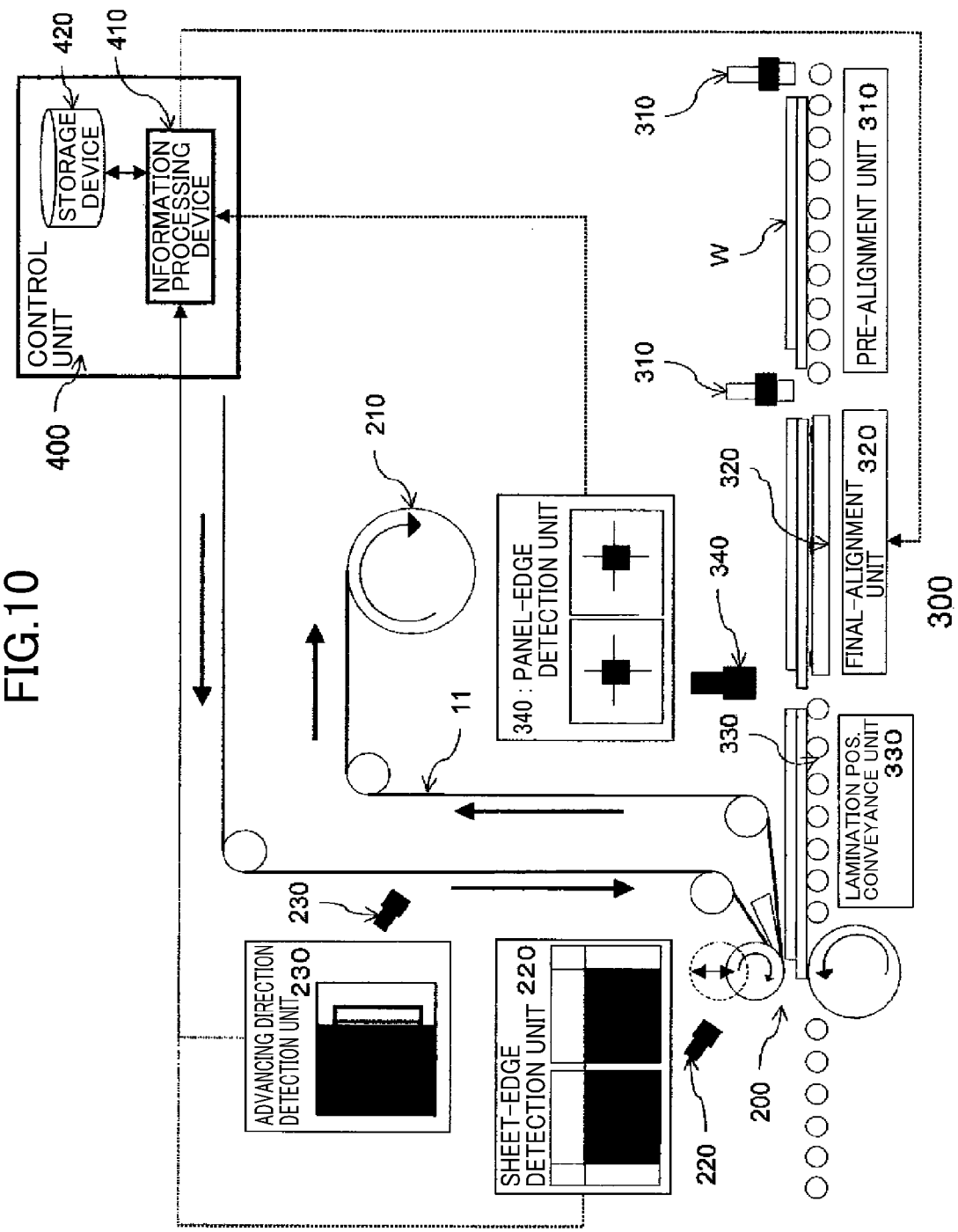
FIG. 10 is a schematic diagram showing the state when encoded information recorded on the continuous web of optical film is read by the reading unit, and a pre-alignment unit, a final-alignment unit, a lamination position-directed conveyance unit and a panel-edge detection unit in the liquid-crystal-panel conveyance apparatus are controlled based on the encoded information to allow a liquid-crystal panel to be conveyed in a controlled posture, in the continuous manufacturing system for liquid-crystal display elements, according to at least one embodiment.

Taking a large size television having a diagonal screen dimension of 42 inches as an example, a rectangular-shaped liquid-crystal panel W has a size of between 540 and 560 mm in length and between 950 and 970 mm in width. In the manufacturing process of liquid-crystal display elements, the liquid-crystal panel W is slightly trimmed along its peripheries during a wiring stage including mounting operations of electronic components. Alternatively, the liquid-crystal panel W may be transported or conveyed with peripheries already trimmed The liquid-crystal panels W are taken out one-by-one from a magazine containing a large number of liquid crystal panels, by means of a liquid-crystal-panel supply apparatus, and conveyed through a cleaning/polishing stage to a position for lamination with respective ones of the normal polarizing sheet Xα of the polarizing composite film, by the liquid-crystal-panel conveyance apparatus 300, by being adjusted to maintain equal intervals and a constant transportation speed, for example. The normal polarizing sheet Xα is formed from the continuous web of optical film to have a size slightly less than that of the liquid-crystal panel W. As shown in FIG. 10, in a final station for lamination of the normal polarizing sheet Xα on the liquid-crystal panel W, the liquid-crystal-panel conveyance apparatus 300 includes a pre-alignment unit 310, final-alignment unit 320 for controlling the orientation of the panel, a conveyance unit 330 to transport the panel to the lamination position, and a panel-edge detection unit 340 for detecting the leading edge of the liquid-crystal panel W.

Figure 11:
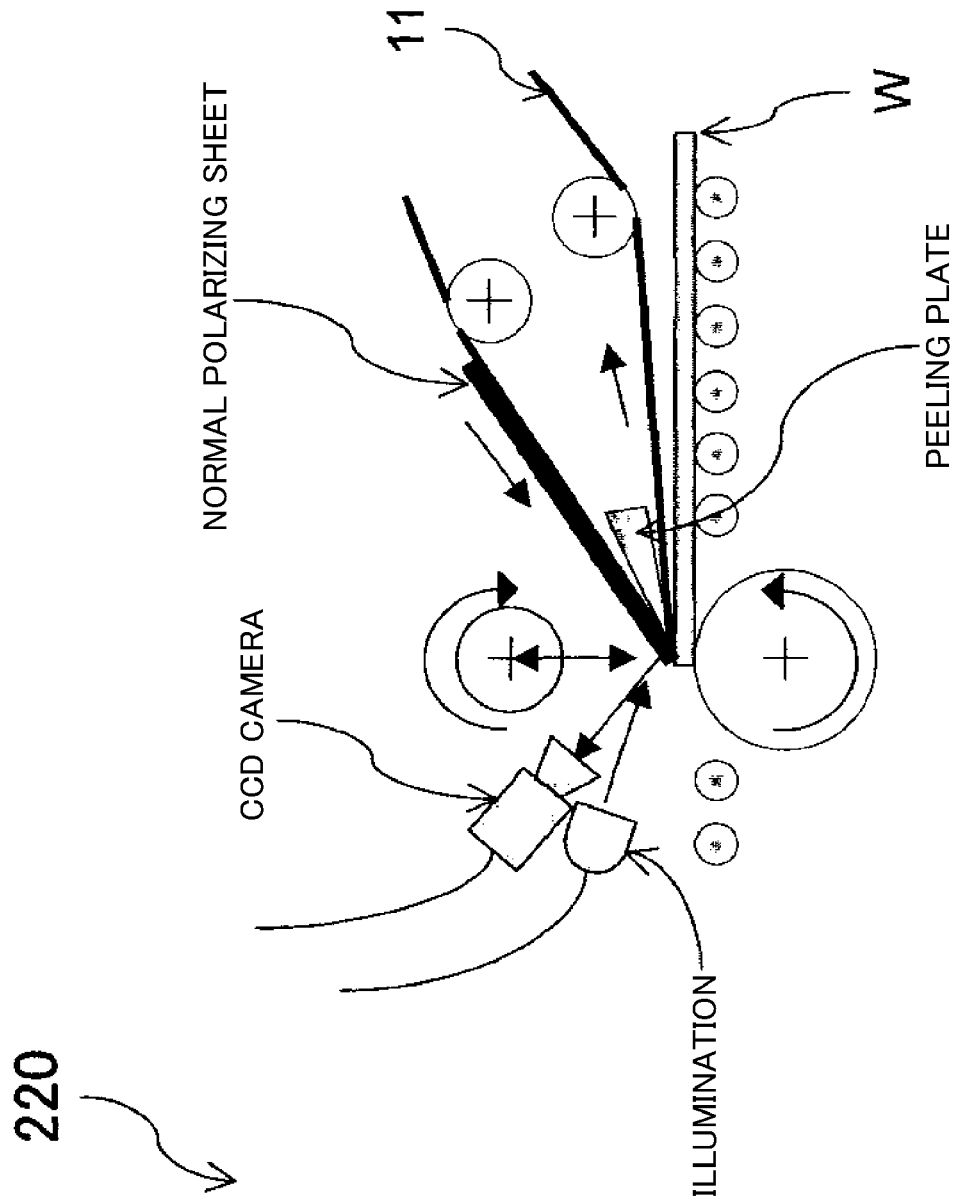
FIG. 11 is a schematic diagram showing a lamination unit comprising a sheet-edge detection unit for detecting a leading edge of a normal polarizing sheet of a polarizing composite film formed from the continuous web of optical film being fed, and straight-ahead-posture detection unit for detecting an alignment with a feed direction of the formed normal polarizing sheet of the polarizing composite film.

FIG. 10 is a schematic diagram showing the transportation of the liquid crystal panels W in an aligned orientation, by means of the pre-alignment unit 310, the final-alignment unit 320, the conveyance unit 330 for conveying the panels to the lamination position, and the panel-edge detection unit 340 which are provided in the liquid-crystal-panel conveyance apparatus 300, based on the encoded information which is read from the continuous web of optical film by the reading unit 120 during the manufacturing process of liquid-crystal display elements. Further, FIG. 11 is a schematic diagram showing the lamination unit 200 for laminating the polarizing film sheet with the liquid crystal panel W, comprising the sheet-edge detection unit 220 for detecting the leading edge of the normal polarizing sheet Xα of the polarizing composite film formed from the continuous web of optical film being fed, and the straight-ahead-posture detection unit 230 for detecting the alignment with the feed direction of the normal polarizing sheet Xα formed from the polarizing composite film.

Preferably, the normal polarizing sheet Xα is fed to the lamination position at a constant speed by the carrier film 14. As shown in FIG. 10 or 11, at the lamination position, only the carrier film 14 is peeled by being bent at an acute angle, by the carrier-film take-up drive mechanism 210. By having the carrier film 14 peeled by being bent at an acute angle, the adhesive layer on the normal polarizing sheet Xα is gradually exposed. This makes it possible to slightly expose the leading edge of the normal polarizing sheet Xα to allow the leading edge of the liquid crystal panel W to be easily aligned with the leading edge of the normal polarizing sheet Xα.

As shown in FIG. 10, the leading edge of the normal polarizing sheet Xα is moved to the gap defined between the pair of lamination rollers of the lamination unit 200 which are now in the vertically spaced apart relation to each other, and detected by the sheet-edge detection unit 220. Although the normal polarizing sheet Xα is fed in a state laminated on the carrier film 14, it is seldom that the normal polarizing sheet Xα is accurately fed so that the angle θ between the feed direction and the lengthwise direction of the carrier film 14 becomes zero. Therefore, deviations of the normal polarizing sheet Xα in the feed direction and the transverse direction are measured, for example, by taking images of the sheet using the CCD camera of the straight-ahead-posture detection unit 230 and subjecting the taken images to an image processing, whereby the measured deviations are calculated in terms of X, Y and θ, and the calculated data is stored in the storage device 420 by the control unit 400.

Then, the plurality of liquid-crystal panels W are sequentially supplied from the liquid-crystal-panel supply apparatus illustrated in FIG. 5 at even intervals and a constant speed. The liquid-crystal panels W are supplied one-by-one and subjected to the alignment control by the liquid-crystal-panel conveyance apparatus 300 illustrated in FIG. 10. This alignment control will now be described with reference to FIG. 10.

Figure 2:
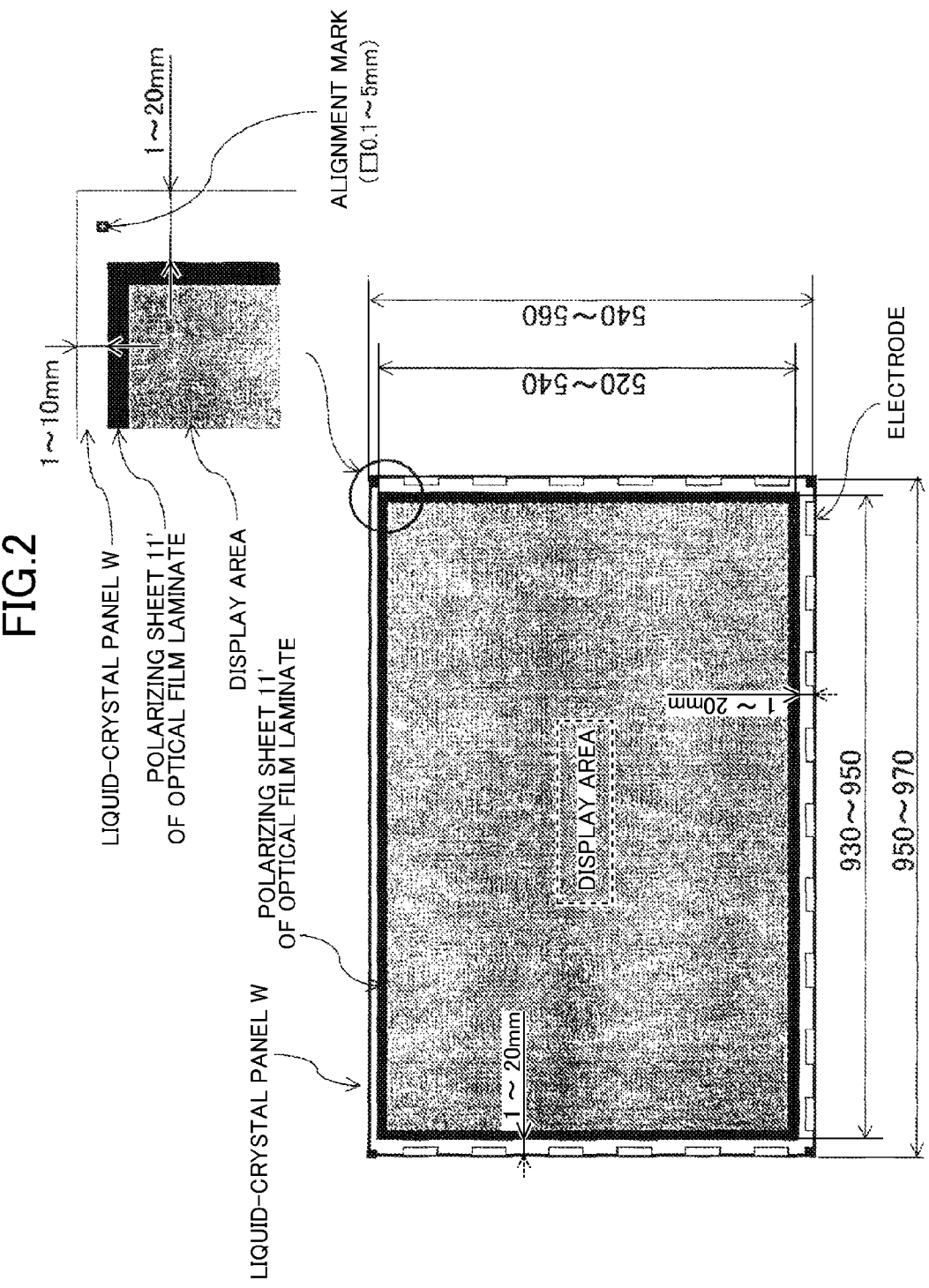
FIG. 2 illustrates a typical example of a liquid-crystal display element for a widescreen television having a diagonal screen size of 42 inches.

The liquid-crystal panels W are sequentially positioned by the pre-alignment unit 310, so that they are aligned in lengthwise and widthwise directions respectively with the transport direction and the direction perpendicular to the transport direction in the conveyance path. The positioned liquid-crystal panel W is conveyed to and placed on the final-alignment unit 320 which includes an alignment table adapted to be turned by a drive mechanism which is controlled by the control unit 400. The leading edge of the liquid-crystal panel W placed on the alignment table is detected by the panel-edge detection unit 340. The position of the detected leading edge of the liquid-crystal panel W is checked for match with the reference lamination position stored in the storage device, specifically, the calculation data in terms of X, Y and θ to represent the orientation of the normal polarizing sheet Xα to be laminated to the liquid-crystal panel W. For example, the deviation between the leading edge of the liquid-crystal panel W and the reference lamination position is measured using an alignment mark of the liquid-crystal panel W illustrated in FIG. 2 to calculate the angular displacement θ, and the alignment table having the liquid-crystal panel W placed thereon is turned by the angular displacement θ. Then, the alignment table is connected to the lamination position-directed conveyance unit 330. The liquid-crystal panel W is conveyed to the lamination position while keeping the same orientation, by the lamination position-directed conveyance unit 330, and the leading edge of the liquid-crystal panel W is registered with and laid on the leading edge of the normal polarizing sheet Xα. In the final stage, the normal polarizing sheet Xα and the liquid-crystal panel W which are in aligned relation with each other are held between the pair of lamination rollers and conveyed thereby to obtain a finished liquid-crystal display element.

The normal polarizing sheet Xα is fed to the lamination position together with the carrier film 14 within the continuous web of optical film advanced under tension, so that there is least possibility that the periphery of the normal polarizing sheet Xα is bent or sagged. Thus, the normal polarizing sheet Xα is less likely be flexed or bent. This makes it easy to have the liquid-crystal panel W aligned with the normal polarizing sheet Xα, so that the manufacturing speed of the liquid crystal display element can be increased and the product accuracy can be improved. Such method and system could never be applied to the manufacturing process utilizing individualized sheets wherein, after peeling a separator from each of the individualized sheets to expose the adhesive layer, and feeding under a vacuum suction each of the sheets to a lamination position, adjusting the position of the sheet with respect to the liquid-crystal panel W, the sheet is laminated to the liquid-crystal panel W to complete a liquid-crystal display element. This is because the aforementioned method and system are related to the continuous process for manufacturing liquid-crystal display elements which can be implemented only by adopting the roll of the optical film laminate according to this embodiment.

II. Roll of Optical Film Laminate, Manufacturing Method and System Therefor

Description will now be made regarding the roll of the optical film laminate, a manufacturing method and system therefor, according to at least one embodiment making reference to the drawings.

(Structure of Polarizing Composite Film)

As shown in FIG. 1, the sheet of optical film to be laminated to the liquid-crystal panel is typically comprised of a flexible optical film including a polarizing composite film formed with an acrylic adhesive layer for lamination with a substrate of the liquid-crystal panel W. The polarizing composite film includes a polarizer (continuous polarizer layer) having a thickness of 20 to 30 μm comprising a substrate made of a PVA-based film which has been subjected to a dyeing treatment using iodine and a cross-linking treatment, and thereafter subjected to an orientation treatment by a lengthwise or widthwise stretching, and the polarizer is provided on one or each surface with a transparent protective film which is laminated thereon and comprises a substrate of TAC-based film having a thickness of about 40 to 80 μm for protecting the polarizer. Typically, an acrylic adhesive layer is formed on the side of the polarizer which is to be laminated to the liquid-crystal panel W.

(Process using Conventional Individualized Sheets)

As already described, in an individualized sheet manufacturing process, individualized sheets are prepared by punching or cutting a continuous web of optical film into sheets of rectangular shape, each being laminated with a separator through an adhesive layer. The individualized sheets each formed into a rectangular shape and laminated with the separator are stored in a magazine in a liquid-crystal display element manufacturing line. Then, in a process of laminating the individualized sheets with respective ones of a plurality of liquid-crystal panels W, the flexible individualized sheets pre-stored in the magazine are conveyed to a lamination position one-by-one. The separator releasably laminated to the adhesive layer formed on each of the flexible individualized sheets is peeled to expose the adhesive layer, and the individualized sheet is laminated to a corresponding one of the liquid-crystal panels W through the exposed adhesive layer. During this process, because the individualized sheet is flexible, problems are experienced in that the periphery of the rectangular-shaped individualized sheet is bowed or warped. Thus, in a liquid-crystal display element manufacturing process using such individualized sheet, in order to quickly perform alignment and lamination with a liquid-crystal panel with a high degree of accuracy, there is no other choice but to use individualized sheets which may have less problem of bowing or warping. For the purpose, for example, protective films each having a thickness of 40 to 80 μm are laminated to both of the opposite surfaces of a polarizer, but not to one of the surfaces, to impart stiffness to the individualized sheet by increasing thickness.

(Manufacturing Method and System for Roll of Optical Film Laminate)

Figure 12:
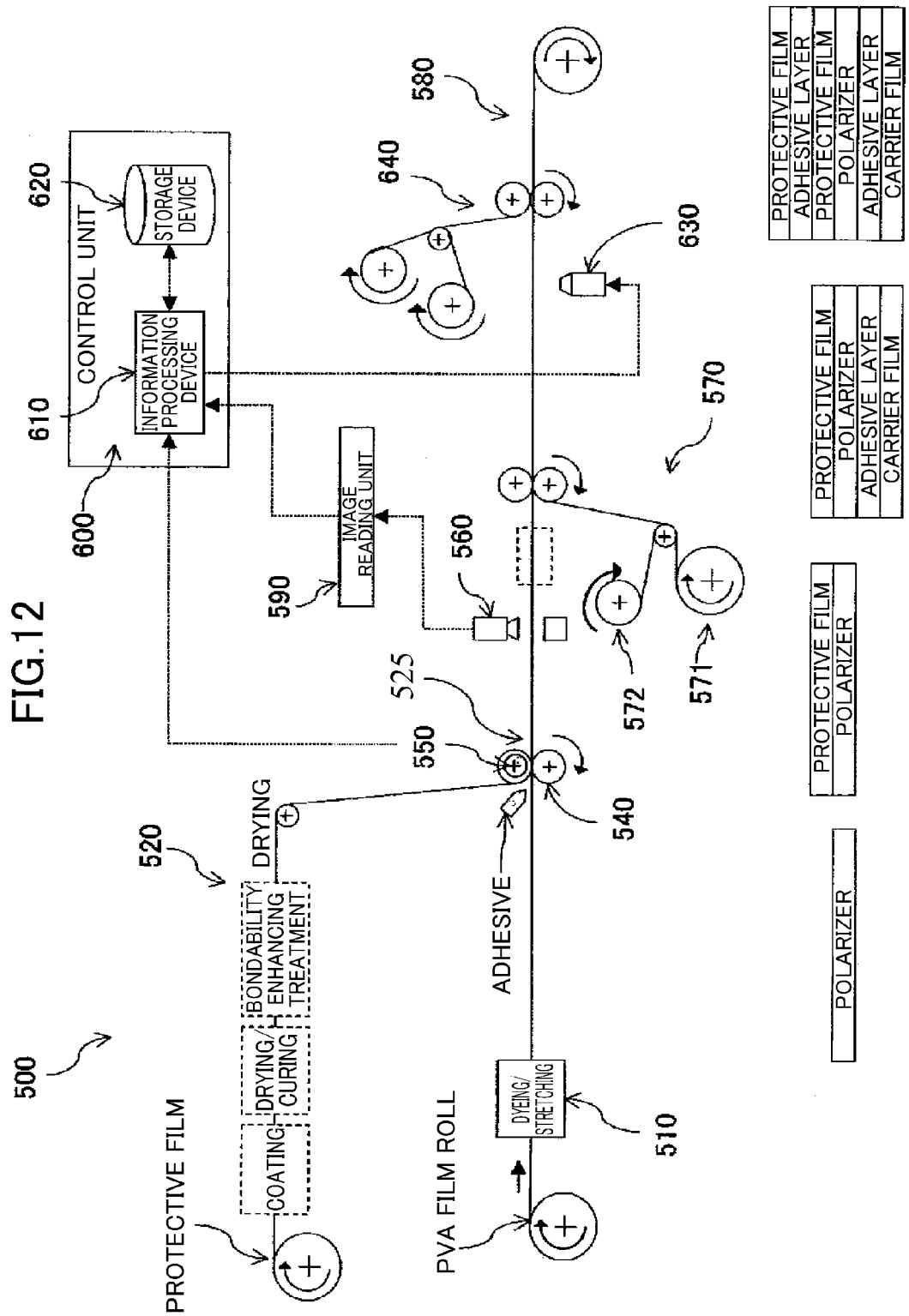
FIG. 12 is a schematic diagram showing a manufacturing method and system for a roll of an optical-film laminate, according to at least one embodiment.
Figure 13:
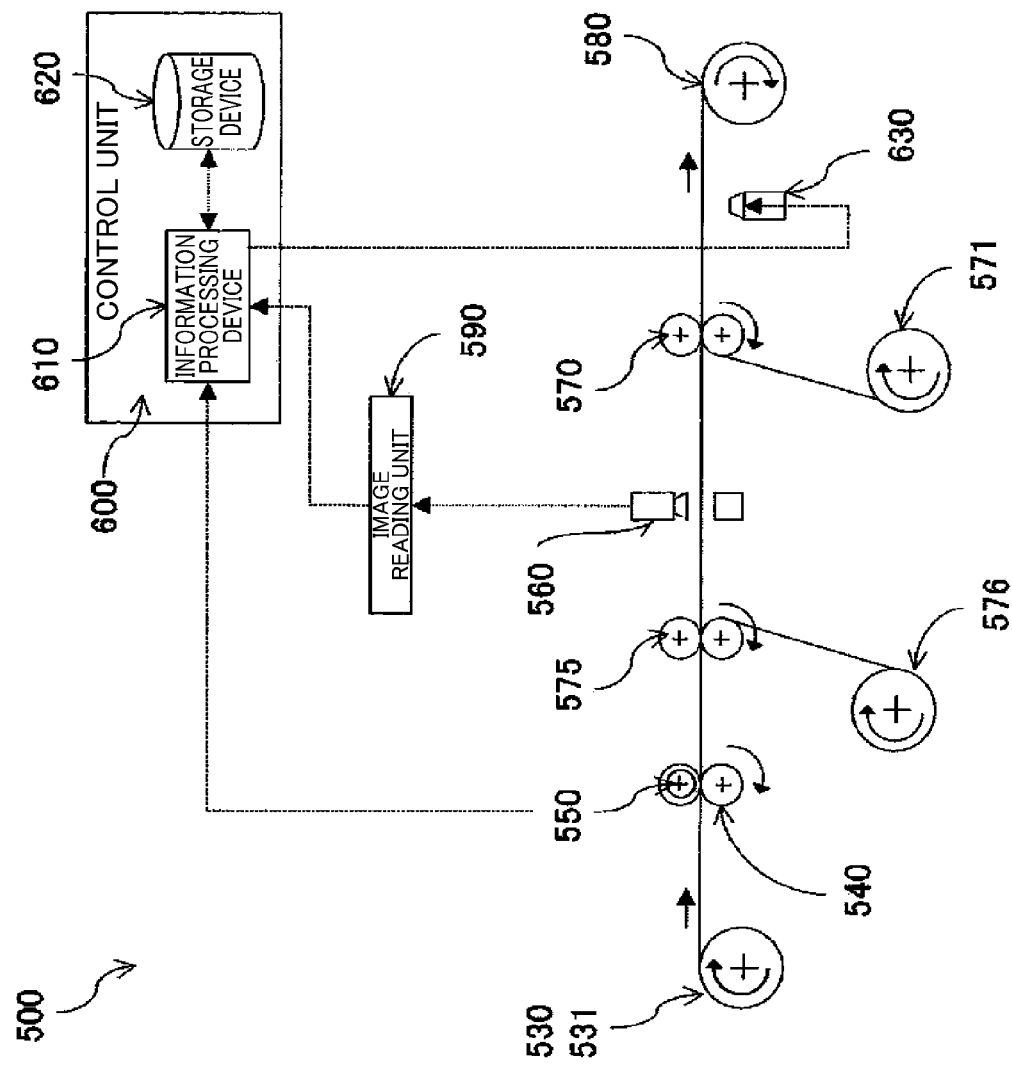
FIG. 13 is a schematic diagram showing a manufacturing method and system for a roll of an optical-film laminate, according to at least one embodiment.
Figure 14:
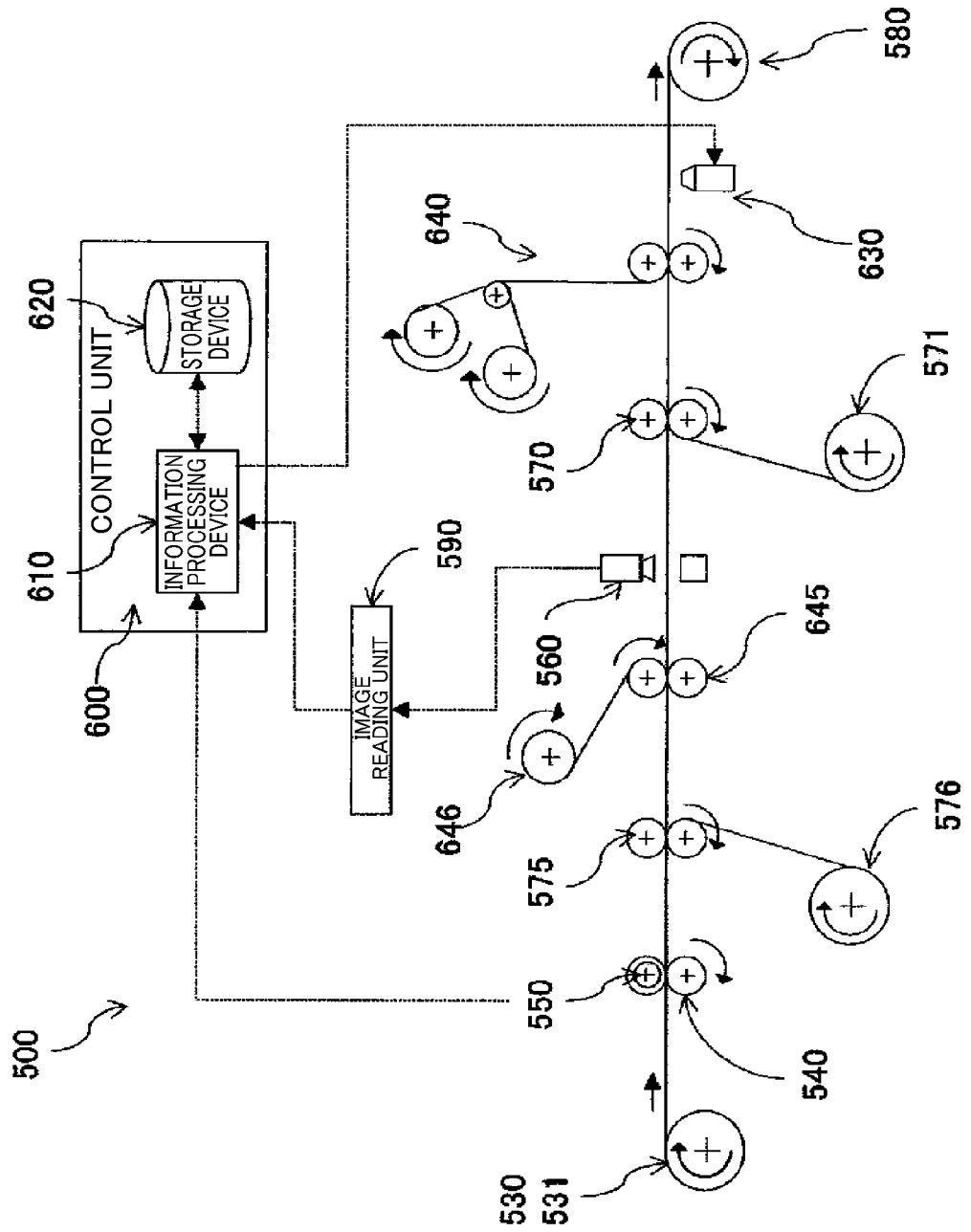
FIG. 14 is a schematic diagram showing a manufacturing method and system for a roll of an optical-film laminate, according to at least one embodiment.
Figure 15:
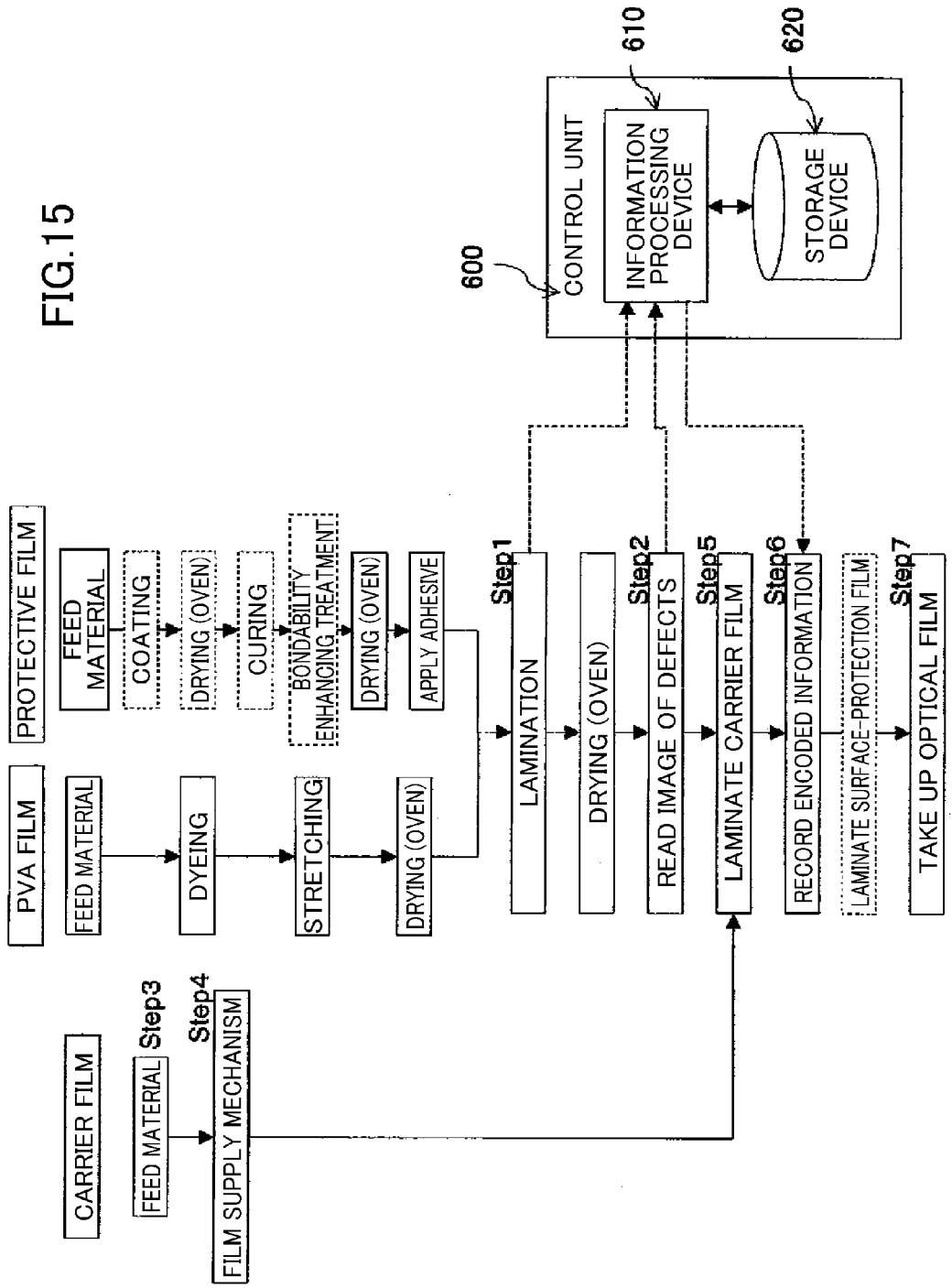
FIG. 15 is a flowchart showing a manufacturing process or process steps in the manufacturing method and system for a roll of an optical-film laminate illustrated in FIG. 12.
Figure 16:
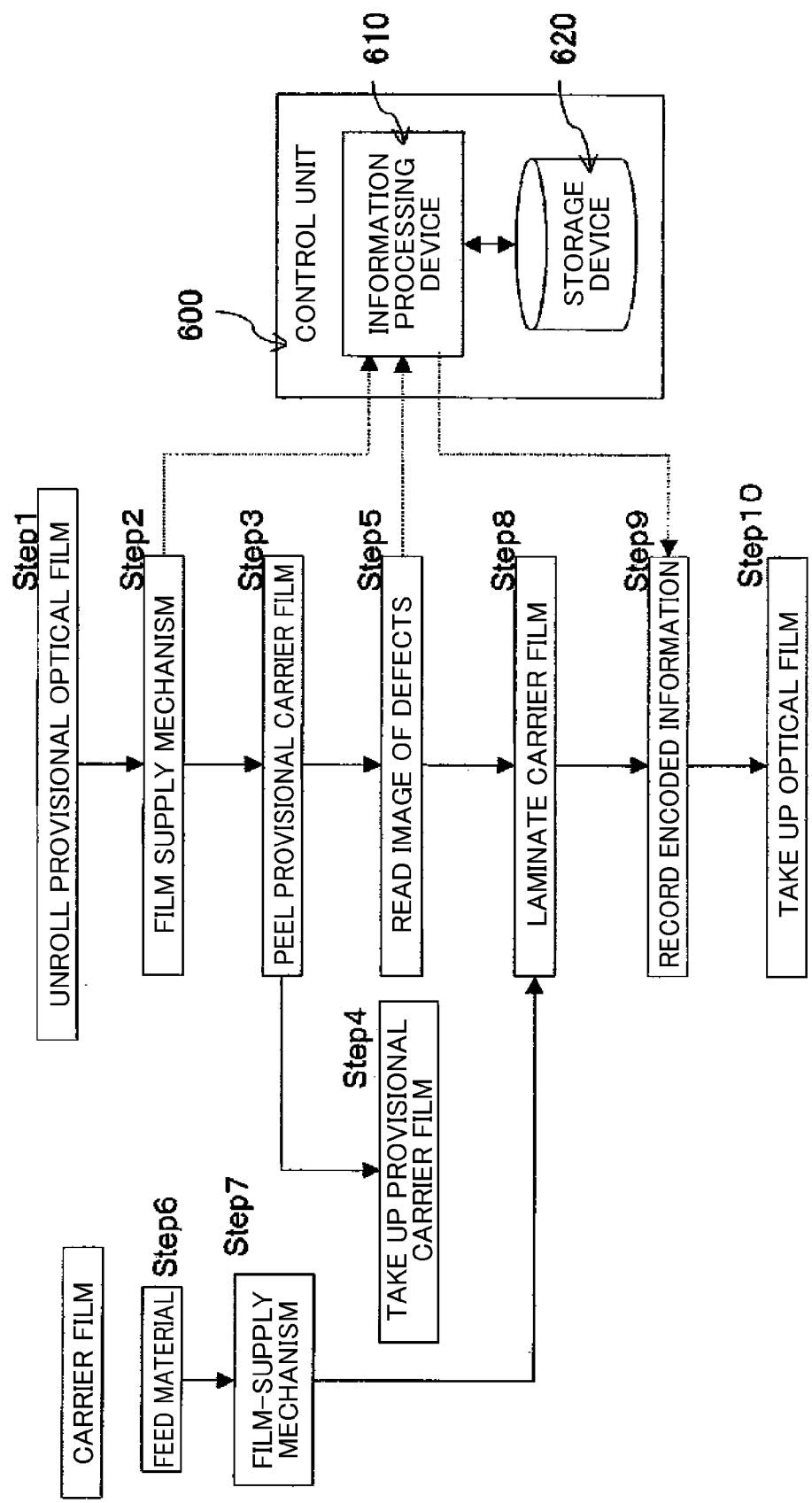
FIG. 16 is a flowchart showing a manufacturing process or process steps in the manufacturing method and system for a roll of an optical-film laminate illustrated in FIG. 13.
Figure 17:
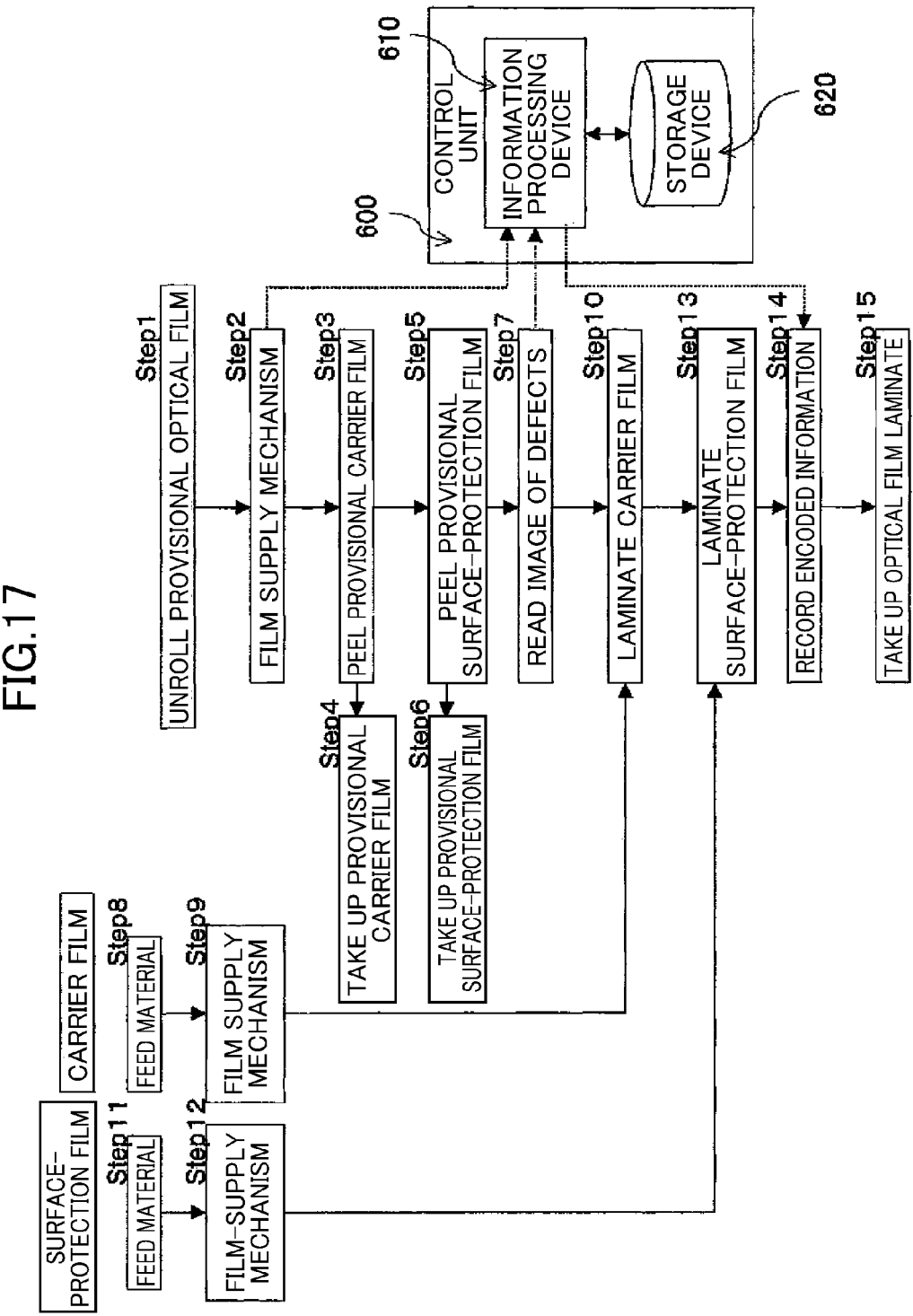
FIG. 17 is a flowchart showing a manufacturing process or process steps in the manufacturing method and system for a roll of an optical-film laminate illustrated in FIG. 14.

FIGS. 12 to 14 are schematic diagrams showing manufacturing methods and systems for rolls of the optical film including a polarizing composite film according to at least one embodiment of the disclosure. FIGS. 15 to 17 are flowcharts showing respective manufacturing processes or manufacturing steps in the manufacturing methods and systems according to embodiments of the disclosure.

In the embodiments illustrated in FIGS. 12-14, the polarizing composite film 11 constituting the roll of optical film laminate 10 may be made of a polarizer including a substrate of a PVA based material having at least one surface laminated with a protective film, preferably of a transparent material, with an adhesive layer 12 provided on the other surface. A carrier film 14 adopted as a manufacturing-process material is releasably attached to the adhesive layer 12. In the conventional liquid-crystal display element manufacturing process using individualized sheets, the polarizing composite film used therein has two protective films laminated thereon at the opposite surfaces to impart stiffness to the polarizing sheet. However, in a liquid-crystal display element manufacturing process using the roll of the optical film in accordance with some embodiments, the normal polarizing sheet $X_\alpha$ formed from the polarizing composite film 11 in the roll of the optical film laminate 10 is peeled from the carrier film 14 at the lamination position, and will gradually separated from the web. It is to be understood as a matter of course that there is no need of peeling the separator on a sheet-by-sheet basis as in the manufacturing process using the individualized sheets.

When the normal polarizing sheet $X_\alpha$ is peeled off the carrier film 14, the leading edge of the normal polarizing sheet $X_\alpha$ is registered with the leading edge of a corresponding one of a plurality of liquid-crystal panels W being sequentially conveyed toward the lamination position. Then, the normal polarizing sheet $X_\alpha$ and the corresponding liquid-crystal panel W are laminated together by being pressed against each other by the pair of lamination rollers of the lamination unit 200. In this process, there is no risk that the periphery of the normal polarizing sheet $X_\alpha$ is warped because the sheet is gradually peeled off the carrier film. Thus, differently from the individualized sheet, in the polarizing composite film 11 included in the continuous web of optical film in some embodiments, the protective film may be laminated to only one of the surfaces of the polarizer, and additionally it is possible to make the thickness of the protective film to be 40 μm or less.

Description will now be made of the manufacturing methods and systems of the optical-film roll, according to embodiments, making reference to FIGS. 12 and 15, FIGS. 13 and 16, and FIGS. 14 and 17, respectively.

(Manufacturing Method and System for Roll of Optical Film Laminate According to the Embodiment Illustrated in FIG. 12)

FIG. 12 is a schematic diagram showing the manufacturing system for manufacturing the roll of the optical film laminate 500 which comprises a polarizer manufacturing line 510 for producing a continuous polarizer layer (hereinafter referred to as "polarizer" as in the previous description), a protective film manufacturing line 520 for producing a protective film to be laminated on the polarizer, a polarizing composite film manufacturing line 525 for producing a laminate including the polarizer and the protective film (the laminate will hereinafter be referred as "polarizing sheet 11'" to distinguish it from the polarizing composite film 11 which does not have an adhesive layer), and surface-protection film lamination mechanism 640 for laminating a carrier film and a surface-protection film, to the polarizing composite film to produce the optical film. FIG. 15 is flowchart showing the manufacturing process or steps in the manufacturing system 500.

The polarizing composite film manufacturing line 525 includes an inspection sub-line for inspecting a defect existing in the polarizing composite film 11 by an inspection unit 560, a carrier film feed sub-line for laminating a carrier film 14 having a transferable adhesive layer 12 formed thereon, to one of the opposite surfaces of the polarizing sheet 11', an information recording sub-line for recording encoded information including slit-position information, on a surface of the carrier film 14, a surface-protection film feed sub-line for laminating a surface protection film 13 through it adhesive surface to the surface of the polarizing sheet 11' opposite to the surface on which the carrier film 14 is laminated, and a taking up sub-line for taking up the continuous web of optical film having the encoded information recorded thereon to form a roll of the optical film. The carrier film feed sub-line has mounted thereon a roll of the carrier film 14 having a releasing film attached thereto, and the surface-protection-film feed sub-line has mounted thereon a roll of the surface protection film 13 having a releasing film attached to the adhesive surface of the surface protection film 13. The slit-position information is obtained by processing the information about a normal region having no defect and a defective region having a defect or defects which is previously defined in the polarizing sheet 11' based on the location or coordinate position of the defect therein detected at the inspection sub-line, and used to, in forming a normal polarizing composite film and a defective polarizing sheet from the polarizing composite film, designate at least positions at which slit lines are to be formed in the continuous web of optical film being fed.

The polarizer manufacturing line 510 has a roll of PVA-based film which constitute the substrate of the polarizer and is mounted thereon in a rotatable manner, and includes a sub-line for subjecting the PVA-based film being unrolled from the roll by means of a lamination drive mechanism 540 or other drive mechanism (not shown), to processes of dyeing, cross-linking, stretching and then drying. The protective film manufacturing line 520 has rotatably mounted thereon a roll of a typically transparent TAC-based film constituting a substrate of the protective film, and includes a sub-line for subjecting the transparent TAC-based film being unrolled from the roll by means of the lamination drive mechanism 540 or other drive mechanism (not shown), to a saponifying treatment followed by drying. Each of the protective film manufacturing line 520 and the polarizing composite film manufacturing line 525 for the polarizing sheet 11' includes a sub-line for applying an adhesive that includes primarily a polyvinyl alcohol-based resin to an interface between the polarizer and the protective film, and drying the adhesive to bond them together through an adhesive layer having a thickness of only several μm.

The manufacturing line 525 for the polarizing sheet 11' comprises the lamination drive mechanism 540 including a pair of lamination rollers. The lamination drive mechanism 540 comprises a distance measurement device 550 having an encoder incorporated in one of the lamination rollers. The lamination rollers are adapted to laminate the protective film to the polarizer by pressing them against each other, to form a polarizing sheet 11', and feed the polarizing sheet 11'.

This manufacturing system 500 includes the inspection unit 560 for detecting defects in the surface and the inside of the polarizing sheet 11' to be fed. It is required to provide the polarizing sheet 11' with the adhesive layer 12 only after the defects are detected, to complete the polarizing composite film 11. Therefore, the present manufacturing system 500 further comprises a carrier-film lamination mechanism 570 having mounted thereon the roll of the carrier film 14 having the adhesive layer 12. The adhesive layer 12 on the carrier film 14 is formed in advance in the manufacturing process of the carrier film 14, by subjecting one of the opposite surfaces of the carrier film 14 which is to be releasably laminated to one of the opposite surfaces of the polarizing sheet 11' to be laminated to the liquid-crystal panel to a releasing treatment, applying to that surface a solvent containing an adhesive, and then drying the solvent. When the carrier film 14 fed from the carrier-film lamination mechanism 570 is laminated on the polarizing sheet 11' in a releasable manner, the adhesive layer 12 previously formed on the carrier film is transferred to the polarizing sheet 11' to provide the adhesive layer 12 on the polarizing composite film 11.

The manufacturing system 500 further comprises an information recording unit 630 for recording encoded information, for example, on a surface of the carrier film 14. More specifically, the information recording unit 630 is operable to record, on a continuous web of optical film being fed during the manufacturing process of liquid-crystal display elements using the produced roll of the optical-film laminate, encoded information including the slit-position information indicative of the positions at which slit lines are to be formed in the continuous web of optical film to form normal and defective polarizing sheets of the polarizing composite film. The manufacturing system 500 may further comprise a surface-protection-film lamination mechanism 640 for laminating a surface-protection film 13 through an adhesive surface to the surface of the polarizing sheet 11' opposite to the surface on which the carrier film 14 is laminated. Finally, the manufacturing system 500 comprises an optical-film take up drive mechanism 580 for taking up the optical film which is constituted by the polarizing sheet 11' with the carrier film 14 having a transferable adhesive layer and the surface-protection film 13 laminated on the opposite surfaces of the polarizing sheet 11'.

In the case where protective films are laminated on the opposite surfaces of the polarizer, the manufacturing system 500 will include two protective film manufacturing lines 520, 520' (the protective film manufacturing line 520' is omitted in the drawing). Further, the protective film manufacturing line 520 may additionally include a treatment sub-line for subjecting the surface of the protective film to a hard coat treatment and/or an anti-dazzling or anti-glare treatment, before a protective film is laminated to the polarizer.

The inspection unit 560 comprises an image-reading device 590 including for example a CCD camera. The image-reading device 590 is electrically connected to an information processing device 610 included in a control unit 600, wherein image data read by the image-reading device 590 is processed in association with measurement data measured by the distance measurement device 550 electrically connected to the information processing device 610. The control unit 600 functions to operate the information processing device 610 and a storage device 620 to process the image data from the image-reading device 590 in association with the measurement data based on the delivered length measured by the distance measurement device 550 as a length from the leading edge of the polarizing sheet 11', so as to produce position data representing the location or the coordinate position of the defect in the polarizing sheet 11', the position data being then stored in the storage device 620. The control unit 600 functions, based on the position data on the detected location or coordinate position of the defect, to define a defective region and a normal region in the polarizing composite film 11.

The control unit 600 functions, based on the position data on the detected location or coordinate position of the defect, to define in the polarizing composite film 11 a defective region and a normal region. Further, the control unit 600 functions, based on the defective and normal regions of the polarizing composite film 11, to create slit-position information. The slit-position information is provided for indicating positions at which respective ones of the slit lines are to be formed in the continuous web of optical film. The slit lines are formed in pairs by the slitting unit 150 during the manufacturing process of liquid-crystal display elements, so that the continuous web of optical film being fed is slit in a direction transverse to the feed direction thereof at the two adjacent positions or the upstream and downstream positions in the feed direction to a depth reaching to the inner surface of the carrier film 14. The produced slit-position information is also stored in the storage device 620. Then, the information processing device 610 functions, based on the stored slit-position information, to create encoded information, together with additional information, such as information on the manufacturing lot and a length in meters of the optical film in the roll, or in association with the additional information. As already mentioned, the encoded information is preferably recorded on the carrier film 14 included in the continuous web of optical film, during the manufacturing process of liquid-crystal display elements using the optical film roll. It is to be understood that the encoded information can be recorded on the carrier film 14 in various ways, such as the one in which encoded information is entirely recorded on a single storage location, and the one in which encoded information is recorded on a plurality of storage areas disposed at given intervals (e.g., at intervals of 1 m or 100 m). Alternatively, the encoded information may be recorded on the surface-protection film 13, if any, instead of the carrier film 14.

It is to be noted that the regions defined by respective pairs of slit lines may include a defect-free or normal region having a give length determined by the length of a side of the liquid-crystal panel to be laminated with the polarizing composite film, or a defective region including a defect or defects having a length usually less than the length of a normal region. During the manufacturing process of the liquid-crystal display element, it is necessary to allow the slitting unit 150 to cut the defective region and normal region of the polarizing composite film 11 along corresponding ones of the pairs of slit lines based on the slit-position information included in the encoded information, so that the defective polarizing sheet $X_\beta$ is removed from the carrier film 14 by the defective polarizing sheet removal unit 190, and the normal polarizing sheet $X_\alpha$ is peeled off the carrier film 14 to be laminated to one surface of the liquid-crystal panel W.

Therefore, the length ($X_\alpha$) of the normal region is determined based on the position data relating to the location or coordinate position of the defect existing in the polarizing composite film 11 in accordance with the length of a side of the liquid-crystal panel to be laminated with the normal polarizing sheet, so that the length always has a constant value. Regarding the defective region which is defined in the same manner, however, the upstream one of the two slit lines for the normal region located just upstream of the defective region in a feed direction can be used as the downstream one of the two slit lines for the defective region, so that the length ($X_\beta$) of the defective region is determined by the downstream slit line and an upstream one which is located slightly upstream of the location or coordinate position of the defect. Because the length between the downstream slit line and the location or coordinate position of a defect may not be the same, the length ($X_\beta$) of the defective region varies. Preferably, a calculation algorithm for producing the slit-position information indicative of the locations for forming the slit lines is configured such that the length ($X_\beta$) of the defective region is different from the length ($X_\alpha$) of the normal region, for example, to have a relation $X_\beta < X_\alpha$, in any case, as described below. The procedure of creating the encoded information is common in the above embodiments, so that the procedure will be described below in connection with reference to FIGS. 18 to 28.

The carrier-film lamination mechanism 570 for laminating the carrier film 14 to the polarizing sheet 11' will now be described below. The carrier film 14 is previously formed in the carrier film manufacturing line (not shown) using a PET (polyethylene terephthalate)-based film of about 20 to 40 μm in thickness as a substrate. A transferable adhesive layer having a thickness of about 10 to 30 μm can be formed on one of the opposite surfaces of the carrier film 14 by, after subjecting one of the opposite surfaces of the PET-based film to a releasing treatment, applying a solvent containing an acrylic adhesive to the treated surface, and drying the solvent. By having the carrier film 14 laminated in a releasable manner on the polarizing sheet 11', the adhesive layer is transferred to the polarizing sheet 11' to form the optical film which comprises the polarizing composite film 11 having the adhesive layer. During the manufacturing process of liquid-crystal display elements using the roll of optical film laminate 10 formed in the above described manner, the adhesive layer 12 is peeled together with the normal polarizing sheet of the polarizing composite film 11 is from the carrier film 14 when the normal polarizing sheet of the polarizing composite film 11 is peeled off the carrier film 14 and attached to the liquid-crystal panel W. The carrier film 14 previously produced in the carrier film manufacturing line is wound into a roll by a length corresponding to the wound length of the polarizing composite film 11.

In a process of producing a roll of provisional optical film in accordance with embodiments illustrated in FIGS. 13 and 14, a transferable adhesive layer may be formed on the provisional optical film in the same manner. In embodiments illustrated in FIGS. 13 and 14, when a provisional carrier film 14' and/or a provisional surface-protection film 13' are peeled, the adhesive layer formed on the provisional carrier film 14' is transferred to the polarizing composite film 11 so as to be incorporated into the polarizing composite film 11, in the same manner, as described below.

The roll of the carrier film 14 is mounted for rotation on a support rack 571, and the carrier film 14 unrolled from the roll is releasably laminated on the polarizing sheet 11' by the carrier-film lamination mechanism 570. A releasable-film take up drive mechanism 572 is provided to take up a releasable film provided for protecting the adhesive layer formed on the carrier film 14 and to expose the adhesive layer when the carrier film 14 is releasably laminated on the polarizing sheet 11'.

Referring to the flowchart of FIG. 15, in Step 1, the lamination drive mechanism 540 functions to laminate the protective film to one surface of the polarizer to thereby produce the polarizing sheet 11' which is then fed while being produced. In Step 2, defects existing in the polarizing sheet 11' thus produced and being fed are detected by the inspection unit 560. In Step 3, the roll of the carrier film 14 is rotatably mounted on the support rack 571. In Step 4, the releasable-film take up drive mechanism 572 and the optical-film take up drive mechanism 580 functions to unroll the carrier film 14 formed with the transferable adhesive layer from the roll with the adhesive layer in exposed state. In Step 5, the carrier film 14 is releasably laminated on the polarizing sheet 11' through the adhesive layer by the carrier-film lamination mechanism 570, to form the polarizing composite film 11 having the adhesive layer 12.

The information processing device 610 functions to define defective and normal regions in the polarizing composite film 11 based on the locations or coordinate positions of the defects detected in Step 2, and then, based on the defined defective and normal regions, creates slit-position information for forming defective polarizing sheets $X_\beta$ and normal polarizing sheets $X_\alpha$ in the polarizing composite film 11. In Step 6, the created slit-position information is recorded on a surface of the carrier film 14 laminated on the polarizing composite film 11, by the information recording unit 630. In Step 7, an optical film formed through the above Steps is taken up by the optical-film take up drive mechanism 580, to form a roll of the optical film laminate.

Although the descriptions have been made herein with respect to a process wherein the step of forming the adhesive layer 12 on the polarizing composite film 11, simultaneously with the step of releasably laminating the carrier film 14 on the adhesive layer 12, it is to be understood that the adhesive layer 12 may be previously formed on the polarizing composite film 11. Further, in advance of Step 7, the adhesive surface of the surface-protection film 13 may be additionally laminated on the surface of the polarizing composite film 11 opposite to the surface on which the carrier film 14 is laminated by means of the surface-protection-film lamination mechanism 640, irrespective of whether the protective film is subjected to the hard coating treatment or the anti-dazzling or anti-glare treatment, before the protective film is laminated to the polarizer. In this case, the resulting optical film has a structure having the carrier film 14 and the surface-protection film 13 laminated on respective ones of the opposite surfaces of the polarizing composite film 11.

(Manufacturing Method and System for Roll of Optical Film Laminate According to the Embodiment Illustrated in FIG. 13)

FIG. 13 is a schematic diagram showing the manufacturing system for manufacturing a roll of optical film laminate 10, wherein a roll of a provisional optical film laminate 10' is mounted on a support rack, the roll comprising a polarizing composite film 11 including a polarizer laminated with a protective film, and a provisional carrier film 14' releasably laminated on the polarizing composite film 11 through an adhesive layer 12, and wherein a continuous web of the provisional optical film is continuously unrolled and the provisional carrier film 14' is peeled from the continuous web of the provisional optical film to be subjected to an inspection for detecting defects existing in the polarizing composite film 11 with the adhesive layer 12 in an exposed state, a carrier film 14 being thereafter laminated in a releasable manner on the adhesive layer 12 of the polarizing composite film 11, the slit-position information being recorded on a surface of the carrier film 14 in the same manner as in the embodiment illustrated in FIG. 12, to manufacture a roll of the optical film laminate 10. FIG. 16 is flowchart showing the manufacturing process or steps in the system.

It may be repeated that, in the process of producing the roll of provisional optical film laminate 10', a transferable adhesive layer is preliminary formed on the provisional carrier film 14'. Thus, when the provisional carrier film 14' is peeled from the continuous web of the provisional optical film being continuously drawn from the roll, the adhesive layer formed on the provisional carrier film 14' is transferred to the polarizing composite film 11 so as to be incorporated into the polarizing composite film 11. In place of the provisional carrier film 14' formed with the transferable adhesive layer, an adhesive layer 12 may be previously formed on the polarizing composite film, and then a provisional carrier film 14' formed as a simple film subjected to a releasing treatment may be laminated to the adhesive layer 12. Further, a surface of the protective film to be laminated to the polarizer may be subjected to a hard coating treatment or an anti-dazzling or anti-glare treatment.

The manufacturing system 500 for manufacturing a roll of optical film laminate 10 according to the present embodiment illustrated in FIG. 13 comprises the following elements in common with the manufacturing system according to the embodiment illustrated in FIG. 12; the inspection unit 560 including the image-reading device 590 for detecting a defect or defects existing in the polarizing composite film 11 including an adhesive layer 12; the carrier-film lamination mechanism 570 including the support rack 571 having the roll of the carrier film 14 mounted thereon for rotation; the optical-film take up drive mechanism 580 for driving and taking up the produced optical film into a roll; the control unit 600 including the information processing device 610 for performing an information processing and the storage device 620 for storing therein processed information; and the information recording unit 630 for recording encoded information on the optical film (final optical film). The manufacturing system 500 further comprises a lamination line or provisional-optical-film feed line 530 including a support rack 531 having a roll of the provisional optical film laminate 10' mounted thereon for rotation, and a lamination drive mechanism 540 including a pair of feeding drive rollers for continuously feeding the provisional optical film. The lamination drive mechanism 540 includes a distance measurement device 550 having an encoder incorporated in one of the feeding drive rollers to calculate a feed-out distance in terms of a length from the leading edge of the provisional optical film. Additionally, the manufacturing system 500 comprises a provisional-carrier-film peeling unit 575 including a provisional-carrier-film take up drive mechanism 576.

Referring to the manufacturing process illustrated in FIG. 16, in Step 1, the roll of the provisional optical film laminate 10' is mounted in the support rack 531. The provisional optical film comprises a polarizing composite film 11 including a polarizer having a protective film laminated to one or each of opposite surfaces of the polarizer, and a provisional carrier film 14' formed with a transferable adhesive layer and laminated to the polarizing composite film 11. In Step 2, a continuous web of the provisional optical film is fed by the lamination drive mechanism 540. In Steps 3 and 4, the provisional carrier film 14' is peeled and detached by the provisional-carrier-film take up drive mechanism 576 of the provisional-carrier-film peeling unit 575. In Step 5, a defect or defects existing in the polarizing composite film 11 with the adhesive layer 12 in an exposed state is detected by the inspection unit 560.

The inspection unit 560 comprises an image-reading device 590 including for example a CCD camera. The image-reading device 590 is electrically connected to the information processing device 610 included in the control unit 600, whereby in the image data read by the image-reading device 590 is processed in association with measurement data measured by the distance measurement device 550 electrically connected to the information processing device 610. The control unit 600 functions to operate the information processing device 610 and the storage device 620 to process the image data from the image-reading device 590 in association with the measurement data on the transferred distance measured in terms of the length from the leading edge of the provisional optical film by the distance measurement device 550, so as to create position data representing the locations or coordinate positions of defects in the polarizing composite film 11 having the adhesive layer in exposed state, and then store the position data in the storage device 620. The control unit 600 is operable, based on the position data on the detected defect locations or coordinate positions, to define defective regions and normal regions in the polarizing composite film 11. Further, the control unit 600 functions, based on the defective and normal regions defined in the polarizing composite film 11, to create slit-position information. The slit-position information is provided for indicating positions at which respective ones of the slit lines are to be formed in the continuous web of optical film, and the slit lines are formed in pairs by the slitting unit 150 during the manufacturing process of liquid-crystal display elements, in such a manner that the continuous web of optical film being fed is slit in a direction transverse to the feed direction at the two adjacent positions or the upstream and downstream positions to the feed direction to a depth reaching to the inner surface of the carrier film 14. The slit-position information thus created is also stored in the storage device 620. Then, the information processing device 610 functions, based on the stored slit-position information, to create encoded information, together with additional information, such as the manufacturing lot and the length in meters of the web in the roll of the optical film, or in association with the additional information. The manner of creating the encoded information is common in embodiments illustrated in FIGS. 12-14 so that it will be described below in connection with FIGS. 18 to 28.

In Steps 6 and 7, the carrier film 14 subjected to only a releasing treatment is taken out by the carrier-film lamination mechanism 570 which also serves as a film-feeding drive mechanism. In Step 8, the taken out carrier film 14 is laminated to the exposed adhesive layer 12.

The information processing device 610 defines defective regions and normal regions in the polarizing composite film 11, based on the locations or coordinate positions of the defects detected in Step 5, and then, based on the defined defective and normal regions, creates slit-position information for forming defective polarizing sheets $X_\beta$ and normal polarizing sheets $X_\alpha$ in the polarizing composite film 11. In Step 9, the created slit-position information is recorded on a surface of the carrier film 14 laminated on the polarizing composite film 11, by the information recording unit 630. In Step 10, the optical film formed through the above Steps is wound by the optical-film take up drive mechanism 580 into a roll of the optical film laminate. The embodiment illustrated in FIG. 13 is different from the embodiment illustrated in FIG. 12 in that the roll of the provisional optical film laminate 10' is previously produced and prepared. Further, the embodiment illustrated in FIG. 13 is different from the embodiment illustrated in FIG. 12, in that when the provisional carrier film 14' having the transferable adhesive layer 12 provided thereon is peeled, the polarizing composite film 11 is formed, on the surface exposed by peeling, with the transferred adhesive layer 12, and the inspection of defects existing in the polarizing composite film 11 is conducted on the polarizing composite film having such exposed adhesive layer 12.

Although not illustrated in FIG. 13 or 16, it may be possible, particularly in the process of manufacturing roll of the provisional optical film laminate, in advance of Step 10, to laminate a surface-protection film 13 having an adhesive surface on the surface of the polarizing composite film 11 opposite to the surface on which the carrier film 14 is laminated by means of a separately provided surface-protection-film lamination mechanism 640, before the protective film is laminated to the polarizer, irrespective of whether the protective film is subjected to a hard coat treatment or an anti-dazzling or anti-glare treatment on one surface. In this case, the resulting optical film has a structure having the carrier film 14 and the surface-protection film 13 laminated to respective ones of the opposite surfaces of the polarizing composite film 11.

(Manufacturing Method and System for Roll of Optical Film Laminate According to the Embodiment Illustrated in FIG. 14)

FIG. 14 is a schematic diagram showing the manufacturing system for manufacturing a roll of an optical film laminate 10, wherein a roll of a provisional optical film laminate 10''' is mounted on a support rack, the provisional optical film laminate comprising a polarizing composite film 11 including a polarizer and a protective film laminated thereon, and a provisional carrier film 14' releasably laminated on the polarizing composite film 11 by an adhesive layer 12, and a provisional surface-protection film 13' laminated by an adhesive surface on the surface of the polarizing composite film 11 opposite to the surface on which the provisional carrier film 14' is laminated, and wherein the provisional carrier film 14' and the provisional surface-protection film 13' are continuously peeled from the continuous web of the provisional optical film being continuously unrolled from the roll to have the adhesive layer exposed and the optical film having the exposed adhesive layer is subjected to an inspection for the existence of defects in the polarizing composite film 11, a carrier film 14 being then releasably laminated on the adhesive layer 12 of the polarizing composite film 11, and a surface-protection film 13 being releasably laminated by the adhesive surface on the surface of the polarizing composite film opposite to the surface on which the carrier film 14 is not laminated, in a sequential manner; slit-position information being thereafter recorded on a surface of the carrier film 14 in the same manner as in embodiments illustrated in FIGS. 12 and 13. FIG. 17 is a flowchart showing the manufacturing process or steps in the system.

It is to be repeated that, in the process of producing the roll of the provisional optical film laminate 10', a transferable adhesive layer is previously provided on the provisional carrier film 14'. Thus, when the provisional carrier film 14' is peeled from the continuous web of the provisional optical film being continuously fed out from the roll, the adhesive layer formed on the provisional carrier film 14' is transferred to the polarizing composite film 11 so as to be incorporated into the polarizing composite film 11. In place of the provisional carrier film 14' formed with the transferable adhesive layer, an adhesive layer 12 may be previously provided on the polarizing composite film, and then a provisional carrier film 14' may be laminated on the adhesive layer 12 after being subjected to a releasing treatment. Further, as the protective film to be attached to the polarizer, it may be possible to use a film which is subjected to a hard coat treatment or an anti-dazzling or anti-glare treatment at the surface to which the surface-protection film is attached. The provisional surface-protective film 13' and the surface-protective film 13 are formed with non-transferable adhesive surfaces at the sides which are to be laminated on the polarizing composite film 11. Typically, the surface-protection film 13 is formed as a sheet integral with the normal polarizing sheet of the polarizing composite film to be laminated to a liquid-crystal panel. Thus, the sheet of the surface-protection film 13 having the adhesive surface is used as means to protect the surface of an associated liquid-crystal display element during the manufacturing process of liquid-crystal display elements, and, after completion of the manufacturing process, it is peeled and removed together with the adhesive surface.

The manufacturing system 500 for manufacturing a roll of optical film laminate 10 according to the embodiment illustrated in FIG. 14, comprises a provisional-optical-film feed line 530 including a support rack 531 having a roll of the provisional optical film laminate 10" rotatably mounted thereon as in the embodiment illustrated in FIG. 13, and the feed line 530 includes a lamination drive mechanism 540 including a pair of feeding drive rollers for continuously feeding the provisional optical film. The lamination drive mechanism 540 comprises a distance measurement device 550 having an encoder incorporated in one of the feeding drive rollers to calculate the delivered distance in terms of a length from the leading edge of the provisional optical film. The manufacturing system 500 further comprises a provisional-carrier-film peeling unit 575 including a provisional-carrier-film take up drive mechanism 576. The manufacturing system 500 also comprises the following elements as in the system according to the embodiment illustrated in FIG. 12; an inspection unit 560 including an image-reading device 590 for inspecting existence of defects in the polarizing composite film 11; a carrier-film lamination mechanism 570 comprising a support rack 571 having a roll of the carrier film 14 rotatably mounted thereon; an optical-film take up drive mechanism 580 for drivingly winding the produced optical film into a roll; a control unit 600 including an information processing device 610 for performing information processing and a storage device 620 for storing therein processed information; and the information recording unit 630 for recording encoded information on the optical film. Additionally, the manufacturing system 500 comprises a provisional surface-protection-film peeling unit 645 including a provisional surface-protection-film take up drive mechanism 646 for taking up and peeling the provisional surface-protection film 13', and a surface-protection-film lamination mechanism 640 for attaching the final surface-protection film 13 to the polarizing composite film at the surface opposite to the surface on which the final carrier film 14 is laminated, the surface-protection-film lamination mechanism 640 also serving as a film-feeding drive mechanism.

Referring to the respective ones of the manufacturing steps illustrated in FIG. 17, in Step 1, the roll of the provisional optical film laminate 10" is mounted on the support rack 531. The provisional optical film comprises: a polarizing composite film 11 including a polarizer having a protective film laminated to one or each of the opposite surfaces of the polarizer, and a provisional carrier film 14' formed with a transferable adhesive layer and laminated on the polarizing composite film 11. In Step 2, a continuous web of the provisional optical film is fed by the lamination drive mechanism 540. In Steps 3 and 4, the provisional carrier film 14' is peeled and detached by the provisional-carrier-film take up drive mechanism 576 of the provisional-carrier-film peeling unit 575. Next, in Steps 5 and 6, the provisional surface-protection film 13' which is laminated through an adhesive surface on the polarizing composite film at the surface on which the provisional carrier film 14' is laminated, is peeled and detached by the provisional surface-protection-film take up drive mechanism 646 of the provisional surface-protection-film peeling unit 645. In Step 7, an inspection is conducted by the inspection unit 560 on the polarizing composite film 11 having the adhesive layer 12 in an exposed state, for existence of defects therein.

The inspection unit 560 comprises an image-reading device 590 including for example a CCD camera. The image-reading device 590 is electrically connected to the information processing device 610 included in the control unit 600, wherein image data read by the image-reading device 590 is processed in association with measurement data measured by the distance measurement device 550 electrically connected to the information processing device 610. The control unit 600 is operable to cause the information processing device 610 and the storage device 620 to process the image data from the image-reading device 590 in association with the measurement data relating to the delivered distance measured in terms of a length from the leading edge of the provisional optical film by the distance measurement device 550, so as to create position data representing the location or coordinate position of the defect in the polarizing composite film 11 having the adhesive layer 12, and then store the position data in the storage device 620. Then, the control unit 600 functions, based on the position data relating to the detected location or coordinate position of the defect, to define a defective region and a normal region in the polarizing composite film 11. Further, the control unit 600 functions, based on the defective and normal regions of the polarizing composite film 11 thus defined, to create slit-position information. The slit-position information is provided for indicating positions at which respective ones of the slit lines are to be formed in the continuous web of optical film, and the slit lines are formed in pairs by the slitting unit 150 during the manufacturing process of liquid-crystal display elements , by cutting the continuous web of optical film being fed in a direction transverse to the feed direction at the two adjacent positions or the upstream and downstream positions in the feed direction to a depth reaching to the inward surface of the carrier film 14. The created slit-position information is also stored in the storage device 620. Then, the information processing device 610 functions, based on the stored slit-position information, to create encoded information, together with additional information, such as the manufacturing lot and the length in meters of the optical film in the roll, or in association with the additional information. The manner of creating the encoded information is identical with those in embodiments illustrated in FIGS. 12-14, so that it will be described below in connection with FIGS. 18 to 28.

In Steps 8 and 9, the carrier film 14 subjected only to a releasing treatment is taken out by the carrier-film lamination mechanism 570 which also serves as a film-feeding drive mechanism. In Step 10, the taken out carrier film 14 is laminated on the exposed adhesive layer 12 in a releasable manner. Further, in Steps 11 and 12, the surface-protection film 13 having the adhesive surface is fed out by the surface-protection-film lamination mechanism 640 which also serves as the film-feeding drive mechanism. In Step 13, the fed final surface-protection film 13 is laminated through the adhesive surface on the surface of the polarizing composite film opposite to the surface on which the carrier film 14 is laminated. This is the Step 13.

Then, the information processing device 610 functions to define a defective region and a normal region in the polarizing composite film 11, based on the location or coordinate position of the defect detected in Step 7, and then, based on the defined defective and normal regions, creates slit-position information for forming a defective polarizing sheet $X_\beta$ and a normal polarizing sheet $X_\alpha$ in the polarizing composite film 11. In Step 14, the created slit-position information is recorded on a surface of the carrier film 14 laminated on the polarizing composite film 11, by the information recording unit 630. Finally, in Step 15, the optical film formed through the above Steps is wound by the optical-film take up drive mechanism 580, to form a roll of the optical film laminate.

This embodiment is different from the embodiment illustrated in FIG. 13, in that the roll of the provisional optical film laminate 10" is previously manufactured and prepared with a structure wherein not only the provisional carrier film 14' but also the provisional surface protection film 13' are laminated on the polarizing composite film 11. Therefore, in this embodiment, the inspection of defects is carried out after the adhesive layer 12 on the polarizing composite film 11 is exposed by sequentially peeling the provisional carrier film 14' and the provisional surface-protection film 13'.

In the embodiment illustrated in FIG. 12, the optical-film take up drive mechanism 580 is configured to operate in an inter-related manner with the operation of at least the lamination drive mechanism 540, the inspection unit 560 and the carrier-film lamination mechanism 570, to take up the optical film having the encoded information 20 recorded on a surface of the carrier film 14. In embodiments illustrated in FIGS. 13 and 14, the optical-film take up drive mechanism 580 is configured to operate in an inter-related manner with at least the lamination drive mechanism 540, the take up drive mechanism (576, 646), the carrier-film lamination mechanism 570 and the surface-protection-film lamination mechanism 640 to take up the optical film having the encoded information 20 recorded on a surface of the carrier film 14. The manufacturing system 500 may be provided with a speed adjustment mechanism (not shown) including a feed roller in order to adjust the take up speed of the optical film, when needed. Further, the encoded information may be recorded on the surface-protection film 13, instead of the carrier film 14.

(Creation of Encoded Information)

An embodiment of creating the encoded information 20 including information relating to the positions of the defects in the above embodiments is shown in the tables and schematic diagrams of FIGS. 22 to 25. It is to be understood that the encoded information 20 may be recorded in variety of ways including, for example a mode in which encoded information is entirely recorded on a single storage medium, and a mode in which encoded information is recorded on a plurality of storage media disposed at given intervals (e.g., at intervals of 1 m or 100 m). The selection of the recording modes or the content of position information to be stored as the encoded information may be determined depending on the storage capacity and the function required for the liquid-crystal display element manufacturing method and system, and the like.

Thus, it should be noted that embodiments illustrated in the schematic diagram and the flowcharts of FIGS. 18 and FIGS. 19 to 21 are shown only by way of examples.

The encoded information 20 comprises encoded information recorded on the continuous web unrolled from the roll of optical film laminate 10 and is comprised of information for identifying the previously defined defective and normal regions in the polarizing composite film 11 including an adhesive layer 12, and slit-position information for forming defective and normal polarizing sheets corresponding to the defective and normal regions, together with or in association with additional information, such as the manufacturing lot and the length in meters of the web in the roll. The encoded information 20 may be any type of code, as long as it is readable by the reading unit 120 of the continuous manufacturing system 1 during the manufacturing process of liquid-crystal display elements.

Figure 18:
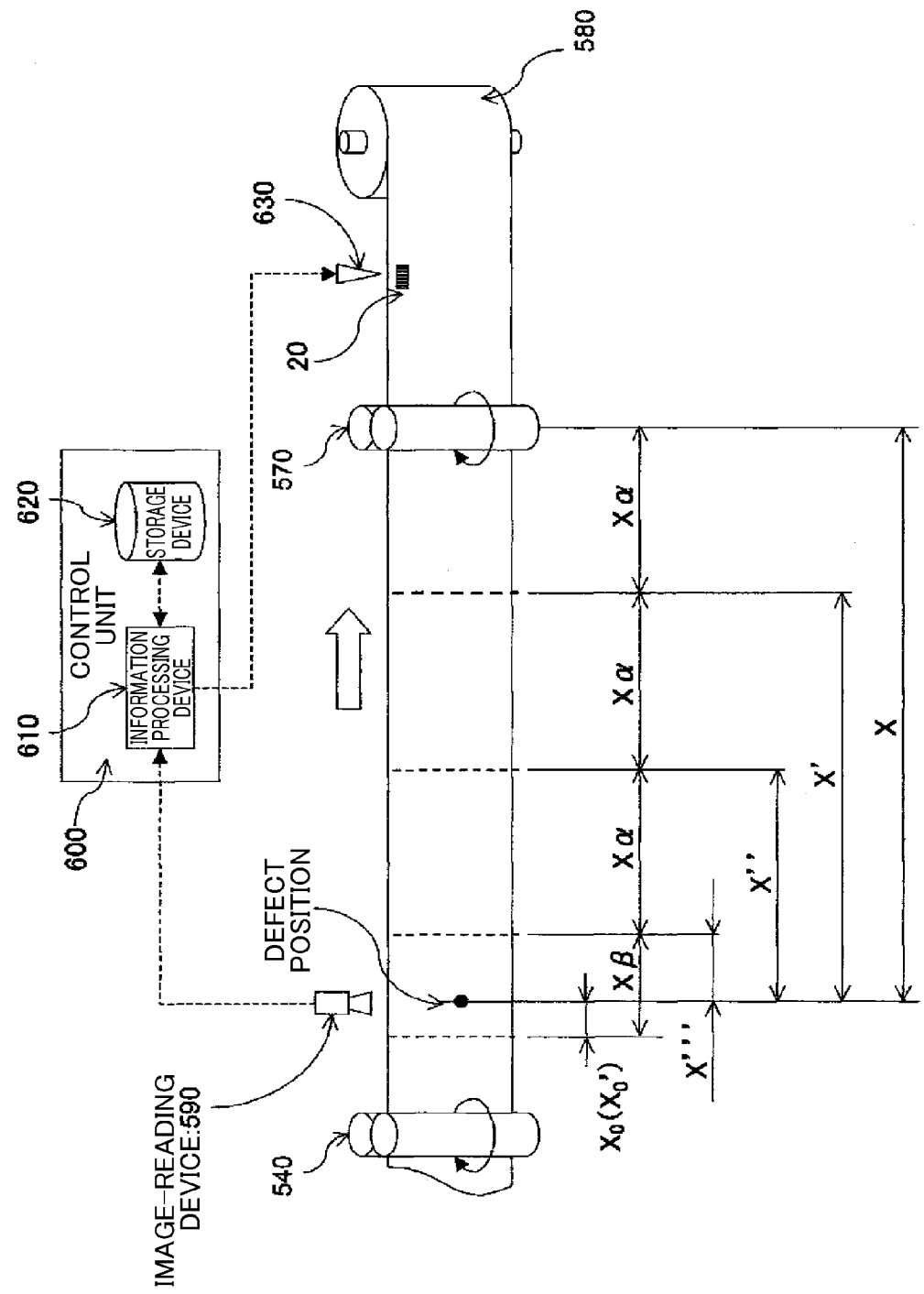
FIG. 18 is a schematic diagram showing a technique of calculating a position for forming a slit line in a continuous web of optical film being fed to segment a region of a polarizing composite film into a defective region and a normal region, according to at least one embodiment.

FIG. 18 is a schematic diagram showing the manner of calculating the positions at which respective ones of the slit lines are to be formed for delimiting the defective and normal regions in the continuous web of optical film which is being transported.

The control unit 600 functions to operate the information processing device 610 and the storage device 620 to process image data from the image-reading device 590 in association with measurement data relating to the feed-out distance measured in terms of a length from the leading edge of the polarizing composite film 11 by the distance measurement device 550, so as to create position data representing the location or coordinate position of a defect existing in the polarizing composite film, and then store the position data in the storage device 620. Then, the control unit 600 functions to define a defective region and a normal region in the polarizing composite film 11, based on the position data relating to the detected location or coordinate position of the defect. Further, the control unit 600 functions to create slit-position information, based on the defective and normal regions of the polarizing composite film 11. The slit-position information is provided for indicating the positions at which respective ones of the slit lines are to be formed in the continuous web of optical film. The slit lines will be formed in pairs by the slitting unit 150 during the manufacturing process of liquid-crystal display elements, by slitting the continuous web of optical film being fed in a direction transverse to the feed direction at the two adjacent positions or the upstream and downstream positions to the feed direction to a depth reaching the inward surface of the carrier film 14. The created slit-position information is also stored in the storage device 620.

Figure 19:
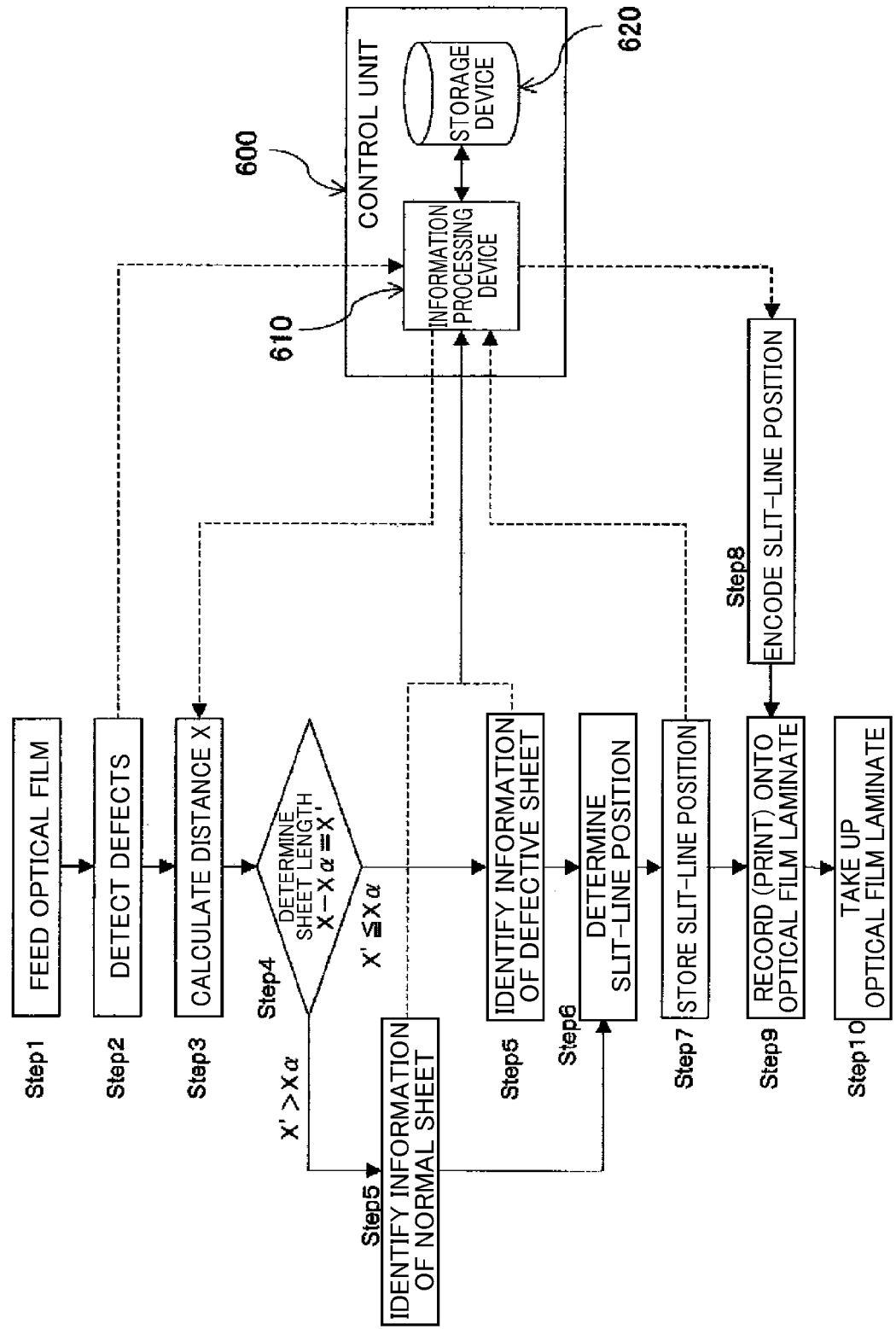
FIG. 19 is a flowchart showing a technique of calculating a position for forming a slit line in a continuous web of optical film being fed, according to at least one embodiment.
Figure 20:
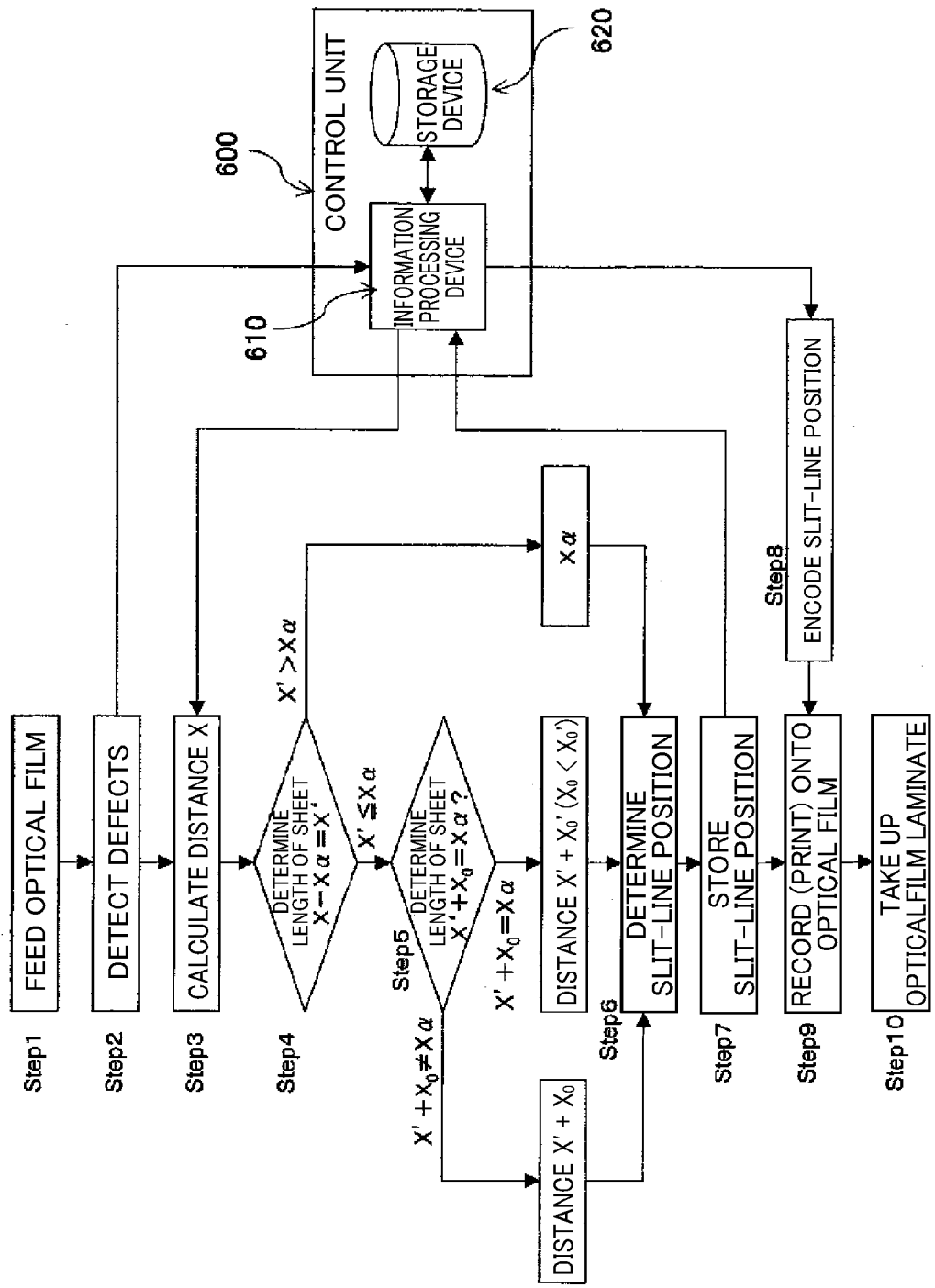
FIG. 20 is a flowchart showing another technique of calculating a position for forming a slit line in a continuous web of optical film being fed, according to at least one embodiment.
Figure 21:
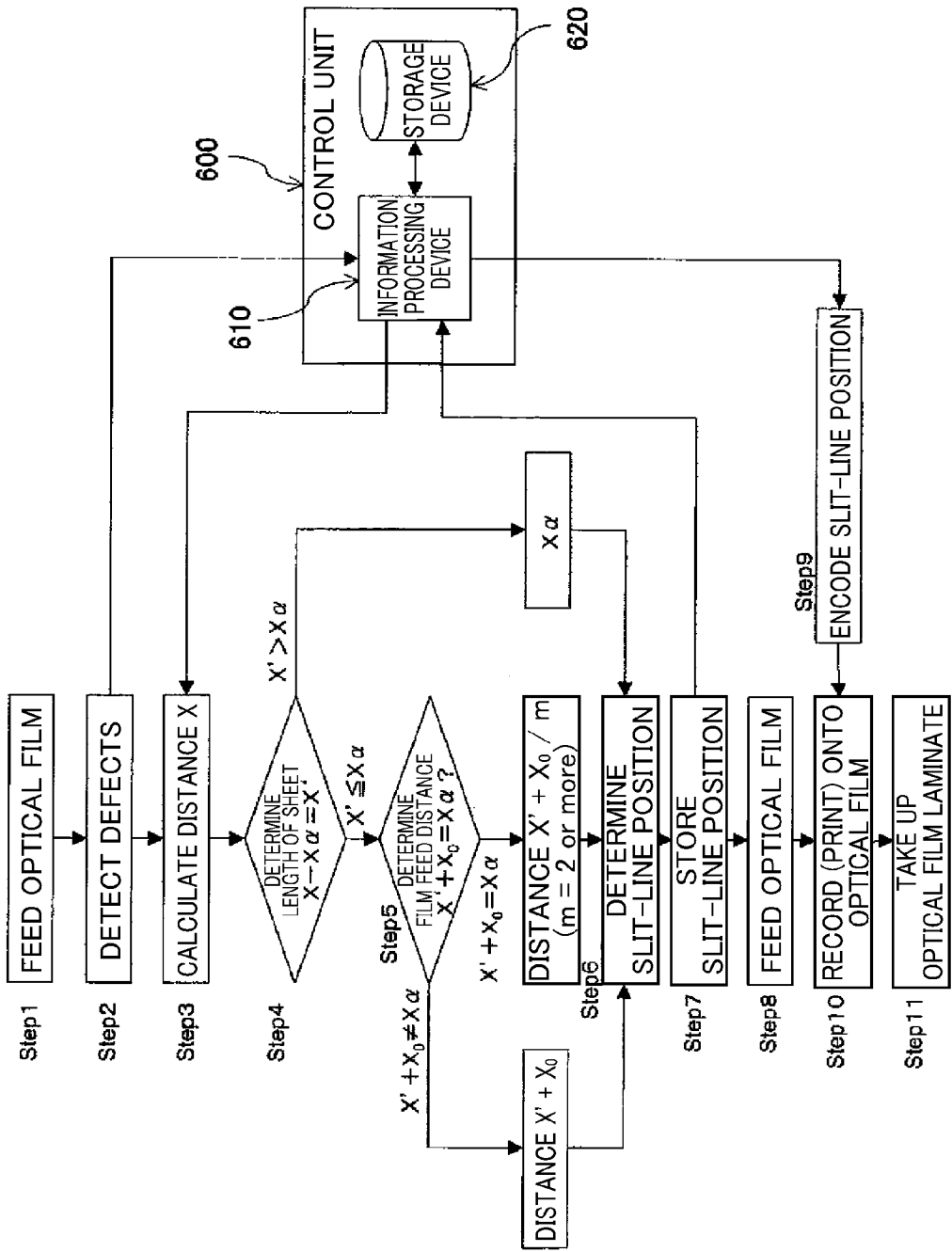
FIG. 21 is a flowchart showing yet another technique of calculating a position for forming a slit line in a continuous web of optical film being fed, according to at least one embodiment.

Then, the information processing device 610 operates to create encoded information based on the stored slit-position information, together with additional information, such as the manufacturing lot and the length in meters of the web in the optical film roll, or in association with additional information. FIGS. 19 to 21 are flowcharts showing three different processes for calculating the positions at which the respective ones of the slit lines are to be formed in the continuous web of optical film being fed.

The calculation processes will be described below based on the schematic diagram of FIG.18 and the flowcharts of FIGS. 19 to 21. The schematic diagram of FIG. 18 shows the polarizing sheet 11' including a polarizer having a protective film laminated thereon, or the polarizing composite film 11 having an adhesive layer (both the polarizing sheet 11' and the polarizing composite film 11 will hereinafter be referred collectively as "polarizing composite film 11") being continuously fed in right direction by the feed roller of the carrier-film lamination mechanism 570. However, in view of the fact that the optical film is formed by the carrier-film lamination mechanism 570, by releasably laminating the carrier film 14 with a transferable adhesive layer on the polarizing composite film 11 including the polarizer having the protective film laminated thereon, the polarizing composite film being continuously supplied by the feed roller will herein be referred generically as the "optical film". The flowcharts of FIGS. 19 to 21 show a specific steps up to the time when the encoded information 20 created by the control unit 600 is recorded on the optical film, preferably, on the surface of the carrier film 14, and the optical film having the encoded information recorded thereon is taken up by the optical-film take up drive mechanism 580.

In either case, in Step 1, the control unit 600 operates to instruct the lamination drive mechanism 540 and the optical-film take up drive mechanism 580 to feed the optical film. In Step 2, the control unit 600 instructs the inspection unit 560 including the image-reading device 590 to detect the location or coordinate position of a defect existing in the optical film, and store the detected location or coordinate position of the defect together with the type and size of the detected defect in the storage device 620. In Steps 3 and 4, the control unit 600 functions to determine the relationship between the length of a sheet of the optical film and the length ($X_\alpha$) corresponding to that of a normal region. The method of determining the relationship is as follows in steps 3 to 5.

In Step 3, the control unit 600 functions to operate the information processing device 610 to calculate the distance X between a reference position of the optical film being fed and the location of the defect, and store the calculated distance X in the storage device 620. As shown in FIG. 18, the distance X is a distance for example between the position of the carrier-film lamination mechanism 570 (the reference position of the optical film) and the position of the inspection unit 560 (or the image-reading device 590) (the defect position).

In Step 4, the control unit 600 further functions to operate the information processing device 610 to subtract the length ($X_\alpha$) corresponding to that of the normal region from the distance X to obtain a distance ($X-X_\alpha$)=X', and then store the distance X' in the storage device 620. The length ($X_\alpha$) corresponding to that of the normal region of the optical film is determined by a system manager based on the size of the liquid-crystal panel and pre-stored in the storage device 620. Then, the control unit 600 functions to operate the information processing device 610 to determine whether the calculated distance X is greater or less than the length ($X_\alpha$) corresponding to that of the normal region of the optical film.

Specifically, if it is established that the relation X' (or X") in FIG. 18 >$X_\alpha$ is satisfied, then a length of optical film corresponding to the normal region ($X_\alpha$) of the optical film can be guaranteed, so that the control unit 600 instructs the lamination drive mechanism 540 and the optical-film take up drive mechanism 580 to have the optical film delivered under tension by a length ($X_\alpha$) corresponding to the normal region. The value of the length ($X_\alpha$) in this instance is the slit-position information for forming a normal polarizing sheet $X_\alpha$ corresponding to the normal region in the optical film.

Conversely, if it is established that the relation X'≦$X_\alpha$, i.e., X'" in FIG. 18 ≦$X_\alpha$, is satisfied then a length of optical film corresponding to the normal region ($X_\alpha$) of the optical film cannot be guaranteed. In this instance, the region of the optical film having the length ($X_\beta$) is a defective region ($X_\beta$), so that the control unit 600 functions to operate the information processing device 610 to calculate the length (X'+$X_0$)=$X_\beta$ corresponding to the defective region ($X_\beta$) by adding a constant value $X_0$ to X' (X'" in FIG. 18), and to instruct the lamination drive mechanism 540 and the optical-film take up drive mechanism 580 to feed the optical film under tension by the length ($X_\beta$) corresponding to the defective region. The value ($X_\beta$) in this instance is the slit-position information for forming a defective polarizing sheet $X_\beta$ corresponding to the defective region of the optical film.

Specifically, the control unit 600 operates to calculate the following (a) and (b) to create slit-position information indicative of the positions at which respective ones of the slit lines are to be formed in a continuous web of the optical film to be fed during the manufacturing process of liquid-crystal display elements to form a normal polarizing sheet $X_\alpha$ and a defective polarizing sheet $X_\beta$ of a polarizing composite film, and then store the slit-position information in the storage device 620:

(a) a distance ($X_\alpha$) to the position for forming a next slit line, if X'>$X_\alpha$; and (b) a distance (X'+$X_0$=$X_\beta$) to the position for forming a next slit line, if X'≦$X_\alpha$.

If the length (X'+$X_0$=$X_\beta$) corresponding to that of the defective region becomes equal to the length ($X_\alpha$) corresponding to that of the normal region, i.e., if (X'+$X_0$)=($X_\alpha$), the control unit 600 cannot identify or discriminate the normal region ($X_\alpha$) over the defective region ($X_\beta$). This means that the region to be recognized as the defective region ($X_\beta$) may not be recognized as the defective region ($X_\beta$), so that, for example, the normal region ($X_\alpha$) and the defective region ($X_\beta$) cannot be discriminated from each other based on measurement data on the feed-out distance of the optical film, and the encoded information created based on the measurement data (X'+$X_0$) inevitably becomes imperfect. It is assumed that such a situation occurs when the location or coordinate position of a defect in the optical film is infinitely close to the position for forming a next slit line in the optical film, or when a series of defects are distributed over a length ($X_\alpha$) corresponding to that of the normal region.

In Step 5, if (X'+$X_0$) becomes equal to ($X_\alpha$), the control unit 600 functions to operate the information processing device 610 to perform a calculation based on at least one of the following methods to create information for identifying or discriminating the normal region ($X_\alpha$) over the defective region ($X_\beta$).

Figure 24:
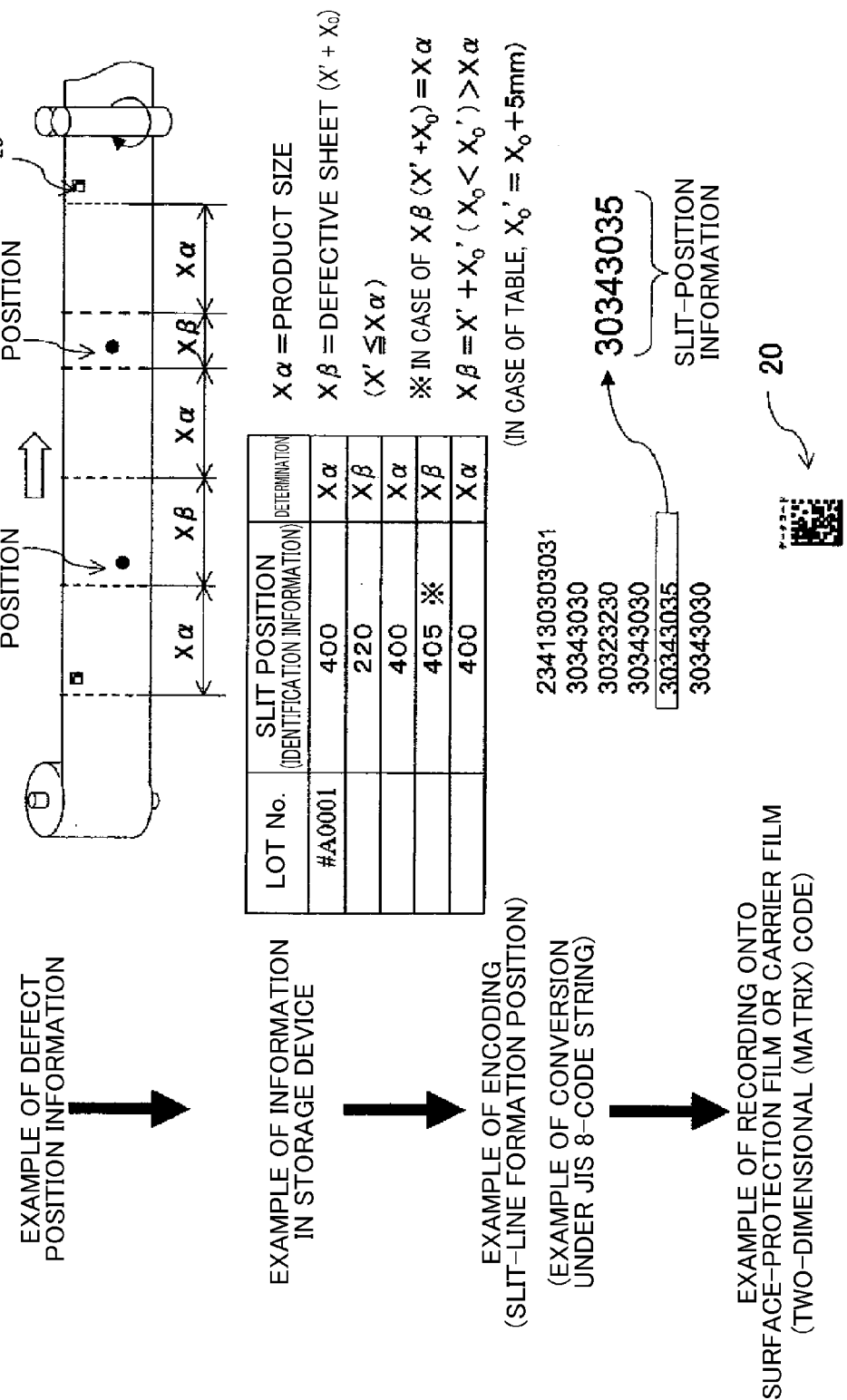
FIG. 24 is a diagram showing an example of encoding of a slit-position information indicative of the position for forming a slit line in an optical film, in a technique of modifying a distance to a next-slit-line formation position to $(X'+X_0)$, wherein $X_0'>X_0$, in FIG. 20.

In Step 5 illustrated in FIG. 19, even if, as the result of calculation conducted by the information processing device 610, the distance (X'+$X_0$) to the position for forming a next slit line becomes equal to the length ($X_\alpha$) corresponding to that of the normal region, the region in said distance is not essentially the normal region ($X_\alpha$). In order to make it possible to recognize such difference, for example, as defect-including information $X_\gamma$ illustrated in FIG. 23, a numerical suffix "0" may be associated with the slit-position information indicative of the position for forming a slit-line corresponding to the normal region, and a numerical suffix "1" with the slit-position information indicative of the position for forming a-slit-line corresponding to the defective region. In Step 5 illustrated in FIG. 20, if, as a result of calculation of the information processing device 610, the distance (X'+$X_0$) to the position where a next-slit-line is to be formed becomes equal to the length ($X_\alpha$) corresponding to that of the normal region, an information processing is conducted so that the distance to the position where a next-slit-line is to be formed satisfies the relation (X'+$X_0$'), wherein $X_0$'>$X_0$, and store the distance (X'+$X_0$') device 620. As shown in FIG. 24, this information processing makes it possible by calculating the distance (X'+$X_0$') different from $X_\alpha$, to allow the region having the length (X'+$X_0$') to be identified or discriminated over the normal region ($X_\alpha$). Further, in Step 5 illustrated in FIG. 21, if, as the result of calculation conducted by the information processing device 610, the distance $(X'+X_0)$ to the position where a next-slit-line is to be formed becomes equal to the length $(X_\alpha)$ corresponding to that of the normal region, an information processing is carried out to allow the distance to the position where the next-slit-line is to be formed to become $[(X'+X_0)/m]$, wherein m=2 or more, preferably 2 or 3, and store the distance $[(X'+X_0)/m]$ in the storage device 620. As the case of FIG. 20, this information processing illustrated in FIG. 25 is configured to calculate the $[(X'+X_0)/m]$ different from $X_\alpha$ to allow the region having the length $[(X'+X_0)/m]$ to be identified or discriminated over the normal region $(X_\alpha)$.

Summarizing the above, in the process for creating information for identifying or discriminating the defective and normal regions, either of the following methods may be adopted:

(1) A method of creating a defective identification information or defect-including information $X_\gamma$ as information for identifying or discriminating a region having a length $(X'+X_0)$ calculated by the information processing device 610 over the normal region $(X_\alpha)$;

(2) A method of creating a distance to the position where a next-slit-line is to be formed which is calculated by the information processing device 610, as a distance $(X'+X_0')$ (wherein $X_0'>X_0$) which is different from $X_\alpha$; and (3) A method of creating a distance to the position where a next-slit-line is to be formed which is calculated by the information processing device 610, as a distance $[(X'+X_0)/m]$ (wherein m=2 or more) which is different from $X_\alpha$.

Particularly, in cases where the method (2) or (3) is employed, $(X'+X_0)=(X_\alpha)$ is changed to $(X'+X_0')\neq X_\alpha$ or $[(X'+X_0)/m]\neq X_\alpha$ by the information processing illustrated in FIG. 20 or 21, the position where a next-slit-line is to be formed can be used as information indicative of the defective region identified or discriminated over the normal region.

Next, in either case, in Step 6, the control unit 600 functions to operate the information processing device 610 to determine the length between the reference position and the position where a next-slit-line is to be formed, based on the calculation result in Steps 4 and 5. In the methods (2) or (3), in Step 7, the control unit 600 operates to cause the information processing device 610 to store the length to the position where a next-slit-line is to be formed as determined in Step 6, in the storage device 620. However, in the method (1), the control unit 600 functions to operate the information processing device 610 to store the length to the position of forming a next-slit-line in association with the defect-including information $X_\gamma$.

In either case, in Step 8, the control unit 600 functions to operate the information processing device 610 to convert, based on the position for forming a next-slit-line stored in Step 7, into encoded information, the slit-position information indicative of the position where a slit-line is to be formed with respect to the leading edge of the optical film being fed, together with or in association with additional information, such as the manufacturing lot and the length in meters of the optical-film in the roll. In the method (1), it is to be understood that the defect-including information $X_\gamma$ is simultaneously converted to the encoded information.

In Step 9, the control unit 600 functions to operate the information recording unit 630 to record the encoded information converted in Step 8 by the information processing device 610, on the optical film, preferably on the surface of the carrier film. In the method (1), it should be understood that the encoded defect-including information $X_\gamma$ is also recorded together with the encoded information. Finally, in Step 10, the control unit 600 functions to operate the lamination drive mechanism 540 and the optical-film take up drive mechanism 580 to wind the finished optical film. The roll of the optical film laminate is thus completed. Examples of the encoded information are shown in FIGS. 22 to 25.

(Details of the Manufacturing System for Roll of Optical Film Laminate Specifically Showing Defect Inspection Process)

Figure 27:
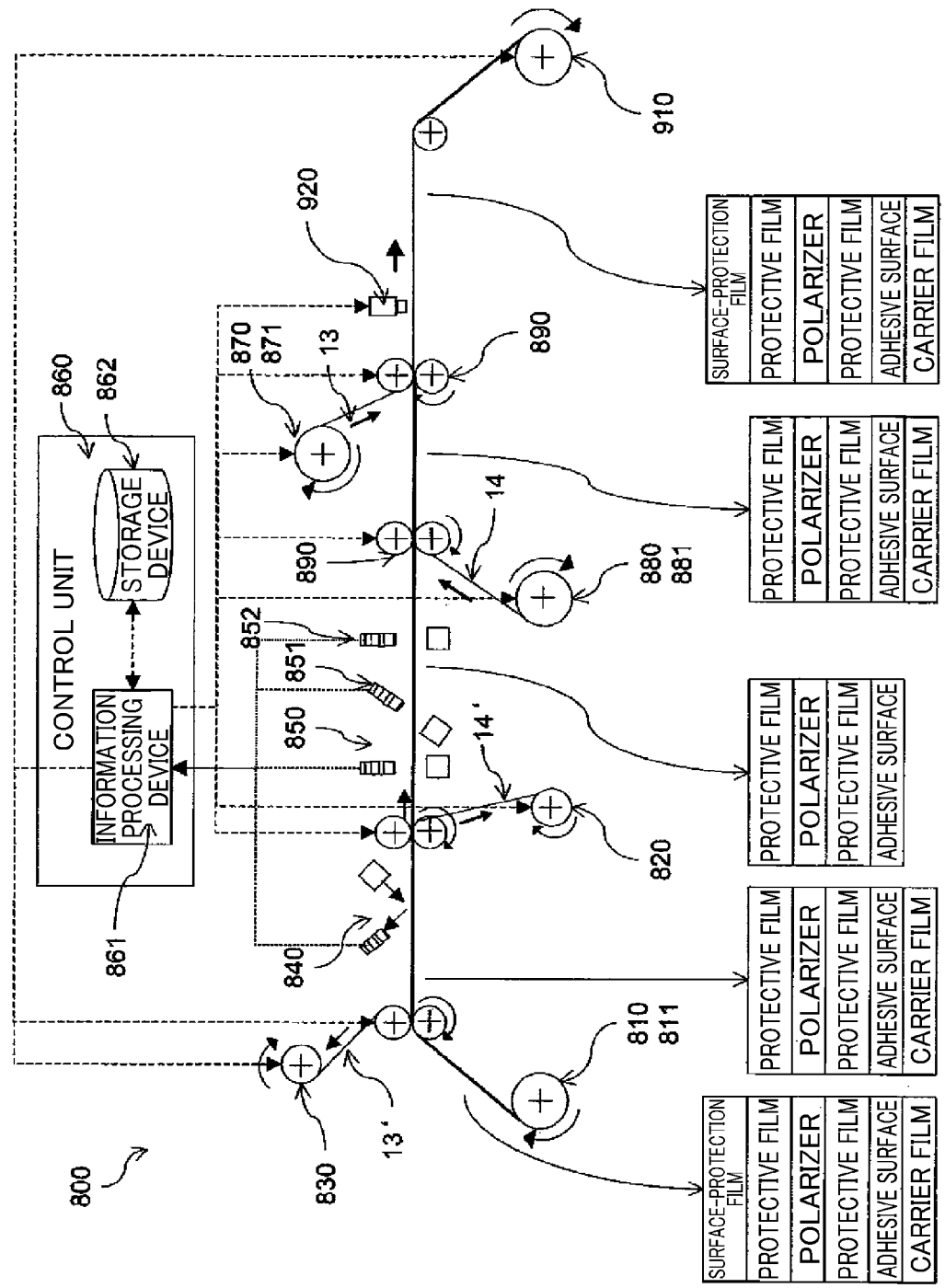
FIG. 27 is a schematic diagram showing a manufacturing system for a roll of an optical-film laminate having four inspection units, according to the embodiment illustrated in FIG. 14.

With reference to FIGS. 26 and 27, a manufacturing system for a roll of optical film laminate will be more specifically described in connection with a specific method of inspecting defects existing in the polarizing composite film 11 having an adhesive layer 12. FIG. 26 is a schematic diagram showing a manufacturing system 700 for a roll of optical film laminate having two inspection units, which is based on the manufacturing system according to the embodiment illustrated in FIG. 13. In the manufacturing process of the provisional optical film laminate 10', a polarizing sheet 11' is formed with a structure comprising a polarizer having a protective film laminated on at least one of the opposite surfaces of the polarizer, and an adhesive layer 12 is formed on the other surface of the polarizing sheet 11' to form a polarizing composite film 11. Then, a provisional carrier film 14' is releasably laminated on the adhesive layer 12 of the polarizing composite film 11, and the resulting provisional optical film is wound into a roll to form the roll of the provisional optical film laminate 10'. The roll of the provisional optical film laminate 10' is rotatably mounted on a support rack 711 of a provisional-optical-film feed unit 710. In addition to the provisional-optical-film feed unit 710, the manufacturing system 700 comprises a provisional-carrier-film take up drive mechanism 720, a first inspection unit 730, a second inspection unit 731, a control unit 740, a carrier-film feed unit 750, a carrier-film lamination mechanism 760, an optical-film take up drive mechanism 770, and an information recording unit 780.

The provisional optical film is continuously delivered from the roll of the provisional optical film laminate 10' by the provisional-optical-film feed unit 710. The provisional-carrier-film take up drive mechanism 720 is disposed along the feed direction of the provisional optical film, and adapted to take up the provisional carrier film 14' by peeling and detaching it from the provisional optical film. Each of the first and second inspection units 730, 731 is adapted to detect one or more defects in the surface and the interior of the polarizing composite film 11 with the adhesive layer 12 exposed as a result of the peeling the provisional carrier film 14'. The first inspection unit 730 is comprised of a transmission inspection device illustrated in FIG. 28. The transmission inspection method is designed such that visible light emitted from a light source is projected to the polarizing composite film 11 perpendicular thereto, and to have the light which has passed through the polarizing composite film 11 being received by an optical detection unit to detect one or more defects existing in the polarizing composite film 11 in the form of a shade or shadow. The second inspection unit 731 is comprised of a cross-Nicol transmission inspection device illustrated in FIG. 28. The cross-Nicol transmission inspection method is designed such that visible light emitted from a light source is introduced perpendicularly or obliquely into a polarization filter which is disposed immediately before an optical detection unit in such a manner that the absorption axis of the polarization filter is oriented at a right angle with respect to the absorption axis of the polarizing composite film, the light which has passed through the polarizing composite film being received by the optical detection unit to detect the defect in the polarizing composite film as a bright spot.

The control unit 740 functions to operate an information processing device 741 to define a defective region and a normal region in the polarizing composite film 11, based on the location or coordinate position of the defect detected by the first inspection unit 730 and the second inspection unit 731. Then, the control unit 740 functions to operate an information processing device 741 to create slit-position information for forming a defective polarizing sheet $X_\beta$ and a normal polarizing sheet $X_\alpha$ in the polarizing composite film 11, based on the defined defective and normal regions, and convert the slit-position information into encoded information 20. The information recording unit 780 is adapted to record the encoded information on a surface of the carrier film 14 newly laminated on the polarizing composite film 11.

The carrier-film feed unit 750 disposed downstream the second inspection unit 731 is adapted to continuously unroll the carrier film 14 from a roll of the carrier film 14 rotatably mounted in the support rack 751, along the feed direction of the polarizing composite film 11. The carrier-film lamination mechanism 760 is provided with a pair of rollers, and adapted to releasably laminate the carrier film 14 on the exposed adhesive layer 12 after completion of the inspection by the inspection units. It may be repeated that, the encoded information is recorded on the surface of the carrier film 14 newly laminated on the adhesive layer, by the information recording unit 780. The created optical film is wound by the optical-film take up drive mechanism 770 into a roll, and then formed into a roll of the optical film laminate 10. The control unit 740 functions to control respective operations of the units, the mechanisms and the device in an inter-related manner.

FIG. 27 is a schematic diagram showing a manufacturing system 800 of a roll of optical film laminate having four inspection units, which is based on the manufacturing system according to the embodiment illustrated in FIG. 14.

In the manufacturing process of a roll of the provisional optical film laminate 10", a polarizing sheet 11' is formed as comprising a polarizer having a protective film laminated on at least one of the opposite surfaces of the polarizer, and an adhesive layer 12 is formed on the other surface of the polarizing sheet 11' to form a polarizing composite film 11. Then, a provisional carrier film 14' is releasably laminated on the adhesive layer 12 of the polarizing composite film 11, and a provisional surface-protection film 13' is releasably laminated on the surface of the polarizing composite film 11 opposite to the surface on which the provisional surface-protection film 13' is laminated. The resulting provisional optical film is wound into a roll to form the roll of the provisional optical film laminate 10". The roll of provisional optical film laminate 10" is rotatably mounted in a support rack 811 of a provisional-optical-film feed unit 810.

The manufacturing system 800 comprises in addition to the provisional-optical-film feed unit 810, a provisional-carrier-film take up drive mechanism 820, a provisional-surface-protection-film take up drive mechanism 830, a first inspection unit 840, a second inspection unit 850, a third inspection unit 851, a fourth inspection unit 852, a control unit 860, a provisional-surface-protection-film feed unit 870, a carrier-film feed unit 880, two sets of lamination mechanisms 890 (carrier-film lamination mechanism 891, surface-protection-film lamination mechanism 892), an optical-film take up drive mechanism 910, and an information recording unit 920.

The provisional optical film is continuously unrolled from the roll of the provisional optical film laminate 10" by the provisional-optical-film feed unit 810. The provisional-surface-protection-film take up drive mechanism 830 is disposed along the feed direction of the provisional optical film, and adapted to take up the provisional surface-protection film 13' by peeling and detaching it from the provisional optical film. The provisional-carrier-film take up drive mechanism 820 is disposed downstream the provisional-surface-protection-film take up drive mechanism 830 and along the feed direction of the provisional optical film, and adapted to take up the provisional carrier film 14' by peeling and detaching it from the provisional optical film.

As shown in FIG. 27, the inspection units are disposed at respective four positions in the manufacturing system 800. The first inspection unit 840 is located between the provisional-surface-protection-film take up drive mechanism 830 and the provisional-carrier-film take up drive mechanism 820, and adapted to inspect the provisional optical film in a state where only the provisional surface-protection film 13' is peeled off and the provisional carrier film 14' is still on the web. Specifically, the inspection is made to detect one or more defects in the surface of the polarizing composite film 11, based on the reflected light from the protective film of the exposed polarizing composite film 11. The second inspection unit 850, the third inspection unit 851 and the fourth inspection unit 852 are located between the provisional-carrier-film take up drive mechanism 820 and the carrier-film feed unit 880, so that they inspect one or more defects on the surface and the interior of the polarizing composite film by having light transmit through the polarizing composite film 11 having the adhesive layer 12 in exposed state as a result of the peeling the provisional carrier film 14' by the provisional-carrier-film take up drive mechanism 820.

More specifically, each of the second to fourth inspection units is configured as follows. The second inspection unit 850 is designed for the transmission inspection illustrated in FIG. 28. The transmission inspection method is designed such that visible light emitted from a light source is projected to the polarizing composite film 11 perpendicular thereto, and to have the light which has passed through the polarizing composite film 11 being received by an optical detection unit to detect one or more defects existing in the polarizing composite film 11 in the form of a shade or shadow. The third inspection unit 851 is designed for the oblique transmission inspection illustrated in FIG. 28. The oblique transmission inspection method is designed such that a visible light emitted from an oblique-transmission light source is projected to the polarizing composite film 11 in an oblique angle and to have the light which has passed through the polarizing film received by an optical detection unit to detect one or more defects existing in the optical film as a shade. The fourth inspection unit 852 is comprised of a cross-Nicol transmission inspection device illustrated in FIG. 28. The cross-Nicol transmission inspection method is designed such that a visible light emitted from a light source is projected to the polarizing composite film perpendicularly or obliquely thereto and, with a polarization filter being disposed immediately before an optical detection unit with an absorption axis thereof being oriented at a right angle with respect to an absorption axis of the polarizing composite film, the light which has passed through the polarizing composite film is received by the optical detection unit to thereby detect one or more defects existing in the polarizing composite film as one or more bright spots.

The control unit 860 functions to operate an information processing device 861 to define in the polarizing composite film 11 a defective region and a normal region, based on the location or coordinate position of a defect or defects detected by the first inspection unit 840, the second inspection unit 850, the third inspection unit 851 and the fourth inspection unit 852. Then, the control unit 860 functions to operate an information processing device 861 to create slit-position information for forming a defective polarizing sheet $X_\beta$ and a normal polarizing sheet $X_\alpha$ in the polarizing film, based on the defined defective and normal regions, and convert the slit-position information into encoded information 20. The information recording unit 920 is adapted to record the encoded information 20 on a surface of the carrier film 14 newly laminated to the polarizing composite film 11.

The carrier-film feed unit 880 disposed downstream the fourth inspection unit 852 is adapted to continuously unroll the carrier film 14 from the roll of the carrier film laminate 14 rotatably mounted in a support rack 881, along the feed direction of the polarizing composite film 11. The provisional-surface-protection-film feed unit 870 disposed downstream the carrier-film feed unit 880 is adapted to continuously unroll the surface-protection film 13 from a roll of the surface-protection film 13 rotatably loaded in a support rack 871, along the feed direction of the polarizing composite film 11. The lamination mechanisms 890, or the carrier-film lamination mechanism 891 and the surface-protection-film lamination mechanism 892 each having a pair of rollers function to releasably laminate the carrier film 14 and the surface-protection film 13 respectively on the exposed adhesive layer 12 and the surface of the polarizing composite film which does not have an adhesive layer, after completion of the inspection by the inspection units disposed at the four positions. It may be repeated that, the encoded information is recorded on the surface of the carrier film 14 newly laminated on the adhesive layer, by the information recording unit 920. The created optical film is wound by the optical-film take up drive mechanism 910, and formed into a roll of optical film laminate 10. The control unit 860 is operable to control respective operations of the units, the mechanisms and device in an inter-related manner.

Although at least one embodiment has been described in connection with preferred embodiments thereof, it will be appreciated that various changes and modifications will be made by those skilled in the art without departing from the spirit and scope of the invention, defined in the following claims, and legal equivalents of the following claims may be substituted for elements thereof. Accordingly, the present invention is not limited to the specific embodiments disclosed as the best mode for carrying out the invention, but intended to cover all embodiments included within the scope thereof.

What is claimed is:

1. A roll of optical film laminate adapted for use in a continuous manufacturing system for liquid-crystal display elements, wherein the manufacturing system is operative to produce liquid-crystal display elements by adhesively attaching a polarizer to each of the opposite surfaces of a liquid crystal panel which is of a rectangular shape having a long side dimension and a short side dimension, the roll of optical film laminate comprising a continuous web of optical film, the continuous web of optical film comprising:

a polarizing composite film which includes:
   a laminate of a polarizer layer and a protective film laminated on at least one of opposite surfaces of a continuous layer of the polarizer, and
   an adhesive layer provided on one of the opposite surfaces of the laminate of the polarizer layer and the protective film, said continuous web of optical film having a longitudinal direction and a transverse direction which is perpendicular to said longitudinal direction, and further having a width corresponding to one of said long or short side dimension;

a carrier film being laminated in a releasable manner to the adhesive layer of the polarizing composite film, wherein the polarizing composite film has a plurality of pre-defined slit positions for determining positions of slit lines each extending in said transverse direction throughout the width of said web of optical film to define rectangular regions each between two longitudinally adjacent slitting positions, said rectangular regions including defective regions and defect-free, normal regions, which have been defined based on locations of defects existing in the polarizing composite film and detected previously by inspection, the defect-free, normal regions each having a longitudinal dimension corresponding to the other of said long or short side dimension of the liquid crystal panel, the continuous web of optical film having encoded information recorded thereon, the encoded information including slit position information for specifying positions at which the respective slit lines are to be formed in the continuous web of optical film by a slitting unit of the continuous manufacturing system, based on the defective regions and the normal regions of the polarizing composite film, the encoded information being readable by a reading unit of the continuous manufacturing system.

2. The roll of optical film laminate as defined in claim 1, wherein the encoded information further includes information for identifying the defective regions and the normal regions of the polarizing composite film.

3. The roll of optical film laminate as defined in claim 1, wherein the continuous web of optical film further comprises a surface-protection film having an adhesive surface releasably laminated on a surface of the polarizing composite film opposite to a surface on which the carrier film is releasably laminated.

4. The roll of optical film laminate as defined in claim 1, wherein the encoded information is recorded on either of the carrier film or a surface-protection film.

5. The roll of optical film laminate as defined in claim 1, wherein the polarizing composite film has a width conforming to a long or short side of each of the liquid-crystal display elements.

* * * * *